United States Patent
Mochizuki et al.

(10) Patent No.: US 12,185,239 B2
(45) Date of Patent: Dec. 31, 2024

(54) COMMUNICATION SYSTEM, COMMUNICATION TERMINAL DEVICE, FIRST BASE STATION DEVICE AND SECOND BASE STATION DEVICE

(71) Applicant: Mitsubishi Electric Corporation, Tokyo (JP)

(72) Inventors: Mitsuru Mochizuki, Tokyo (JP); Noriyuki Fukui, Tokyo (JP); Haruka Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/338,034

(22) Filed: Jun. 3, 2021

(65) Prior Publication Data

US 2021/0289440 A1    Sep. 16, 2021

Related U.S. Application Data

(63) Continuation of application No. 16/787,524, filed on Feb. 11, 2020, now Pat. No. 11,064,430, which is a (Continued)

(30) Foreign Application Priority Data

Jan. 31, 2014    (JP) .................. 2014-017100

(51) Int. Cl.
*H04W 52/02*      (2009.01)
*H04W 16/32*      (2009.01)
(Continued)

(52) U.S. Cl.
CPC ....... *H04W 52/0206* (2013.01); *H04W 16/32* (2013.01); *H04W 48/02* (2013.01);
(Continued)

(58) Field of Classification Search
CPC . H04W 52/0206; H04W 16/32; H04W 48/02; H04W 48/08; H04W 48/16; H04W 24/02; H04W 84/045; Y02D 30/70
See application file for complete search history.

(56) References Cited

U.S. PATENT DOCUMENTS 8,583,192 B2    11/2013    Tomita et al.
8,781,480 B2    7/2014    Lim et al.
(Continued)

FOREIGN PATENT DOCUMENTS

CN    101926200 A    12/2010
CN    102045807 A    5/2011
(Continued)

OTHER PUBLICATIONS

Indian Office Action issued Jul. 25, 2022 in Indian Patent Application No. 202148024908, 6 pages.
(Continued)

*Primary Examiner* — Christopher M Brandt
(74) *Attorney, Agent, or Firm* — PROCOPIO, CORY, HARGREAVES & SAVITCH LLP

(57) ABSTRACT

A communication system capable of preventing unnecessary switching of an energy saving cell between a normal operation state and an energy saving state. An energy saving cell (ES cell) is in a dormant state that is the energy saving state. In this case, when being notified of a wake-up request message from a communication terminal device (UE), the ES cell executes access restriction control to judge whether the UE can access its own cell. If judging that the UE can access its own cell, the ES cell switches on its own cell and shifts from the dormant state to an active state that is the normal operation state.

9 Claims, 22 Drawing Sheets

Related U.S. Application Data continuation of application No. 15/655,268, filed on Jul. 20, 2017, now Pat. No. 10,652,818, which is a continuation of application No. 15/111,734, filed as application No. PCT/JP2014/083260 on Dec. 16, 2014, now Pat. No. 9,860,836.

(51) Int. Cl.
| | | |
|---|---|---|
| H04W 48/02 | (2009.01) | |
| H04W 48/08 | (2009.01) | |
| H04W 48/16 | (2009.01) | |
| H04W 24/02 | (2009.01) | |
| H04W 84/04 | (2009.01) | |

(52) U.S. Cl.
CPC ........... *H04W 48/08* (2013.01); *H04W 48/16* (2013.01); *H04W 24/02* (2013.01); *H04W 84/045* (2013.01); *Y02D 30/70* (2020.08)

(56) References Cited

U.S. PATENT DOCUMENTS

| | | | |
|---|---|---|---|
| 8,914,032 B2 | 12/2014 | Lim et al. | |
| 9,585,101 B2 * | 2/2017 | Stern-Berkowitz | ............... H04W 52/146 |
| 2010/0210268 A1 * | 8/2010 | Lim | ............... H04W 48/08 455/436 |
| 2011/0092214 A1 * | 4/2011 | Iwamura | ............... H04W 24/10 455/438 |
| 2011/0092234 A1 | 4/2011 | Kim et al. | |
| 2011/0098041 A1 * | 4/2011 | Tomita | ............... H04W 36/04 455/434 |
| 2011/0105200 A1 * | 5/2011 | Tomita | ............... H04W 52/0241 455/574 |
| 2011/0136490 A1 * | 6/2011 | Aoyagi | ............... H04W 36/04 455/443 |
| 2011/0300868 A1 | 12/2011 | Matsuo et al. | |
| 2012/0108244 A1 * | 5/2012 | Shi | ............... H04W 36/0022 455/438 |
| 2012/0178379 A1 * | 7/2012 | Chen | ............... H04W 76/18 455/68 |
| 2012/0244903 A1 | 9/2012 | Fong et al. | |
| 2013/0039274 A1 * | 2/2013 | Lee | ............... H04W 74/0833 370/328 |
| 2013/0040605 A1 * | 2/2013 | Zhang | ............... H04W 48/10 455/411 |
| 2013/0053051 A1 * | 2/2013 | Fang | ............... H04W 52/0206 455/452.1 |
| 2013/0136047 A1 * | 5/2013 | Zhang | ............... H04W 8/12 370/311 |
| 2013/0148586 A1 | 6/2013 | Ryu | |
| 2013/0329621 A1 | 12/2013 | Kondo et al. | |
| 2014/0066051 A1 * | 3/2014 | Xia | ............... H04W 52/0206 455/422.1 |
| 2015/0063303 A1 * | 3/2015 | Yamazaki | ......... H04W 36/0033 370/331 |
| 2015/0124748 A1 * | 5/2015 | Park | ............... H04L 5/0055 370/329 |
| 2015/0133124 A1 | 5/2015 | Lim et al. | |
| 2015/0215843 A1 | 7/2015 | Lee | |

FOREIGN PATENT DOCUMENTS

| | | | | |
|---|---|---|---|---|
| CN | 102396263 A | 3/2012 | | |
| EP | 2312889 A1 * | 4/2011 | ............ | H04W 48/14 |
| JP | 2011-50115 A | 3/2011 | | |
| JP | 2011-217338 | 10/2011 | | |
| JP | 2012-518320 A | 8/2012 | | |
| JP | 2012-227746 A | 11/2012 | | |
| RU | 2530732 C2 | 10/2014 | | |
| WO | 2010/004639 A1 | 1/2010 | | |
| WO | 2010/016123 A1 | 2/2010 | | |
| WO | WO2010-113407 A1 | 7/2010 | | |
| WO | 2010/093172 A2 | 8/2010 | | |
| WO | 2011/030767 A1 | 3/2011 | | |
| WO | WO 2013/133871 A1 | 9/2013 | | |
| WO | WO 2013/137461 A1 | 9/2013 | | |
| WO | WO 2014/010919 A1 | 1/2014 | | |

OTHER PUBLICATIONS

Notice of Reasons for Refusal issued Nov. 24, 2021 in Japanese Patent Application No. 2020-160509 (with English machine translation), 10 pages.

Huawei, et al., "System impact for "Small Cell Enhancement" work in RAN," SA WG2 Meeting #101 S2-140175, Jan. 2014, 6 pages.

Decision of Refusal issued Mar. 29, 2022 in Japanese Patent Application No. 2020-160509 (with English language translation), 15 pages.

Office Action issued Feb. 2, 2019 in Chinese Patent Application No. 201480074579.4, with English-language translations, 13 pages.

Brazilian Office Action issued on May 21, 2020 in Patent Application No. BR112016017549-2 (with English translation), 6 pages.

Office Action issued Jan. 23, 2020 in corresponding Indonesian Patent Application No. P00201605021 (with English Translation), 5 pages.

Office Action issued Jun. 30, 2020 in corresponding Japanese Patent Application No. 2019-063861 (with English Translation), 10 pages.

Combined Chinese Office Action and Search Report issued on Mar. 24, 2020, in Patent Application No. 201480074579.4, 16 pages (with unedited computer generated English translation).

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", V11.7.0, Total 209 Pages, (Sep. 2013).

3GPP TS 36.304, "3$^{rd}$ Generation Partnership Project; Technical Specification Group Radio Access Network; Evolved Universal Terrestrial Radio Access (E-UTRA) ; User Equipment (UE) procedures in idle mode (Release 11)", V11.2.0, Total 33 Pages, (Dec. 2012).

3GPP TSG-SA1 #42, "LS on HNB/HeNB Open Access Mode", 3GPP SA WG1, Release-9, S1-083461, Total 2 Pages, (Oct. 13-17, 2008).

3GPP TSG-RAN WG 2 meeting #62, "LS on CSG cell identification", RAN2, R2-082899, Total 2 Pages, (May 5-9, 2008).

3GPP TR 36.814, "3$^{rd}$ Generation Partnership Project; Technical Specification Group Radio Access Network; Evolved Universal Terrestrial Radio Access (E-UTRA) ; Further advancements for E-UTRA physical layer aspects (Release 9)", V9.0.0, Total 104 Pages, (Mar. 2010).

3GPP TR 36.912, "3$^{rd}$Generation Partnership Project; Technical Specification Group Radio Access Network; Feasibility study for Further Advancements for E-UTRA (LTE-Advanced) (Release 10)", V10.0.0, Total 252 Pages, (Mar. 2011).

3GPP TR 36.819, 3$^{rd}$ Generation Partnership Project; Technical Specification Group Radio Access Network; Coordinated multipoint operation for LTE physical layer aspects (Release 11), V11.1.0, Total 69 Pages, (Dec. 2011).

3GPP TS 36.141, "3$^{rd}$ Generation Partnership Project; Technical Specification Group Radio Access Network; Evolved Universal Terrestrial Radio Access (E-UTRA); Base Station (BS) conformance testing (Release 11)", V11.1.0, Total 224 Pages, (Jun. 2012).

3GPP TSG RAN WG1 Meeting #74bis, "Views on Small Cell On/Off with Small Cell Discovery", NTT DOCOMO, R1-134496, Agenda Item: 7.2.6.1.1, Total 5 Pages, (Oct. 7-11, 2013).

3GPP TSG RAN WG1 Meeting #73, "Analysis and design considerations of cell on/off in small cell", LG Electronics, R1-132236, Agenda Item: 6.2.5.1.2, Total 6 Pages, (May 20-24, 2013).

International Search Report Issued Mar. 10, 2015 in PCT/JP14/083260 Filed Dec. 16, 2014.

International Preliminary Report on Patentability and Written Opinion issued on Aug. 11, 2016 in PCT/JP2014/083260 (with English language translation).

(56) References Cited

OTHER PUBLICATIONS

Extended Search Report issued in European Patent Application No. 14880990.8.

Mitsubishi Electric, "Dynamic Setup of HNBs for Energy Savings and interference Reduction", 3GPP TSG RAN WG3 Meeting #61, Aug. 18-22, 2008, R3-081949, 7 pages.

Combined Office Action and Search Report issued Feb. 26, 2018 in Russian Patent Application No. 2016135225/07(055098), with English-language Translation, 12 pages.

Office Action issued Apr. 19, 2018 in Mexican Patent Application No. MX/a/2016/010003, with English-language Translation, 4 pages.

Office Action issued Aug. 7, 2018 in Japanese Patent Application No. 2015-559777 (with English translation).

Office Action issued Nov. 16, 2018 in European Patent Application No. 14 880 990.8, 5 pages. (The reference cited therein was previously filed.).

Office Action issued Nov. 27, 2018 in Japanese Patent Application No. 2015-559777, with English-language translation, 7 pages.

Office Action issued Dec. 11, 2018 in Russian Patent Application No. 2018130580/07(049674), with English-language translation, 11 pages. (The references cited therein were previously filed.).

Samsung, Summary of the issues on the overlaid scenario for energy saving, 3GPP TSG-RAN WG3 Meeting #79bis, R3-130778, 3GPP, Apr. 20, 2013, 5 pages.

Office Action issued Jul. 18, 2019 in Chinese Patent Application No. 201480074579.4, with English-language translation, 10 pages. (The references cited therein were previously filed.).

Office Action issued Oct. 21, 2019 in Chinese Patent Application No. 201480074579.4, with English-language translation, 10 pages. (The reference(s) cited therein were previously filed.).

Office Action issued Nov. 22, 2019 in European Patent Application No. 14 880 990.8, 4 pages. (The reference(s) cited therein were previously filed.).

Japanese Office Action dated Feb. 4, 2020 in Japanese Patent Application No. 2019-063861 with translation.

Mitsubishi Electric Energy Saving for HeNBs, 3GPP TSG-RAN WG3#66bisR3-100201, 3GPP, Jan. 15, 2010.

ZTE Further considerations on enhanced transition procedures of small cell on/off scheme, 3GPP TSG / RAN WG1#75 R1 135350,3GPP,Nov. 2, 2013.

Office Action issued Nov. 14, 2022, in corresponding Brazilian Patent Application No. BR122020017236-3 (with English Translation), 9 pages.

Japanese Office Action issued Apr. 11, 2023, in Japanese Patent Application No. 2022-102421, therein, 9 pages (with English Translation).

NEC Corporation, "Energy Saving Enhancement Study—Solution Evaluations and Way Forward", 3GPP TSG-RAN WG3#82, R3-132157, 2013, 8 total pages.

Huawei, "QoS for Overlapping ES", 3GPP TSG-RAN WG3#79bis, R3-130613, 2013, 4 total pages.

Alcatel-Lucent, "Solution Proposal for Differentiated Energy Saving Strategies", 3GPP TSG RAN WG3#82, R3-132186, 2013, 5 total pages.

China Unicom, "User Performance Requirements of Overlaid Coverage Energy Saving Scenario", 3GPP TSG RAN WG3#82, R3-132173, 2013, 5 total pages.

CATT, "Solution on Switch Off Enhancement with User Experience Considered", 3GPP TSG RAN WG3#81bis, R3-131704, 2013, 5 total pages.

CATT, "Switch Off Enhancement with UE QoS Requirement Considered", 3GPP TSG RAN WG3#81, R3-131217, 2013, 5 total pages.

SA2 Chairman, "eMPS Subscription Data Clarification", 3GPP TSG SA #50, SP-100855, 2010, 6 total pages.

Office Action issued Mar. 10, 2023, in corresponding European Patent Application No. 21 159 532.7, 6 pages.

Combined Chinese Office Action & Search Report issued Oct. 11, 2023 in Chinese Application 202011124505.0, (with English translation), 15 pages.

European Patent Office, Extended European Search Report, Application No. EP 23186108.9-1206, dated Oct. 6, 2023, in 10 pages.

Japanese Office Action issued Aug. 1, 2023 in Japanese Application 2022-102421 (with unedited computer-generated English Translation), 11 pages.

Chinese Patent Office, Office Action, Application No. 202011124505.0, dated Mar. 22, 2024, in 17 pages.

Chinese Patent Office, Office Action, Application No. 202011124505.0, dated Oct. 30, 2024, in 16 pages.

* cited by examiner

BACKGROUND

F I G. 5
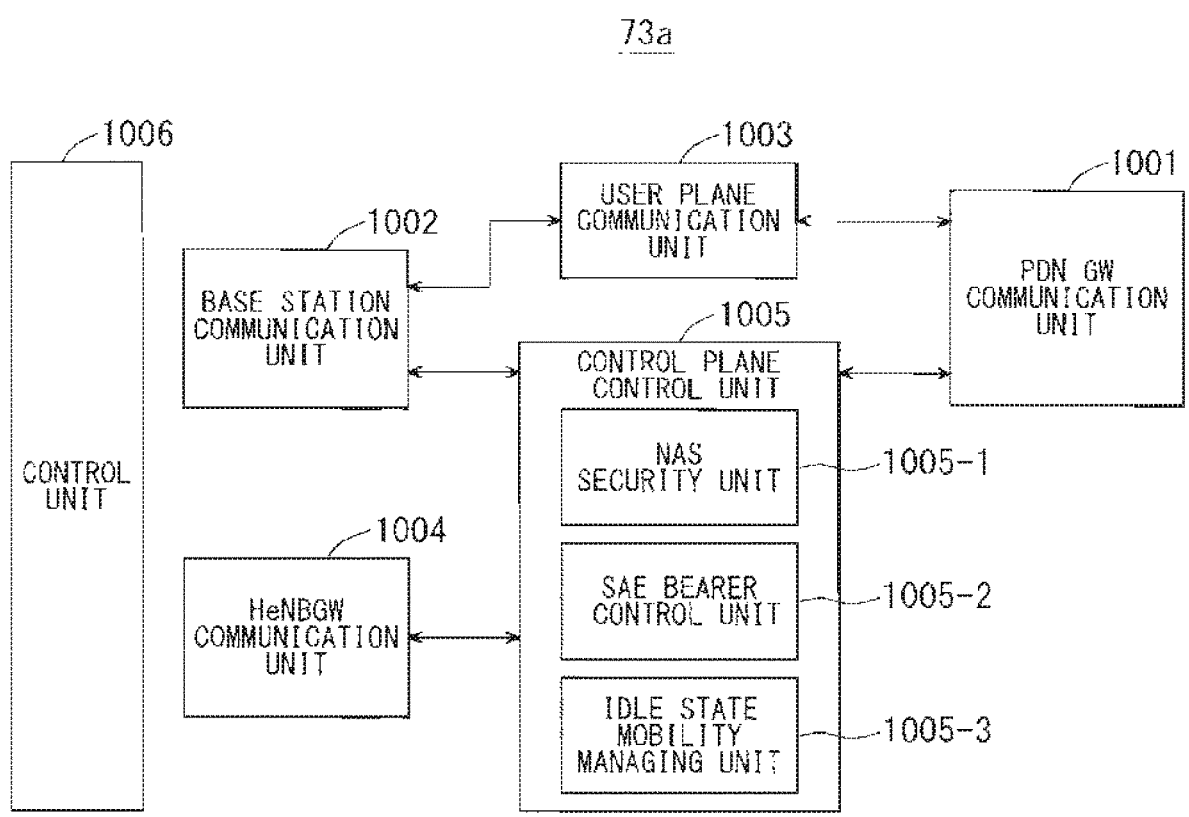

F I G . 6
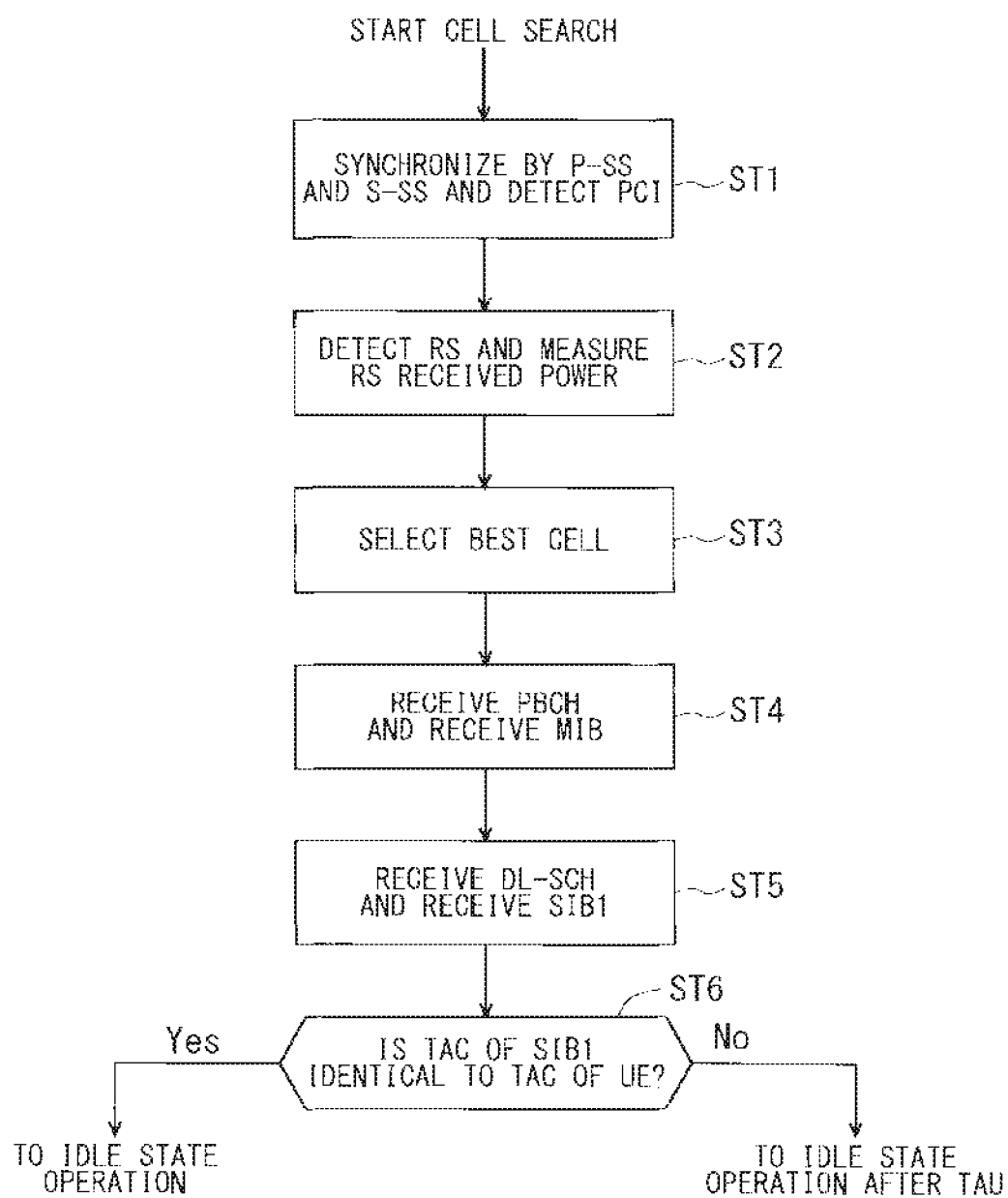

F I G . 8
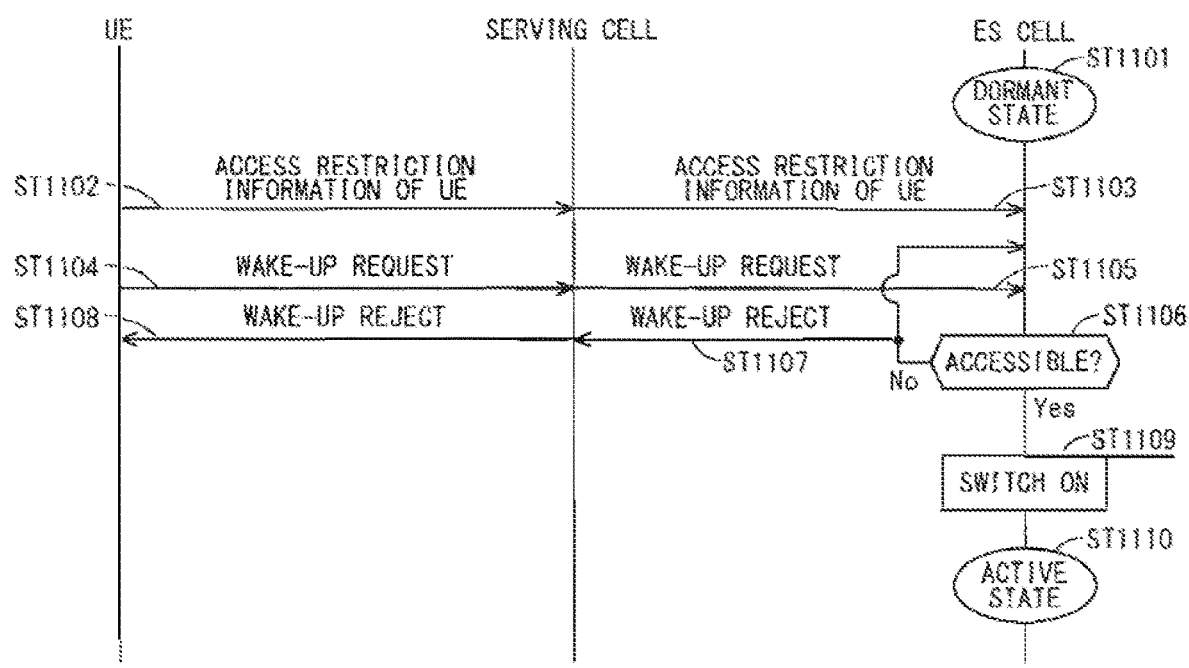

F I G. 9
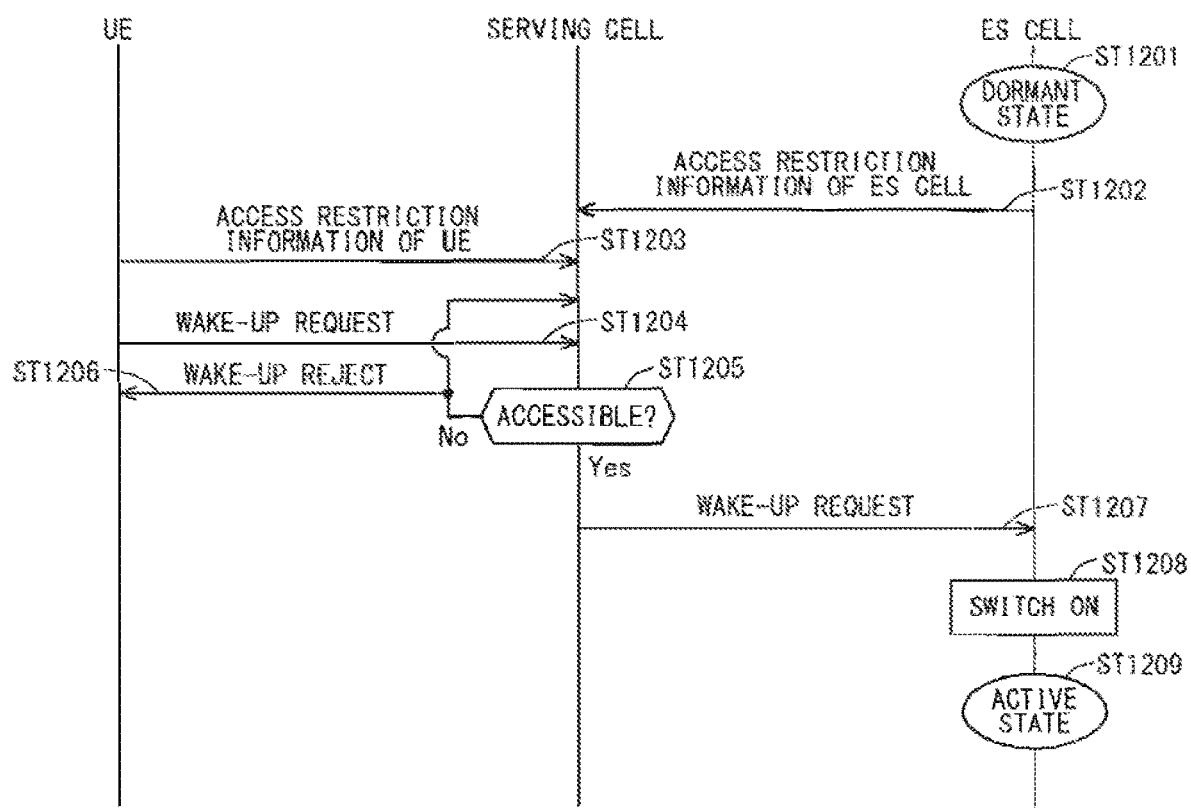

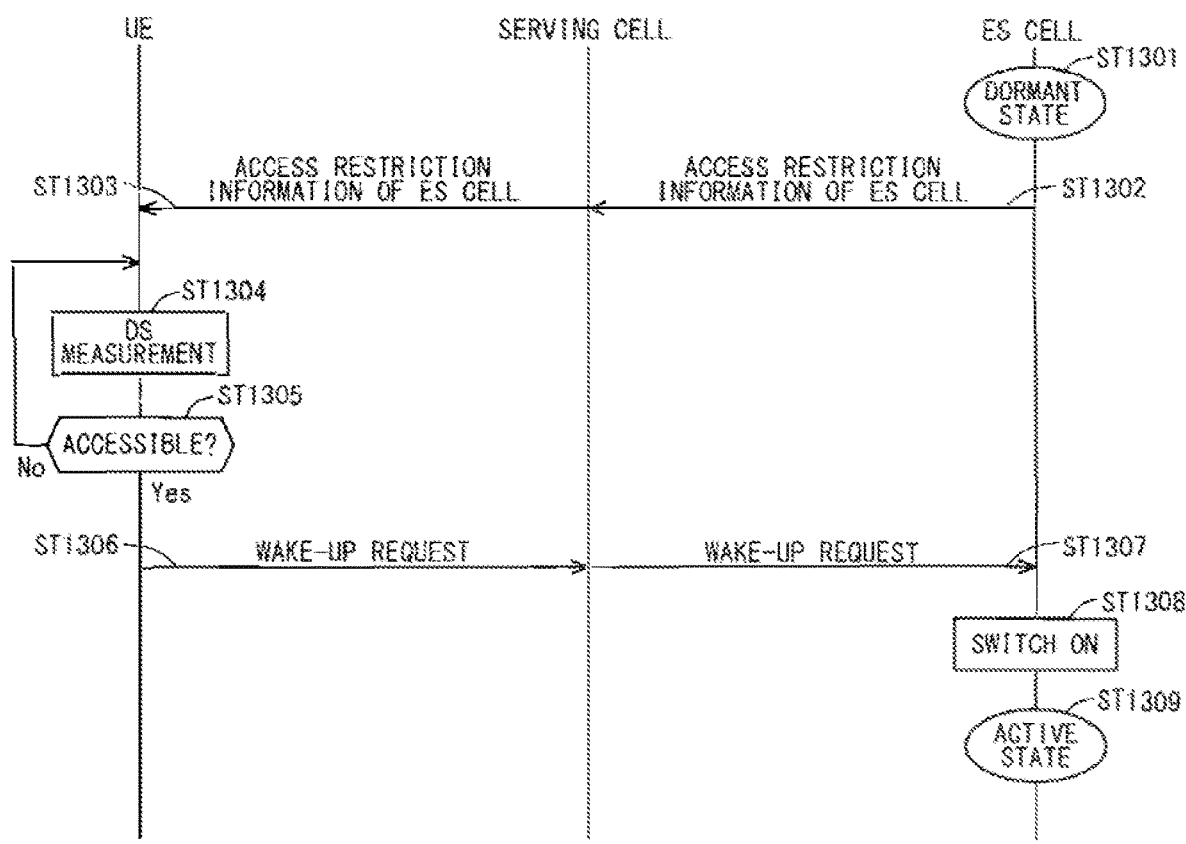

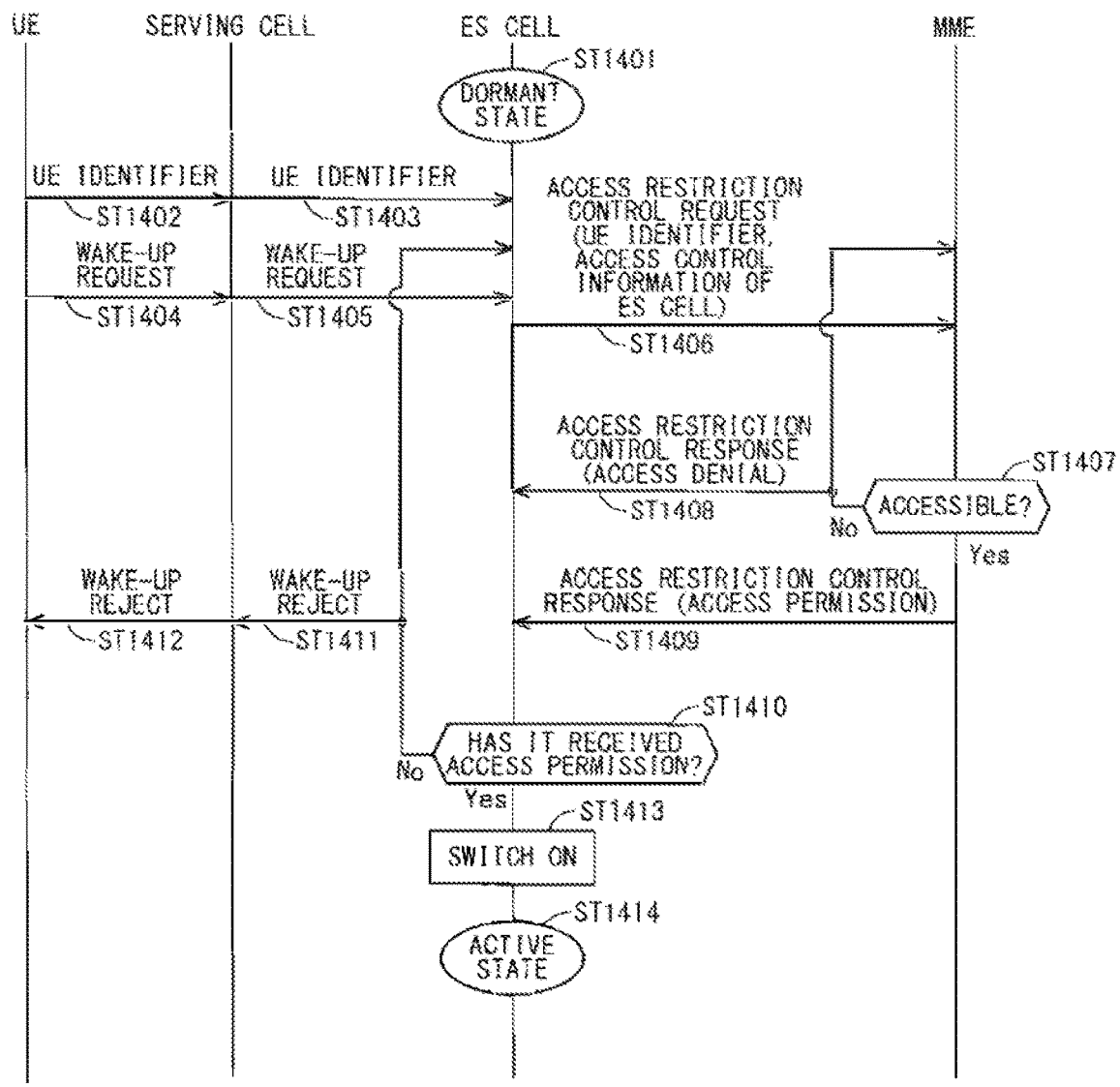
F I G . 1 1

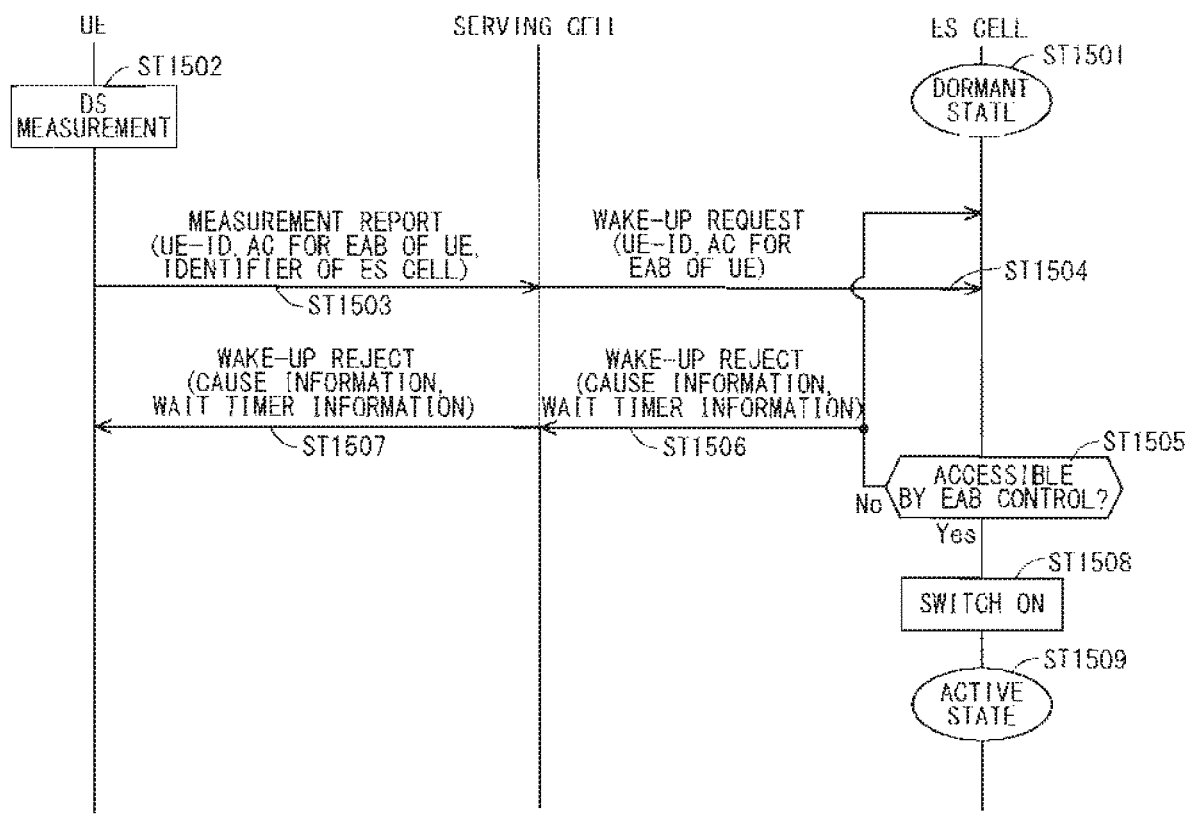
F I G . 1 2

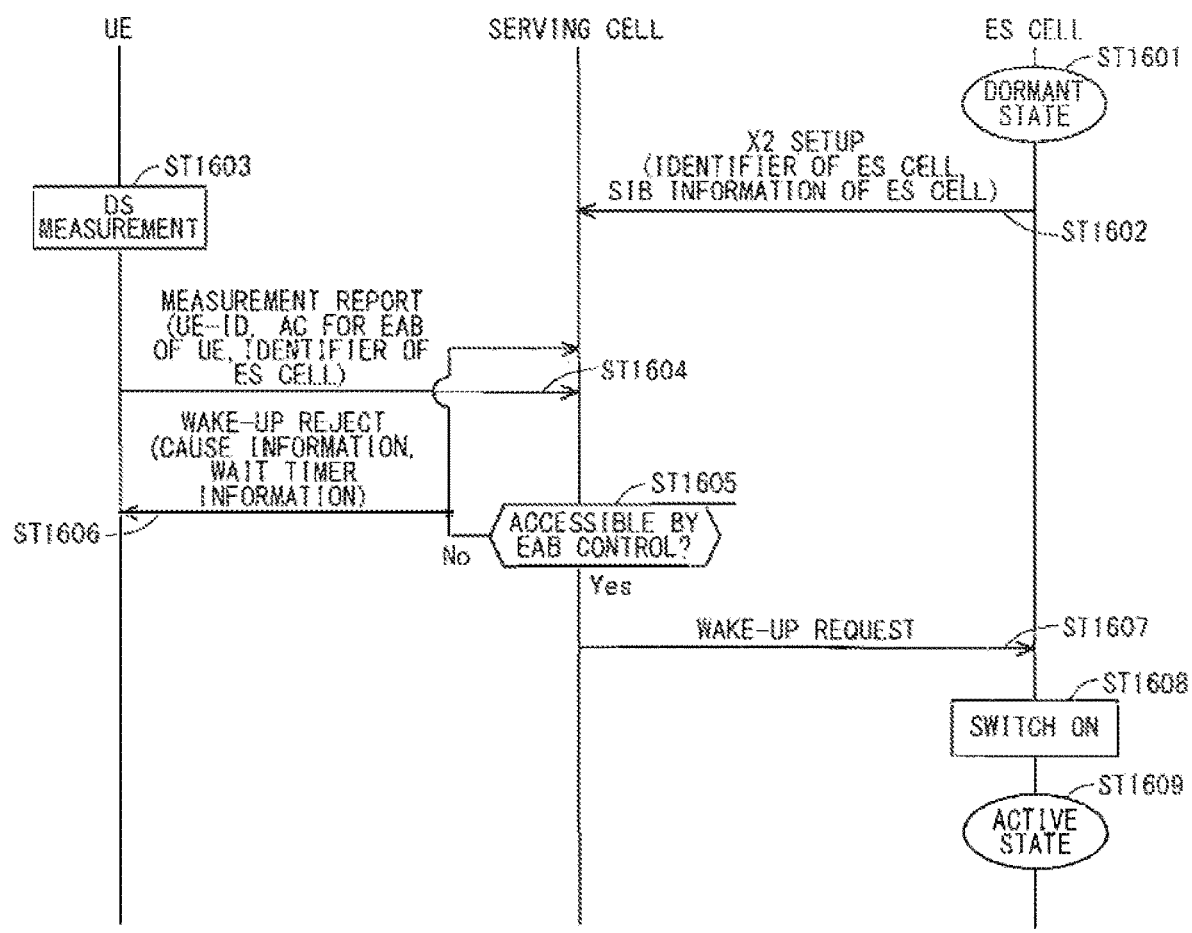
F I G . 1 3

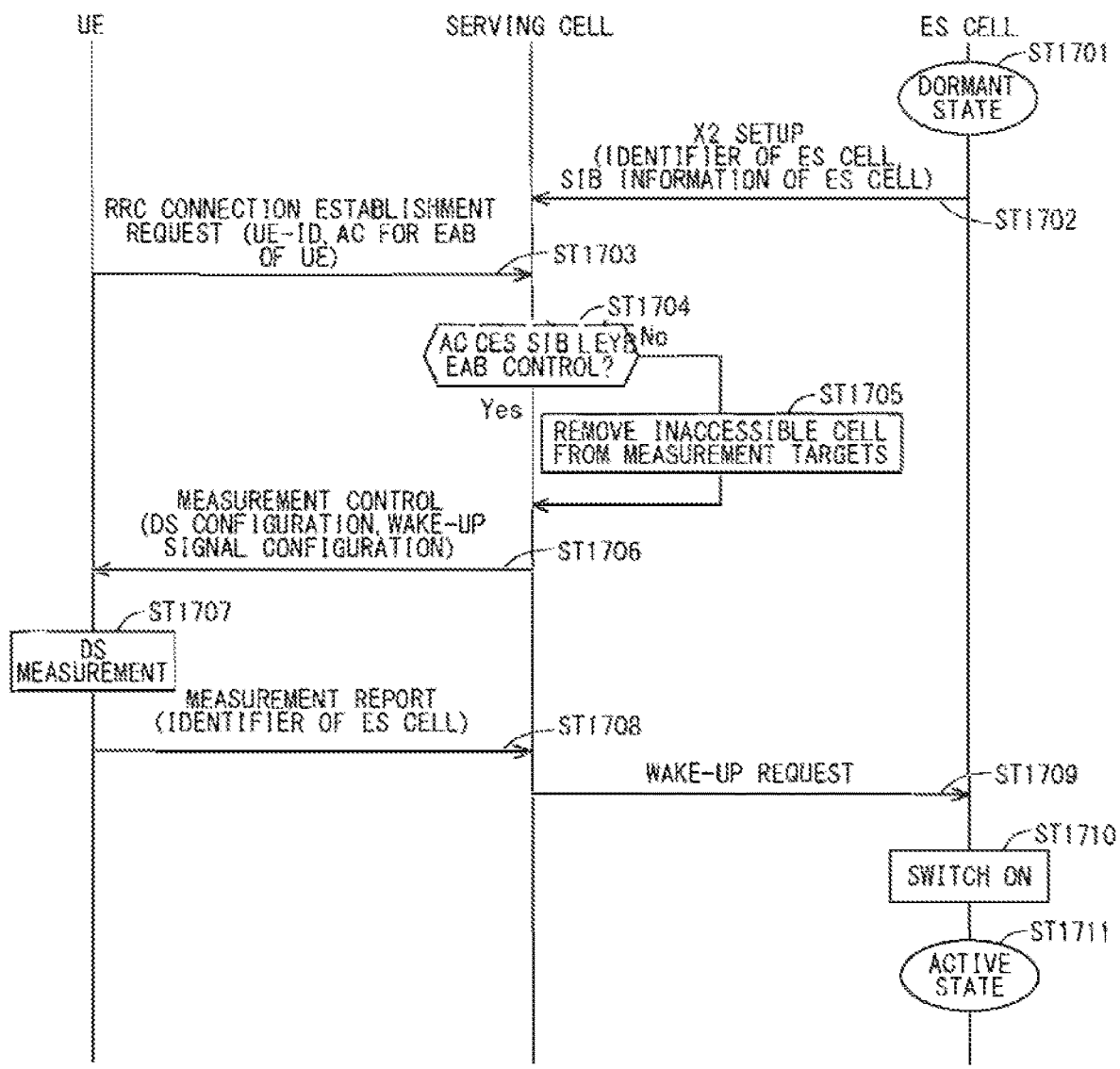
F I G . 1 4

F I G. 1 6
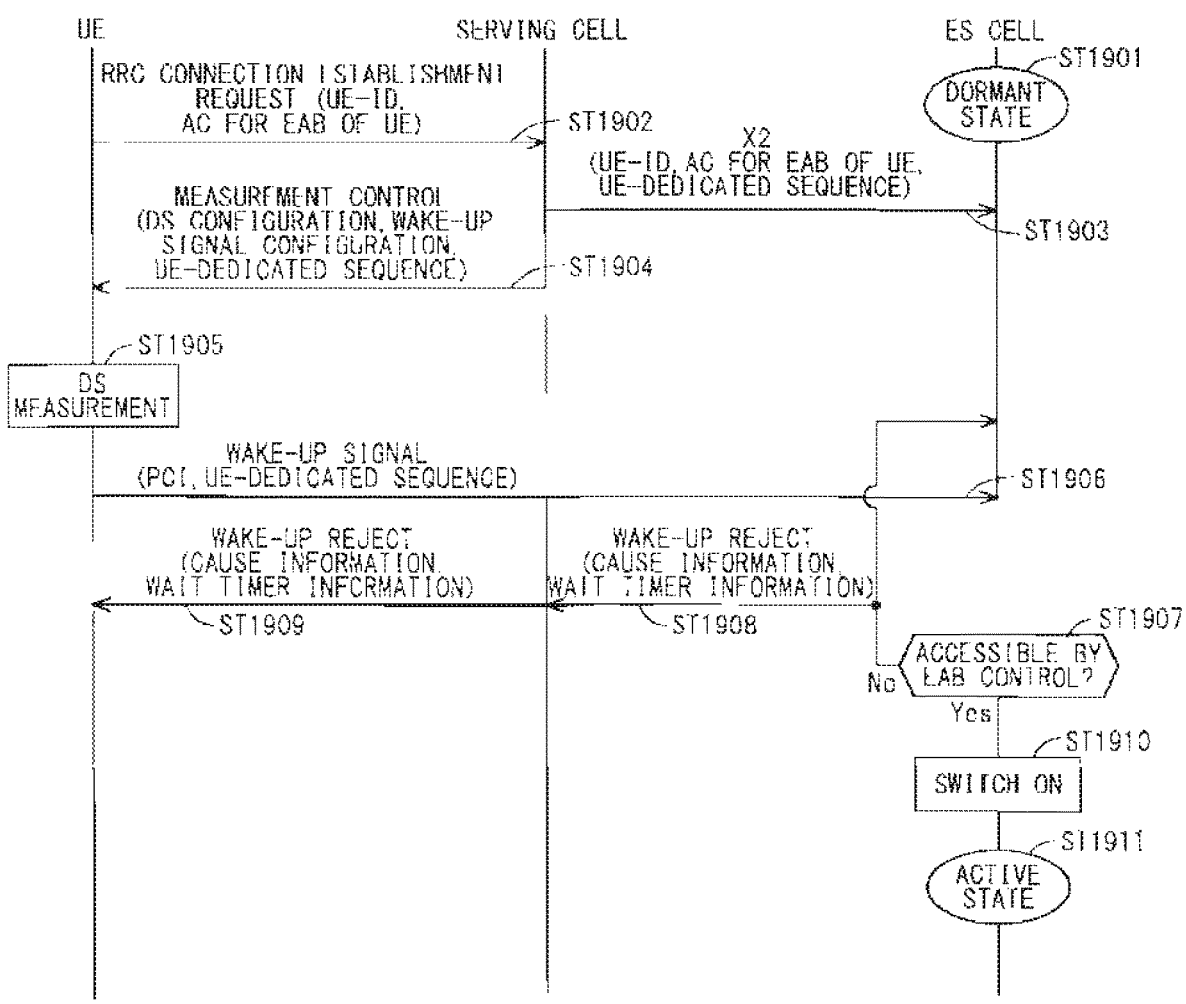

COMMUNICATION SYSTEM, COMMUNICATION TERMINAL DEVICE, FIRST BASE STATION DEVICE AND SECOND BASE STATION DEVICE

CROSS-REFERENCE TO RELATED APPLICATIONS

This application is a continuation of U.S. application Ser. No. 16/787,524 filed Feb. 11, 2020, which is a continuation of U.S. application Ser. No. 15/655,268 filed Jul. 20, 2017, now granted as U.S. Pat. No. 10,652,818, issued May 12, 2020, which is a continuation of U.S. application Ser. No. 15/111,734 filed Jul. 14, 2016, now granted as U.S. Pat. No. 9,860,836, issued Jan. 2, 2018, which is a National Phase of PCT/JP2014/083260 filed Dec. 16, 2014, and claims priority to Japanese Patent Application No. 2014-017100 filed Jan. 31, 2014. The entire contents of each of these documents are incorporated herein by reference.

TECHNICAL FIELD

The present invention relates to a communication system in which radio communication is performed between a communication terminal device and a base station device.

BACKGROUND ART

The 3rd generation partnership project (3GPP), the standard organization regarding the mobile communication system, is studying new communication systems referred to as long term evolution (LTE) regarding radio sections and system architecture evolution (SAE) regarding the overall system configuration including a core network and a radio access network, which will be hereinafter collectively referred to as a network as well (for example, see Non-Patent Documents 1 to 10). This communication system is also referred to as 3.9 generation (3.9 G) system.

As the access scheme of the LTE, orthogonal frequency division multiplexing (OFDM) is used in a downlink direction and single carrier frequency division multiple access (SC-FDMA) is used in an uplink direction. Further, differently from the wideband code division multiple access (W-CDMA), circuit switching is not provided but a packet communication system is only provided in the LTE.

The current decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal (SS) per radio frame. The synchronization signals are classified into a primary synchronization signal (P-SS) and a secondary synchronization signal (S-SS).

Non-Patent Document 1 (Chapter 5) describes the current decisions by 3GPP regarding the channel configuration in the LTE system. It is assumed that the same channel configuration is used in a closed subscriber group (CSG) cell as that of a non-CSG cell.

A physical broadcast channel (PBCH) is a channel for downlink transmission from a base station to a user equipment. A BCH transport block is mapped to four subframes within a 40 ms interval. There is no explicit signaling indicating 40 ms timing.

A physical control format indicator channel (PCFICH) is a channel for downlink transmission from a base station to a user equipment. The PCFICH notifies the number of orthogonal frequency division multiplexing (OFDM) symbols used for PDCCHs from the base station to the user equipment. The PCFICH is transmitted per subframe.

A physical downlink control channel (PDCCH) is a channel for downlink transmission from a base station to a user equipment. The PDCCH notifies the resource allocation information for downlink shared channel (DL-SCH) that is one of the transport channels described below, resource allocation information for a paging channel (PCH) that is one of the transport channels described below, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from a base station to a user equipment. A downlink shared channel (DL-SCH) that is a transport channel and a PCH that is a transport channel are mapped to the PDSCH.

A physical multicast channel (PMCH) is a channel for downlink transmission from a base station to a user equipment. A multicast channel (MCH) that is a transport channel is mapped to the PMCH.

A physical uplink control channel (PUCCH) is a channel for uplink transmission from a user equipment to a base station. The PUCCH carries Ack/Nack that is a response signal to downlink transmission. The PUCCH carries a channel quality indicator (CQI) report. The CQI is quality information indicating the quality of received data or channel quality. Additionally, the PUCCH carries a scheduling request (SR).

A physical uplink shared channel (PUSCH) is a channel for uplink transmission from a user equipment to a base station. An uplink shared channel (UL-SCH) that is one of the transport channels is mapped to the PUSCH.

A physical hybrid ARQ indicator channel (PHICH) is a channel for downlink transmission from a base station to a user equipment. The PHICH carries Ack/Nack that is a response signal to uplink transmission. A physical random access channel (PRACH) is a channel for uplink transmission from the user equipment to the base station. The PRACH carries a random access preamble.

A downlink reference signal (RS) is a known symbol in the LTE communication system. The following five types of downlink reference signals are defined: cell-specific reference signals (CRSs), MBSFN reference signals, data demodulation reference signals (DM-RSs) that are UE-specific reference signals, positioning reference signals (PRSs), and channel-state information reference signals (CSI-RSs). The physical layer measurement objects of a user equipment include reference signal received power (RSRP).

The transport channels described in Non-Patent Document 1 (Chapter 5) will be described. A broadcast channel (BCH) among the downlink transport channels is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of multimedia broadcast multicast service (MBMS) services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception result of the first transmission and the reception result of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in the case where the user equipments have no RRC connection with the network. In the downlink direction, the CCCH is mapped to the downlink shared channel (DL-SCH) that is a transport channel. In the uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel that transmits dedicated control information between a user equipment and a network on a point-to-point basis. The DCCH is used when the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identifier. ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed use are specified by an operator (hereinafter also referred to as a "cell for specific subscribers"). The specified subscribers are allowed to access one or more cells of a public land mobile network (PLMN). One or more cells to which the specified subscribers are allowed access are referred to as "CSG cell(s)". Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in the LTE communication system. The CSG-IDs are used by user equipments (UEs) for making access from CSG-related members easier.

The locations of user equipments are tracked based on an area composed of one or more cells. The locations are tracked for enabling tracking the locations of user equipments and calling user equipments, in other words, incoming calling to user equipments even in an idle state. An area for tracking locations of user equipments is referred to as a tracking area.

3GPP has studied base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 3 discloses three different modes of the access to the HeNB and HNB. Specifically, an open access mode, a closed access mode, and a hybrid access mode are disclosed.

The individual modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is a cell that supports both the open access mode and the closed access mode.

In 3GPP, among all physical cell identities (PCIs), there is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to user equipments being served thereby. Being served by a base station means taking the base station as a serving cell.

Non-Patent Document 4 discloses the basic operation of a user equipment using PCI split. The user equipment that does not have the PCI split information needs to perform cell search using all PCIs, for example, using all 504 codes. On the other hand, the user equipment that has the PCI split information is capable of cell search using the PCI split information.

Further, 3GPP has pursued specifications standard of long term evolution advanced (LTE-A) as Release 10 (see Non-Patent Documents 5 and 6). The LTE-A is based on the LTE radio communication system and is configured by adding several new techniques to the system.

Carrier aggregation (CA) is studied for the LTE-A system, in which two or more component carriers (CCs) are aggregated to support wider transmission bandwidths up to 100 MHz.

In the case where CA is configured, a UE has a single RRC connection with a network (NW). In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

The new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 7.

3GPP has pursued specifications standard of Release 12, where the use of small eNBs configuring a small cell is studied to satisfy a tremendous volume of traffic in the future. Examples of the study include the technique of increasing spectral efficiency through installation of a large number of small eNBs to configure a large number of small cells, thereby increasing communication capacity.

The traffic flow of a mobile network is on the rise, and the communication rate is also increasing. It is expected that the communication rate will be further increased when the operations of the LTE and the LTE-A are fully initiated, leading to an increase in traffic flow.

PRIOR ART DOCUMENTS

Non-Patent Documents

Non-Patent Document 1: 3GPP TS 36.300 V11.7.0
Non-Patent Document 2: 3GPP TS 36.304 V11.2.0
Non-Patent Document 3: 3GPP S1-083461
Non-Patent Document 4: 3GPP R2-082899
Non-Patent Document 5: 3GPP TR 36.814 V9.0.0
Non-Patent Document 6: 3GPP TR 36.912 V10.0.0
Non-Patent Document 7: 3GPP TR 36.819 V11.1.0
Non-Patent Document 8: 3GPP TS 36.141 V11.1.0
Non-Patent Document 9: 3GPP R1-134496
Non-Patent Document 10: 3GPP R1-132236

SUMMARY OF INVENTION

Problem to be Solved by the Invention

When a large number of small cells are installed, problems of increased interference and increased power consumption arise. To solve these problems, 3GPP has studied a technique of switching on a cell (hereinafter also referred to as "cell on") and switching off a cell (hereinafter also referred to as "cell off"). For example, studied as the technique of semi-static cell on and cell off is a technique of judging whether a UE is located adjacent to an energy saving cell (abbreviated as an ES cell) and switching on the ES cell in a dormant state that is an energy saving state.

In the access restriction method of the conventional technique, a UE switches on an ES cell by receiving the system information of the cell. The conventional technique is based on the premise that an ES cell in the dormant state transmits only a discovery signal (abbreviated as DS) for detecting its own cell and does not broadcast a system information block (abbreviated as SIB). Also when a UE without right to access an ES cell comes closer to the ES cell, thus, the ES cell in the dormant state is inevitably switched on.

Switching on the ES cell in the dormant state when the UE without access right comes closer to the ES cell leads to unnecessary processing time for switch on, consuming a large amount of power. Also, signalings for switch on increase unnecessarily.

To prevent the ES cell in the dormant state from switching itself on unnecessarily, a new mechanism is required that enables access restriction.

3GPP has not discussed the MBMS provided in an ES cell capable of cell on and cell off. When the ES cell provides the MBMS, the ES cell may be subjected to cell off even though a UE receiving the MBMS from the ES cell is present. When the UE has received the MBMS from the ES cell, the MBMS received quality of the UE is degraded, or the MBMS cannot be received. As described above, cell off of the ES cell causes a problem of degraded MBMS received quality or failed reception of the MBMS.

The present invention has an object to provide a communication system capable of preventing unnecessary switching of an energy saving cell between a normal operation state and an energy saving state.

Means to Solve the Problem

A communication system of the present invention is a communication system including a communication terminal device and a base station device that configures at least one cell capable of radio communication with the communication terminal device. The at least one cell includes an energy saving cell switchable between a normal operation state and an energy saving state in which power consumption is lower than in the normal operation state. When the energy saving cell is in the energy saving state, access restriction control is executed to judge whether the communication terminal device is allowed to access the energy saving cell, and when it is judged that the communication terminal device is allowed to access the energy saving cell by the access restriction control, a wake-up process of shifting the energy saving cell from the energy saving state to the normal operation state is performed.

Effects of the Invention

According to the communication system of the present invention, the communication system is composed of the communication terminal device and the base station device that configures the cell capable of radio communication with the communication terminal device. The communication system includes, as the cell, the energy saving cell switchable between the normal operation state and the energy saving state. When the energy saving cell is in the energy saving state, access restriction control is executed to judge whether the communication terminal device can access the energy saving cell. When it is judged that access can be made, the wake-up process is executed, so that the energy saving cell shifts from the energy saving state to the normal operation state. This restricts a wake-up process attributable to a communication terminal device without right to access the energy saving cell. This prevents unnecessary switching of the energy saving cell between the normal operation state and the energy saving state.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a block diagram showing the configuration of an NME according to the present invention.

FIG. 6 is a flowchart showing an outline from a cell search to an idle state operation performed by a user equipment (UE) in the LTE communication system.

FIG. 8 shows an example sequence of a wake-up process in a communication system of a first embodiment.

FIG. 9 shows an example sequence of a wake-up process in a communication system of a first modification of the first embodiment.

FIG. 10 shows an example sequence of a wake-up process in a communication system of a second modification of the first embodiment.

FIG. 11 shows an example sequence of a wake-up process in a communication system of a third modification of the first embodiment.

FIG. 12 shows an example sequence of a wake-up process in a communication system of a second embodiment.

FIG. 13 shows an example sequence of a wake-up process in a communication system of a first modification of the second embodiment.

FIG. 14 shows an example sequence of a wake-up process in a communication system of a second modification of the second embodiment.

FIG. 16 shows an example sequence of a wake-up process in a communication system of a third embodiment.

DESCRIPTION OF EMBODIMENTS

First Embodiment

Figure 1:
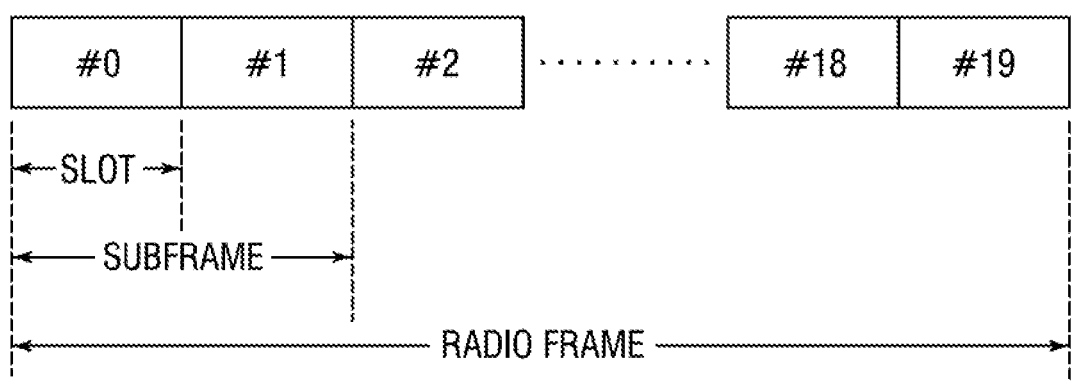
FIG. 1 is a diagram illustrating the configuration of a radio frame for use in an LTE communication system.
Figure 2:
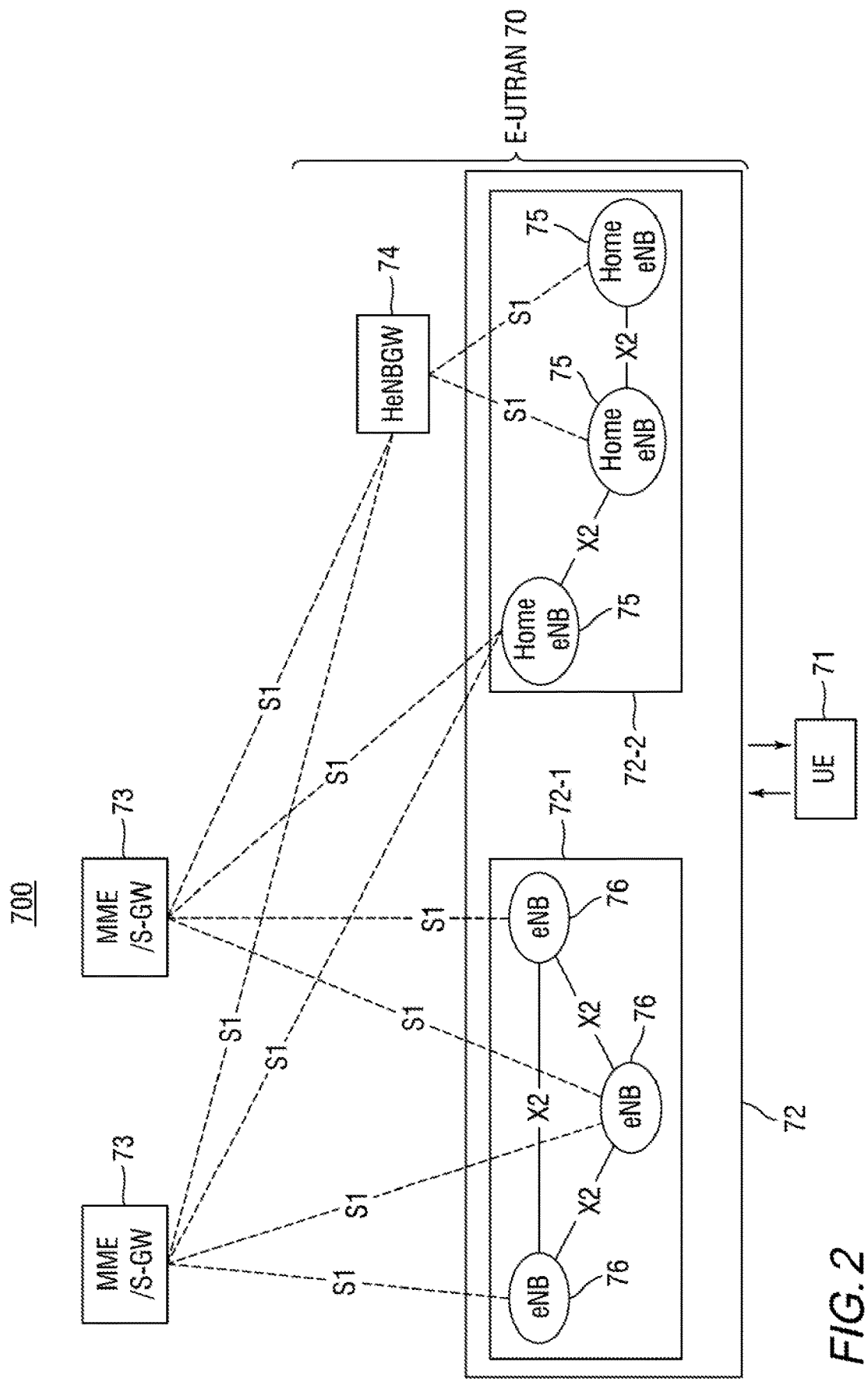
FIG. 2 is a block diagram showing the overall configuration of an LTE communication system 700 under discussion of 3GPP.

FIG. 2 is a block diagram showing an overall configuration of an LTE communication system 700, which is under discussion of 3GPP. FIG. 2 will be described. A radio access network is referred to as an evolved universal terrestrial radio access network (E-UTRAN) 70. A user equipment device (hereinafter referred to as a "user equipment (UE)") 71 that is a communication terminal device is capable of radio communication with a base station device (hereinafter referred to as a "base station (E-UTRAN Node B: eNB)") 72 and transmits and receives signals through radio communication.

The E-UTRAN is composed of one or a plurality of base stations 72, provided that a control protocol for a user equipment 71 such as a radio resource control (RRC), and user planes such as a packet data convergence protocol (PDCP), radio link control (RLC), medium access control (MAC), or physical layer (PHY) are terminated in the base station 72.

The control protocol radio resource control (RRC) between the user equipment 71 and the base station 72 performs broadcast, paging, RRC connection management, and the like. The states of the base station 72 and the user equipment 71 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting/receiving data to/from a network. In RRC_CONNECTED, for example, handover (HO) and measurement of a neighbor cell are performed.

The base stations 72 are classified into eNBs 76 and Home-eNBs 75. The communication system 700 includes an eNB group 72-1 including a plurality of eNBs 76 and a Home-eNB group 72-2 including a plurality of Home-eNBs 75. A system, composed of an evolved packet core (EPC) that is a core network and an E-UTRAN 70 that is a radio access network, is referred to as an evolved packet system (EPS). The EPC that is a core network and the E-UTRAN 70 that is a radio access network may be collectively referred to as a "network".

The eNB 76 is connected to an MME/S-GW unit (hereinafter also referred to as an "MME unit") 73 including a mobility management entity (MME), a serving gateway (S-GW), or an MME and an S-GW by means of an S1 interface, and control information is communicated between the eNB 76 and the MME unit 73. A plurality of MME units 73 may be connected to one eNB 76. The eNBs 76 are connected to each other by means of an X2 interface, and control information is communicated between the eNBs 76.

The Home-eNB 75 is connected to the MME unit 73 by means of an S1 interface, and control information is communicated between the Home-eNB 75 and the MME unit 73. A plurality of Home-eNBs 75 are connected to one MME unit 73. Or, the Home-eNBs 75 are connected to the MME units 73 through a Home-eNB gateway (HeNBGW) 74. The Home-eNB 75 is connected to the HeNBGW 74 by means of an S1 interface, and the HeNBGW 74 is connected to the MME unit 73 through an S1 interface.

One or a plurality of Home-eNBs 75 are connected to one HeNBGW 74, and information is communicated therebetween through an S1 interface. The HeNBGW 74 is connected to one or a plurality of MME units 73, and information is communicated therebetween through an S1 interface.

The MME units 73 and HeNBGW 74 are entities of higher layer, specifically, higher nodes, and control the connections between the user equipment (UE) 71 and the eNB 76 and the Home-eNB 75 that are base stations. The MME units 73 configure an EPC that is a core network. The base station 72 and the HeNBGW 74 configure an E-UTRAN 70.

Further, 3GPP has studied the configuration below. The X2 interface between the Home-eNBs 75 is supported. In other words, the Home-eNBs 75 are connected to each other by means of an X2 interface, and control information is communicated between the Home-eNBs 75. The HeNBGW 74 appears to the MME unit 73 as the Home-eNB 75. The HeNBGW 74 appears to the Home-eNB 75 as the MME unit 73.

The interfaces between the Home-eNBs 75 and the MME units 73 are the same, which are the S1 interfaces, in both cases where the Home-eNB 75 is connected to the MME unit 73 via the HeNBGW 74 and it is directly connected to the MME unit 73.

The base station device 72 may configure a single cell or a plurality of cells. Each cell has a range predetermined as a coverage in which the cell can communicate with a communication terminal device and performs radio communication with the communication terminal device within the coverage. In the case where one base station device configures a plurality of cells, every cell is configured to communicate with a user equipment.

Figure 3:
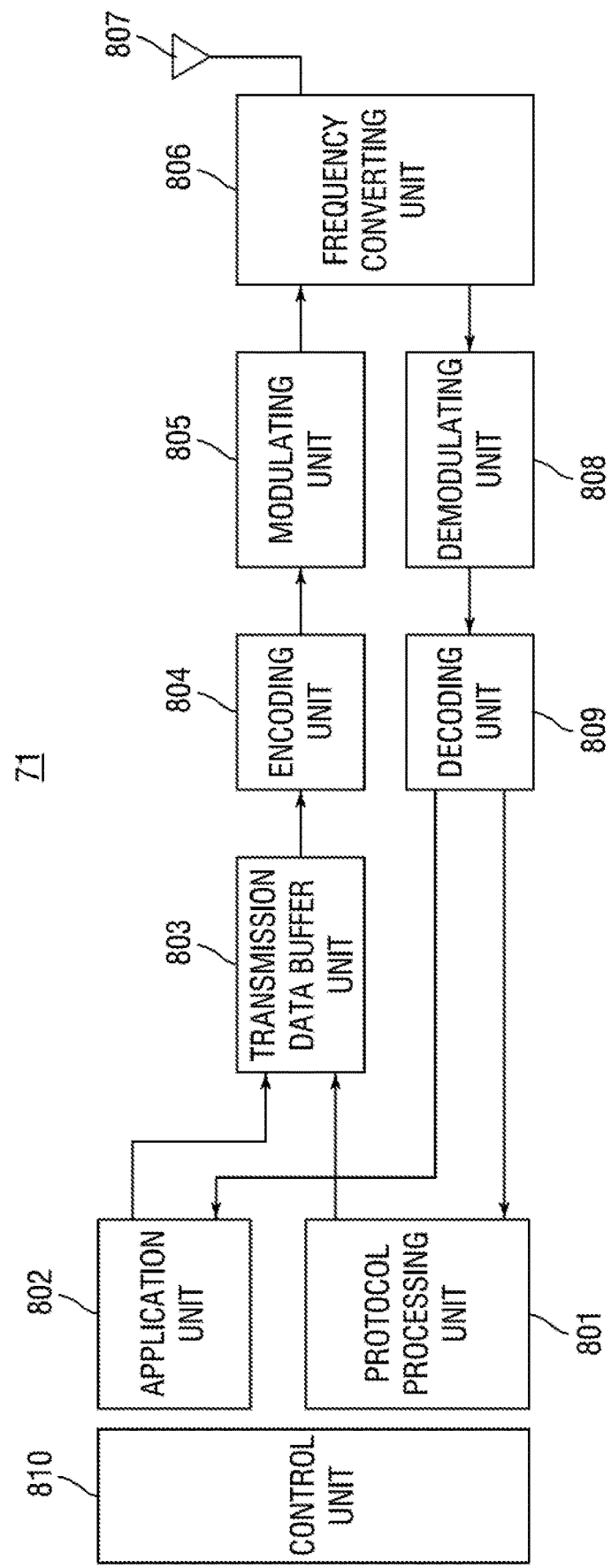
FIG. 3 is a block diagram showing the configuration of a user equipment 71 shown in FIG. 2, which is a user equipment according to the present invention.

FIG. 3 is a block diagram showing the configuration of the user equipment 71 of FIG. 2, which is a user equipment according to the present invention. The transmission process of the user equipment 71 shown in FIG. 3 will be described. First, the control data from a protocol processing unit 801 and the user data from an application unit 802 are stored in a transmission data buffer unit 803. The data stored in the transmission data buffer unit 803 is passed to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is converted into a baseband signal, and the baseband signal is output to a frequency converting unit 806 and is then converted into a radio transmission frequency. After that, a transmission signal is transmitted from an antenna 807 to the base station 72.

The user equipment 71 executes the reception process as follows. A radio signal from the base station 72 is received through the antenna 807. The received signal is converted from a radio reception frequency into a baseband signal by the frequency converting unit 806 and is then demodulated by a demodulating unit 808. The demodulated data is passed to a decoding unit 809 and is subjected to a decoding process such as error correction. Among the pieces of decoded data, the control data is passed to the protocol processing unit 801, while the user data is passed to the application unit 802. A series of processes of the user equipment 71 is controlled by a control unit 810. This means that, though not shown in FIG. 3, the control unit 810 is connected to the individual units 801 to 809.

Figure 4:
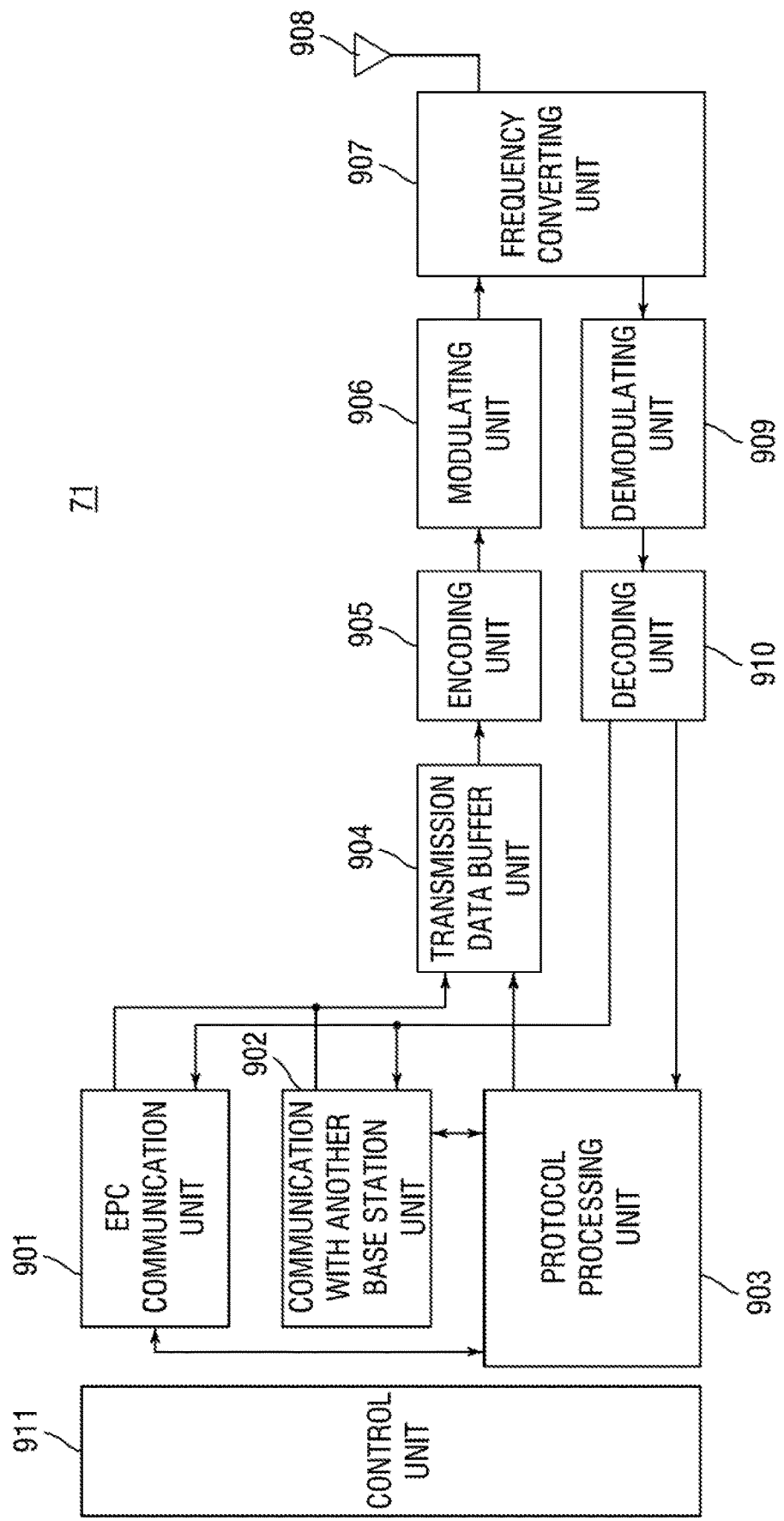
FIG. 4 is a block diagram showing the configuration of a base station 72 shown in FIG. 2, which is a base station according to the present invention.

FIG. 4 is a block diagram showing the configuration of the base station 72 of FIG. 2, which is a base station according to the present invention. The transmission process of the base station 72 shown in FIG. 4 will be described. An EPC communication unit 901 performs data transmission and reception between the base station 72 and the EPC (such as the MME unit 73), HeNBGW 74, and the like. A communication with another base station unit 902 performs data transmission and reception to and from another base station. The EPC communication unit 901 and the communication with another base station unit 902 each transmit and receive information to and from a protocol processing unit 903. The control data from the protocol processing unit 903, and the user data and the control data from the EPC communication unit 901 and the communication with another base station unit 902 are stored in a transmission data buffer unit 904.

The data stored in the transmission data buffer unit 904 is passed to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is converted into a baseband signal, and the baseband signal is output to a frequency converting unit 907 and is then converted into a radio transmission frequency. After that, a transmission signal is transmitted from an antenna 908 to one or a plurality of user equipments 71.

The reception process of the base station 72 is executed as follows. Radio signals from one or a plurality of user equipments 71 are received through the antenna 908. The received signal is converted from a radio reception frequency into a baseband signal by the frequency converting unit 907, and is then demodulated by a demodulating unit 909. The demodulated data is passed to a decoding unit 910 and is then subjected to a decoding process such as error correction. Among the pieces of decoded data, the control data is passed to the protocol processing unit 903, the EPC communication unit 901, or the communication with another base station unit 902, while the user data is passed to the EPC communication unit 901 and the communication with another base station unit 902. A series of processes by the base station 72 is controlled by a control unit 911. This means that, though not shown in FIG. 4, the control unit 911 is connected to the individual units 901 to 910.

FIG. 5 is a block diagram showing the configuration of the MME according to the present invention. FIG. 5 shows the configuration of an MME 73a included in the MME unit 73 shown in FIG. 2 described above. A PDN GW communication unit 1001 performs data transmission and reception between the MME 73a and the PDN GW. A base station communication unit 1002 performs data transmission and reception between the MME 73a and the base station 72 by means of the S1 interface. In the case where the data received from the PDN GW is user data, the user data is passed from the PDN GW communication unit 1001 to the base station communication unit 1002 via a user plane communication unit 1003 and is then transmitted to one or a plurality of base stations 72. In the case where the data received from the base station 72 is user data, the user data is passed from the base station communication unit 1002 to the PDN GW communication unit 1001 via the user plane communication unit 1003 and is then transmitted to the PDN GW.

In the case where the data received from the PDN GW is control data, the control data is passed from the PDN GW communication unit 1001 to a control plane control unit 1005. In the case where the data received from the base station 72 is control data, the control data is passed from the base station communication unit 1002 to the control plane control unit 1005.

A HeNBGW communication unit 1004 is provided in the case where the HeNBGW 74 is provided, which performs data transmission and reception between the MME 73a and the HeNBGW 74 by means of the interface (IF) according to an information type. The control data received from the HeNBGW communication unit 1004 is passed from the HeNBGW communication unit 1004 to the control plane control unit 1005. The processing results of the control plane control unit 1005 are transmitted to the PDN GW via the PDN GW communication unit 1001. The processing results of the control plane control unit 1005 are transmitted to one or a plurality of base stations 72 by means of the S1 interface via the base station communication unit 1002, and are transmitted to one or a plurality of HeNBGWs 74 via the HeNBGW communication unit 1004.

The control plane control unit 1005 includes a NAS security unit 1005-1, an SAE bearer control unit 1005-2, and an idle state mobility managing unit 1005-3, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs the following: mobility management of an idle state (LTE-IDLE state, which is merely referred to as idle as well); generation and control of a paging signal in the idle state; addition, deletion, and update of and search for a tracking area of one or a plurality of user equipments 71 being served thereby; and tracking area list management.

The MME 73a distributes a paging signal to one or a plurality of base stations 72. In addition, the MME 73a performs mobility control of an idle state. When the user equipment is in the idle state and an active state, the MME 73a manages a list of tracking areas. The MME 73a begins a paging protocol by transmitting a paging message to the cell belonging to a tracking area in which the UE is registered. The idle state mobility managing unit 1005-3 may manage the CSG of the Home-eNBs 75 to be connected to the MME 73a, CSG-IDs, and a whitelist.

An example of a cell search method in a mobile communication system will be described next. FIG. 6 is a flowchart showing an outline from a cell search to an idle state operation performed by a user equipment (UE) in the LTE communication system. When starting a cell search, in Step ST1, the user equipment synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which correspond one-to-one to PCIs assigned per cell, are assigned to the synchronization signal (SS). The number of PCIs is currently studied in 504 ways. The 504 ways of PCIs are used for synchronization, and the PCIs of the synchronized cells are detected (specified).

In Step ST2, next, the user equipment detects a cell-specific reference signal (CRS) that is a reference signal (RS) transmitted from the base station per cell and measures the reference signal received power (RSRP). The codes corresponding one-to-one to the PCIs are used for the reference signal RS. Separation from another cell is enabled by correlation using the code. The code for RS of the cell is derived from the PCI specified in Step ST1201, which makes it possible to detect the RS and measure the RS received power.

In Step ST3, next, the user equipment selects the cell having the best RS received quality, for example, the cell having the highest RS received power, that is, the best cell, from one or more cells that have been detected up to Step ST2.

In Step ST4, next, the user equipment receives the PBCH of the best cell and obtains the BCCH that is the broadcast information. A master information block (MIB) containing the cell configuration information is mapped to the BCCH over the PBCH. The MIB is accordingly obtained by obtaining the BCCH through reception of the PBCH. Examples of the MIB information include a downlink (DL) system bandwidth (also referred to as a transmission bandwidth configuration (dl-bandwidth)), the number of transmission antennas, and a system frame number (SFN).

In Step ST5, next, the user equipment receives the DL-SCH of the cell based on the cell configuration information of the MIB, to thereby obtain a system information block (SIB) 1 of the broadcast information BCCH. The SIB1 contains the information about the access to the cell, information about cell selection, and scheduling information on another SIB (SIBk; k is an integer equal to or greater than two). In addition, the SIB1 contains a tracking area code (TAC).

In Step ST6, next, the user equipment compares the TAC of the SIB1 received in Step ST5 with the TAC portion of a tracking area identity (TAI) in the tracking area list that has been possessed by the user equipment. The tracking area list is also referred to as a TAT list. TAT is the identification information for identifying tracking areas and is composed of a mobile country code (MCC), a mobile network code (MNC), and a tracking area code (TAC). MCC is a country code. MNC is a network code. TAC is the code number of a tracking area.

If the result of the comparison of Step ST6 shows that the TAC received in Step ST5 is identical to the TAC included in the tracking area list, the user equipment enters an idle state operation at the cell. If the comparison shows that the TAC received in Step ST5 is not included in the tracking area list, the user equipment requires a core network (EPC)

including MME and the like to change a tracking area through the cell for performing tracking area update (TAU).

The device (hereinafter also referred to as a "core-network-side device") configuring a core network updates the tracking area list based on an identification number (such as UE-ID) of a user equipment transmitted from the user equipment together with a TAU request signal. The core-network-side device transmits the updated tracking area list to the user equipment. The user equipment rewrites (updates) the TAC list of the user equipment based on the received tracking area list. After that, the user equipment enters the idle state operation at the cell.

Widespread use of smartphones and tablet terminals explosively increases traffic in cellular radio communications, causing a fear of insufficient radio resources all over the world. To increase spectral efficiency, thus, it is studied to downsize cells for further spatial separation.

In the conventional configuration of cells, the cell configured by an eNB has a relatively-wide-range coverage. Conventionally, cells are configured such that relatively-wide-range coverages of a plurality of cells configured by a plurality of eNBs cover a certain area.

When cells are downsized, the cell configured by an eNB has a narrow-range coverage compared with the coverage of a cell configured by a conventional eNB. Thus, in order to cover a certain area as in the conventional case, a larger number of downsized eNBs than the conventional eNBs are required.

In the description below, a "macro cell" refers to a cell configuring a relatively-wide-range coverage, that is, a cell having a relatively wide coverage area, similarly to a cell configured by a conventional eNB. A "small cell" refers to a cell configuring a relatively-narrow-range coverage, that is, a cell having a relatively narrow coverage area, and a "small eNB" refers to an eNB configuring a small cell.

The macro eNB may be, for example, a "wide area base station" described in Non-Patent Document 8.

The small eNB may be, for example, a low power node, local area node, or hotspot. Alternatively, the small eNB may be a pico eNB configuring a pico cell, a femto eNB configuring a femto cell, HeNB, remote radio head (RRH), remote radio unit (RRU), remote radio equipment (RRE), or relay node (RN). Still alternatively, the small eNB may be a "local area base station" or "home base station" described in Non-Patent Document 8.

Figure 7:
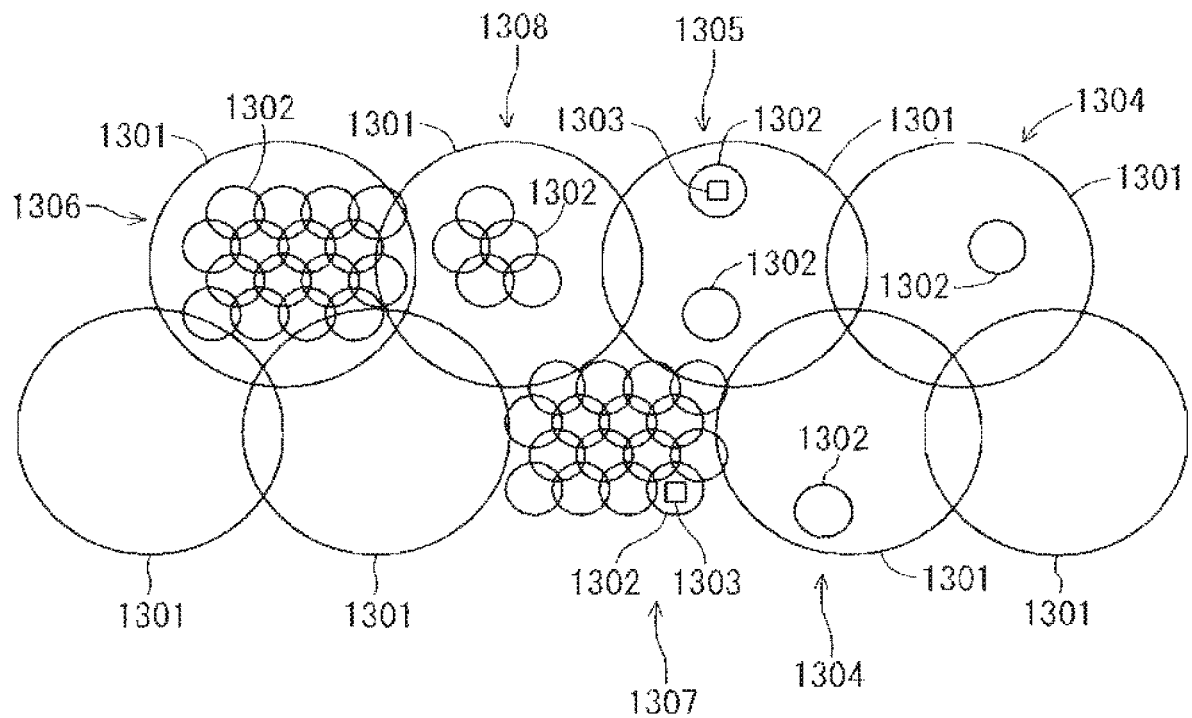
FIG. 7 shows the concept of a cell configuration when macro eNBs and small eNBs coexist.

FIG. 7 shows the concept of the cell configuration in which macro eNBs and small eNBs coexist. The macro cell configured by a macro eNB has a relatively-wide-range coverage 1301. A small cell configured by a small eNB has a coverage 1302 whose range is narrower than that of the coverage 1301 of a macro eNB (macro cell).

When a plurality of eNBs coexist, the coverage of the cell configured by an eNB may be included in the coverage of the cell configured by another eNB. In the cell configuration shown in FIG. 7, as indicated by a reference "1304" or "1305", the coverage 1302 of the small cell configured by a small eNB may be included in the coverage 1301 of the macro cell configured by a macro eNB.

As indicated by a reference "1305", the coverages 1302 of a plurality of, for example, two small cells may be included in the coverage 1301 of one macro cell. A user equipment (UE) 1303 is included in, for example, the coverage 1302 of the small cell and performs communication via the small cell.

In the cell configuration shown in FIG. 7, as indicated by a reference "1306", the coverage 1301 of the macro cell configured by a macro eNB may overlap the coverages 1302 of the small cells configured by small eNBs in a complicated manner.

As indicated by a reference "1307", the coverage 1301 of the macro cell configured by a macro eNB may not overlap the coverages 1302 of the small cells configured by small eNBs.

Further, as indicated by a reference "1308", the coverages 1302 of a large number of small cells configured by a large number of small eNBs may be configured in the coverage 1301 of one macro cell configured by one macro eNB.

The problem solved in a first embodiment and the solution to the problem will be described below. This embodiment will describe the configuration in which the coverage of the macro cell configured by a macro eNB includes the coverage of the small cell configured by a small eNB.

As described above, to support a tremendous volume of traffic in the future, for example, the following technique is studied: a large number of small eNBs are installed to configure a large number of small cells, thereby increasing spectral efficiency, which increases communication capacity.

When a large number of small cells are installed, problems of increased interference and increased power consumption arise. To solve these problems, 3GPP has studied a technique of switching on a cell (cell on) and switching off a cell (cell off). For example, studied as the technique of semi-static cell on and cell off is a technique of judging whether a UE is located adjacent to an energy saving cell (abbreviated as an ES cell) and switching on the ES cell in a dormant state in which the ES cell is in the energy saving state.

Herein, "switching off an ES cell" refers to stopping at least some of the operations of the ES cell, and "switching on an ES cell" refers to starting the operation of the ES cell which has been stopped by switching off.

The "state in which an ES cell is switched off (hereinafter also referred to as a "switch-off state")" refers to the state in which at least some of the operations of the ES cell are stopped. The switch-off state of the ES cell thus includes the state in which all of the operations of the ES cell are stopped and the state in which some of the operations of the ES cell are stopped and the other operations are continued.

One example of the state in which some of the operations of the ES cell are stopped and the other operations are continued is a state in which the operations on the radio access network (RAN) side are stopped and the operations on the interface with the network side are continued. Another example is a state in which the ES cell transmits only predetermined radio signals, and continues the operations of the interface with the network side and stops the other operations. These states are referred to as "dormant states".

The switch-off state such as the dormant state corresponds to an energy saving state. The energy saving state refers to the state in which power consumption is lower than in the normal operation state. The normal operation state refers to the state in which the ES cell performs each operation, that is, the state in which the ES cell does not stop each operation. The switch-on state that is the state in which the ES cell is switched on corresponds to a normal operation state. The ES cell is thus switchable between the normal operation state and the energy saving state.

The following two methods, (1) and (2), are proposed as the wake-up processing methods for switching on the ES cell in the dormant state.

(1) A UE performs a measurement report of a discovery signal (abbreviated as DS) to the serving cell, and the serving cell that has received the measurement report transmits a wake-up message to the ES cell (see Non-Patent Document 9).
(2) The UE transmits a wake-up signal to the ES cell (see Non-Patent Document 10).

The DS is a signal that the ES cell transmits for detecting its own cell. It is discussed that the DS may include the cell identifier and the DS may be a signal for measurement.

The access restriction method of the conventional technology is performed by the UE receiving the system information of a cell. The conventional technology is based on the premise that the ES cell in the dormant state transmits only the DS and does not broadcast the SIB. In this case, the UE located adjacent to the ES cell switches on the ES cell in the dormant state without receiving the SIB of the ES cell.

In the conventional technology, thus, the ES cell in the dormant state is inevitably switched on also when the UE without right to access the ES cell or the UE whose access to the ES cell is restricted comes closer to the ES cell.

It is useless to switch on the ES cell in the dormant state when the UE without access right comes closer to the ES cell. Specifically, the UE cannot access the ES cell if the ES cell is switched on to return to the normal operation state, and thus, the ES cell is switched off again to return to the dormant state. This results in unnecessary processing time, wasting a large amount of consumption power. Besides, signalings for switch on increase unnecessarily.

To prevent unnecessary execution of switch on of the ES cell in the dormant state, a new mechanism enabling access restriction is required.

The solution in the first embodiment will be described below. Access restriction is performed in the wake-up process for the ES cell in the dormant state.

The following four, (1) to (4), will be disclosed as specific examples of the entity that controls access restriction (hereinafter also referred to as "access restriction control").
(1) ES Cell.
An ES cell to be switched on performs access restriction control.
(2) Serving Cell.
A serving cell for a wake-up process activation target UE performs access restriction control.
(3) UE.
A wake-up process activation target UE performs access restriction control.
(4) MME.
An MME performs access restriction control. The MME corresponds to an entity of higher layer and is provided at a layer higher than that of a base station device, that is, provided on the network side.

Herein, the "wake-up process activation target UE" refers to a UE that causes an activation of the wake-up process. When the UE activates the wake-up process, for example, when the UE transmits a wake-up signal directly to the ES cell, this UE is referred to as a "wake-up process activation target UE". When the serving cell activates the wake-up process, for example, when the serving cell receives a measurement report from the UE, and then, the serving cell notifies the ES cell of a wake-up message based on the result of the measurement report, this UE is referred to as a "wake-up process activation target UE".

A method in which an ES cell performs access restriction control will be disclosed below. The ES cell obtains the access restriction information of a wake-up process activation target UE. The following three, (1) to (3), will be disclosed as specific examples of the target from which the access restriction information is obtained.
(1) Access Restriction Information is Obtained from a UE.

A wake-up process activation target UE notifies an ES cell of the access restriction information of its own UE. The specific example (1) may be applied to the case where the UE has the access restriction information of its own UE. Examples of the access restriction information include an access class (AC) for access class barring (ACB), an AC for extended access class barring (EAB), a CSG-ID held within a UE, and an allowed CSG list that is a list of CSG-IDs.

A non-limiting example of the method in which a UE notifies an ES cell of the access restriction information of its own UE is a method in which a wake-up process activation target UE associates the access restriction information of the UE with a wake-up signal transmitted to the ES cell in the dormant state and notifies the ES cell. A non-limiting specific example is a method of deriving a wake-up signal using a UE-dedicated sequence associated with the access restriction information.
(2) Access Restriction Information is Obtained from a Serving Cell.

A wake-up process activation target UE notifies a serving cell of the access restriction information of its own UE. The serving cell notifies an ES cell of the access restriction information of the wake-up process activation target UE.

A non-limiting example of the method in which a UE notifies a serving cell of the access restriction information of its own UE is a notification method involving the use of RRC signaling (RRC message). Examples of such a method include a method of including access restriction information in an RRC connection establishment request message to be notified to the serving cell, a method of including access restriction information in an RRC connection establishment complete message to be notified to the serving cell, a method of including access restriction information in an RRC connection reestablishment request message to be notified to the serving cell, and a method of including access restriction information in an RRC connection reestablishment complete message to be notified to the serving cell. Alternatively, a method of including access restriction information in a measurement report message to be notified to the serving cell may be used.

A non-limiting example of the method in which a serving cell notifies an ES cell of the access restriction information of a UE is a method of including access restriction information in a wake-up request message to be notified to the ES cell by the serving cell. Alternatively, a method of notifying access restriction information through X2 signaling (X2 message) may be used.
(3) Access Restriction Information is Obtained from an MME.

An ES cell requests the access restriction information of a wake-up process activation target UE from an MME. The ES cell may notify the MME of the identifier of the wake-up process activation target UE to request the access restriction information of the wake-up process activation target UE. The MME notifies the ES cell of the access restriction information of the UE. The MME holds the access restriction information of the UE. A non-limiting example of the access restriction information of the UE is a CSG list that is a list of CSG-IDs of UEs held in the MME.

S1 signaling (S1 message) may be used in the request for the access restriction information of the UE and the notification of the access restriction information of the UE, which are performed between the MME and the ES cell.

The following 21, (1) to (21), will be described as specific examples of the access restriction information.
(1) AC.
(2) AC for EAB.
(3) CSG-related information. Examples of the CSG-related information include a CSG identity (CSG-ID), a CSG list, an allowed CSG list, a CSG indication, and an access mode.
(4) Barred information of a cell.
(5) Information indicating whether a cell is available.
(6) Information indicating whether a cell is under maintenance.
(7) Information indicating whether a cell is under setup.
(8) Information indicating whether a cell is during update.
(9) Information indicating whether a period is a predetermined period after switch on of a cell is started.
(10) Information indicating whether a period is a predetermined period after a cell shifts to a dormant state.
(11) Access priority information.
(12) Cell overload information.
(13) Information indicating whether a radio resource available to a cell is present.
(14) Information about quality of service (QoS).
(15) Information about QoS class identifier (QCI).
(16) Information about E-UTRAN radio access bearer (ERAB).
(17) Information about the connection form of a backhaul. Examples of the backhaul include ones between eNBs and between an eNB and a core network (CN)-side node. Examples of the connection form include wired connection and wireless connection. Examples of the types of wired connection include connection through optical fibers and connection through metal cables.
(18) Information about an allowable delay time of a backhaul.
(19) Information about a moving speed, examples of which include information about the moving speed of a UE and information about the moving speed of a UE supportable by a cell.
(20) Information about the size of cell coverage.
(21) Combination of (1) to (20) above.

Access restriction control by an ES cell will be disclosed below. The ES cell performs access restriction control using the access restriction information of the wake-up process activation target UE and the access restriction information of its own cell. Specifically, the ES cell judges whether the wake-up process activation target UE can access its own cell.

Access restriction control may be triggered by the reception of a wake-up request. Examples of the wake-up request include a wake-up signal and a wake-up message (wake-up request message).

The access restriction process by an ES cell will be disclosed below. The ES cell determines whether to switch on its own cell based on the result of the access restriction control. If the wake-up process activation target UE can access its own cell, the ES cell switches on its own cell. Upon switch on, the ES cell shifts from the dormant state to the active state. The active state refers to the state in which a cell operates normally, which corresponds to the normal operation state. Shifting from the dormant state to the active state refers to "wake up". If the wake-up process activation target UE cannot access its own cell, the ES cell does not switch on its own cell.

A rejection process will be disclosed below. When the wake-up process activation target UE cannot access a wake-up process target ES cell, the ES cell may notify the serving cell of a reject message as the rejection process. Herein, the "wake-up process target ES cell" refers to an ES cell being a target for the wake-up process, that is, an ES cell to be woken up by the wake-up process.

The ES cell may notify the UE of a reject message as the rejection process. The ES cell may notify the UE of a reject message via the serving cell. In this case, the ES cell notifies the serving cell of a reject message, and the serving cell that has received the notification notifies the wake-up process activation target UE of the reject message.

The following six, (1) to (6), will be described as specific examples of the information included in a reject message.
(1) The UE identifier of a UE, which may be the UE identifier of a wake-up process activation target UE. Herein, the "UE identifier" refers to an identifier provided per UE for identifying a UE.
(2) The cell identifier of an ES cell, which may be the cell identifier of a wake-up process target ES cell. Herein, the "cell identifier" refers to an identifier provided per cell for identifying a cell.
(3) Cause information. The cause information is the information indicating the cause of rejection.
(4) Information indicating access restriction by which rejection has been made. For example, the information may be similar to access restriction information or may be notified as cause information.
(5) Wait timer information.
(6) Combination of (1) to (5) above.

The wait timer information includes the information about a wait timer, for example, the information about a period set by the wait timer. The activation of the wake-up process for the ES cell is prohibited during a period set by the wait timer. A measurement report to the ES cell may be prohibited during a period set by the wait timer. Measurement of the ES cell may be prevented during a period set by the wait timer. When the access restriction information of an ES cell is changed in time, the period set by the wait timer may be a period until the access restriction information of the ES cell is changed.

FIG. 8 shows an example sequence of the wake-up process in a communication system of the first embodiment. FIG. 8 shows the case where an ES cell performs access restriction control.

In step ST11101, the ES cell is in the dormant state.

In steps ST1102 and ST1103, the UE notifies the ES cell in the dormant state of the access restriction information of its own UE via the serving cell. Specifically, in step ST1102, the UE notifies the serving cell of the access restriction information of its own UE. For example, RRC signaling is used.

In step ST1103, the serving cell that has received the access restriction information from the UE notifies the ES cell of the access restriction information of the UE. For example, X2 signaling is used. This allows the ES cell to obtain the access restriction information of the UE.

The identifier of the UE may be notified together with the access restriction information of the UE. As a result, the identifier and the access restriction information of the UE can be associated with each other. This enables the ES cell to recognize which UE has what access restriction information.

The UE makes a wake-up request to the ES cell via the serving cell. Specifically, in step ST1104, the UE that has detected the presence of the ES cell in its vicinity notifies the serving cell of a wake-up request message. In step ST1105, the serving cell that has received the message notifies the ES cell of a wake-up request message.

In this case, the UE identifier of the wake-up process activation target UE and the cell identifier of the wake-up process target ES cell may be included in the wake-up request message and notified. This allows the serving cell to specify the ES cell to which a wake-up request is made. The ES cell that has received the wake-up request message can specify the UE that has made the wake-up request.

Although FIG. 8 shows the case where the UE notifies the serving cell or the serving cell notifies the ES cell of the access restriction information of the UE separately from the wake-up request message, the access restriction information of the UE may be included in a wake-up request message and notified.

In step ST1106, the ES cell that has received the wake-up request message performs access restriction control. Specifically, the ES cell judges whether the wake-up process activation target UE can access its own cell. The ES cell judges whether the wake-up process activation target UE can access its own cell using the UE identifier of the wake-up process activation target UE which has been received in step ST1105, the access restriction information of the UE which has been received in step ST1103, and the access restriction information of its own cell.

If the wake-up process activation target UE can access its own cell, the ES cell moves to step ST1109. In step ST1109, the ES cell switches on its own cell. Upon switch on, the ES cell shifts to the active state in step ST1110.

If the wake-up process activation target UE cannot access its own cell, the ES cell moves to the process of waiting for a wake-up request message in step ST1105.

If the wake-up process activation target UE cannot access its own cell, the ES cell may move to the process of waiting for the access restriction information of the UE in step ST1103. This is effective when the access restriction information of the UE is changed in time. When not being notified of the access restriction information of the UE and receiving the wake-up request message, the ES cell may perform access restriction control using the access restriction information of the UE at this point.

If the wake-up process activation target UE cannot access its own cell, in step ST1107, the ES cell may notify the serving cell of a reject message (hereinafter also referred to as a "wake-up reject message") to the wake-up request message. The wake-up reject message may include the information described above. The wake-up reject message may also include the UE identifier of the wake-up process activation target UE. The wake-up reject message may also include the cell identifier of the ES cell that is its own cell.

The serving cell can thus recognize access of which UE has been rejected by the access restriction control. The serving cell can also recognize for what reason access has been rejected. The serving cell can also recognize by which ES cell access has been rejected.

In step ST1108, the serving cell may notify the UE of a wake-up reject message to notify that access has been rejected by access restriction control. The wake-up reject message may include a reason for rejection. The wake-up reject message may include the identifier of the ES cell that has performed access restriction control. The UE can thus recognize that access has been rejected by access restriction control. The UE can also recognize for what reason access has been rejected. The UE can also recognize by which ES cell access has been rejected.

The reject message may include wait timer information. For example, by determining in advance that an activation of the wake-up process for the ES cell is prohibited for a duration set by a wait timer, the UE that has received the wait timer information of the wait timer can be prevented from making a wake-up request to the ES cell for a period set by the wait timer even if it is located adjacent to the ES cell and detects the ES cell again. This is effective when the access restriction information of the ES cell is changed in time. This requires no unnecessary signaling. As the entire communication system, consequently, the amount of signaling can be reduced, and the processing load and power consumption of the UE, the serving cell, and the ES cell can be reduced.

Alternatively, it is determined in advance that not to perform the measurement of the ES cell is allowed for a duration set by the wait timer. The UE that has received the wait timer information of the wait timer can remove the ES cell from measurement targets for a period set by the wait timer. The UE thus does not detect the ES cell that is inaccessible and does not make a wake-up request. This is effective when the access restriction information of the ES cell is changed in time. This requires neither unnecessary measurement process nor unnecessary signaling. As the entire communication system, consequently, the amount of signaling can be reduced, and the processing load and power consumption of the UE, the serving cell, and the ES cell can be reduced.

The method disclosed in this embodiment can restrict a wake-up process from a UE without access right, thus preventing the ES cell in the dormant state from switching itself on unnecessarily. That is, unnecessary switching of the ES cell between the normal operation state and the dormant state can be prevented. The power consumption of the ES cell can thus be reduced.

A switch on process is not performed unnecessarily. As the entire communication system, consequently, the amount of signaling can be reduced, and the processing load and power consumption of the UE, the serving cell, the ES cell, the MME, and the like can be reduced.

Since the ES cell in the dormant state can be prevented from switching itself on unnecessarily, the occurrence of interference can be reduced, thus improving the communication quality as the entire communication system.

In this embodiment, the ES cell performs access restriction control. This eliminates the need for notifying another node of the access restriction information of the ES cell. The amount of signaling can thus be reduced as the entire communication system.

First Modification of First Embodiment

This modification will describe the case where a serving cell performs access restriction control of a wake-up process. While the ES cell performs access restriction control of the wake-up process in the first embodiment described above, the serving cell performs access restriction control of the wake-up process in this modification.

A method in which a serving cell performs access restriction control will be disclosed below. This modification will disclose the method in which a serving cell recognizes a wake-up process activation target UE and then performs access restriction control. This method is applicable to the wake-up processing method described above in which a UE performs a DS measurement report to a serving cell, and then, the serving cell that has received the measurement report transmits a wake-up message to an ES cell.

A method in which a serving cell obtains the access restriction information of a UE will be disclosed below. The serving cell obtains the access restriction information of a wake-up process activation target UE. The following two, (1) and (2), will be disclosed as specific examples of the target from which access restriction information is obtained.
(1) Access Restriction Information is Obtained from a UE.

A wake-up process activation target UE notifies a serving cell of the access restriction information of its own UE. A non-limiting example of the method in which a UE notifies a serving cell of the access restriction information of its own UE is a notification method involving the use of RRC signaling. For example, access restriction information may be included in the measurement report to be notified to the serving cell, or may be included in an ES cell detection report or a measurement report for detecting an ES cell.
(2) Access Restriction Information is Obtained from an MME.

A serving cell requests the access restriction information of a wake-up process activation target UE from an MME. The serving cell may notify the MME of the identifier of the wake-up process activation target UE and request the access restriction information of the UE. The MME notifies the serving cell of the access restriction information of the UE. The specific example (2) may be applied to the case where the MME has the access restriction information of the UE. A non-limiting example of the access restriction information is a CSG list that is a list of CSG-IDs of UEs held in the MME.

S1 signaling (S1 message) may be used as the method in which a serving cell requests the access restriction information of a UE from an MME and the method in which an MME notifies a serving cell of the access restriction information of a UE.

The method in which a serving cell obtains the access restriction information of an ES cell will be disclosed below. The serving cell obtains the access restriction information of a wake-up process target ES cell. The following two, (1) and (2), will be disclosed as specific examples of the target from which access restriction information is obtained.
(1) Access Restriction Information is Obtained from an ES Cell.

A serving cell obtains the access restriction information of an ES cell from the ES cell. The ES cell notifies the serving cell of the access restriction information of its own cell. In this method, an ES cell from which access restriction information is to be obtained does not need to be specified to the wake-up process target ES cell.

In another method, the serving cell may request the access restriction information from a wake-up process target ES cell. The ES cell from which access restriction information is to be obtained can thus be specified to the wake-up process target ES cell. The wake-up process target ES cell notifies the serving cell of the access restriction information in response to the request.

The method in which an ES cell notifies a serving cell of access restriction information will be disclosed below. The ES cell notifies a neighbor cell. Notification may be made through X2 signaling. Specifically, notification may be made in an X2 setup process. Notification may be made in an X2 setup request message. Or, notification may be made in an eNB update process. The access restriction information may be included in an eNB configuration update message. A new X2 message may be provided and notified.

In another method, an ES cell may notify a neighbor cell via an MME. Notification may be made through S1 signaling.
(2) Access Restriction Information is Obtained from an MME.

A serving cell requests the access restriction information of a wake-up process target ES cell from an MME. The serving cell may notify the MME of the cell identifier of the wake-up process target ES cell to request the access restriction information of the ES cell. The MME notifies the serving cell of the access restriction information of the ES cell. The specific example (2) may be applied to the case where the MME has the access restriction information of an ES cell. When the MME does not have the access restriction information of an ES cell, the MME may request access restriction information from a wake-up process target ES cell. The wake-up process target ES cell notifies the serving cell of the access restriction information of its own cell in response to the request.

S1 signaling may be used in the method in which a serving cell requests the access restriction information of an ES cell from an MME and the method in which an MME notifies a serving cell of the access restriction information of an ES cell.

S1 signaling may be used in the method in which an MME requests the access restriction information of an ES cell from an ES cell and the method in which an ES cell notifies an MME of the access restriction information of an ES cell.

Access restriction control by a serving cell will be specifically disclosed below. The serving cell performs access restriction control using the access restriction information of the wake-up process activation target UE and the access restriction information of the wake-up process target ES cell. Specifically, the serving cell judges whether the wake-up process activation target UE can access the wake-up process target ES cell. Access restriction control may be triggered by the reception of a wake-up request.

The access restriction process by a serving cell will be disclosed below. The serving cell determines whether to make a wake-up request to the wake-up process target ES cell based on the result of the access restriction control. If the UE can access the ES cell, the serving cell makes a wake-up request to the ES cell. The ES cell that has received the wake-up request from the serving cell switches on its own cell. Upon switch on, the ES cell shifts from the dormant state to the active state. If the UE cannot access the ES cell, the serving cell does not make a wake-up request to the ES cell.

A rejection process will be disclosed below. When the wake-up process activation target UE cannot access the wake-up process target ES cell, the serving cell may notify the UE of a reject message.

FIG. 9 shows an example sequence of the wake-up process in a communication system of a first modification of the first embodiment. FIG. 9 shows the case where the serving cell performs access restriction control.

In step ST1201, the ES cell is in the dormant state.

In step ST1202, the ES cell notifies the serving cell of the access restriction information of its own ES cell. For example, X2 signaling is used. In step ST1203, the UE notifies the serving cell of the access restriction information of its own UE. For example, RRC signaling is used. This allows the serving cell to obtain the access restriction information of the UE and the access restriction information of the ES cell.

The identifier of the UE may be notified together with the access restriction information of the UE. As a result, the identifier and the access restriction information of the UE can be associated with each other. This allows the serving cell to recognize which UE has what access restriction information.

The identifier of the ES cell may be notified together with the access restriction information of the ES cell. As a result, the identifier and the access restriction information of the ES cell can be associated with each other. This allows the serving cell to recognize which ES cell has what access restriction information.

The UE makes a wake-up request to the serving cell. In step ST1204, the UE that has detected the presence of an ES cell in its vicinity notifies the serving cell of a wake-up request message. The UE identifier and the identifier of the wake-up process target ES cell may be included in the wake-up request message and notified. This allows the serving cell to specify an ES cell to which the serving cell makes a wake-up request.

In step ST1205, the serving cell that has received the wake-up request message performs access restriction control. Specifically, the serving cell judges whether the wake-up process activation target UE can access the wake-up process target ES cell. The serving cell judges whether the wake-up process target ES cell is accessible using the UE identifier of the wake-up process activation target UE and the cell identifier of the wake-up process target ES cell that have been received in step ST1204, the access restriction information of the ES cell that has been received in step ST1202, and the access restriction information of the UE that has been received in step ST1203.

If the wake-up process activation target UE can access the wake-up process target ES cell, the serving cell moves to step ST1207. In step ST1207, the serving cell notifies the wake-up process target ES cell of a wake-up request message. In step ST1208, the ES cell that has received the wake-up request message switches on its own cell. Upon switch on, in step ST1209, the ES cell shifts to the active state.

If the wake-up process activation target UE cannot access the wake-up process target ES cell, the serving cell moves to the process of waiting for a wake-up request message in step ST1204.

If the wake-up process activation target UE cannot access the wake-up process target ES cell, the serving cell may move to the process of waiting for the access restriction information of the UE in step ST1203. This is effective when the access restriction information of the UE is changed in time. When not being notified of the access restriction information of the UE and receiving the wake-up request message, the ES cell may perform access restriction control using the access restriction information of the UE at this point.

If the wake-up process activation target UE cannot access the wake-up process target ES cell, the serving cell may move to the process of waiting for the access restriction information of the ES cell in step ST1202. This is effective when the access restriction information of the ES cell is changed in time. When not being notified of the access restriction information of the ES cell and receiving the wake-up request message, the ES cell may perform access restriction control using the access restriction information of the ES cell at this point.

If the wake-up process activation target UE cannot access the wake-up process target ES cell, in step ST1206, the serving cell may notify the UE of a wake-up reject message that is a reject message to the wake-up request message.

The wake-up reject message may include the information disclosed in the first embodiment. The wake-up reject message may also include the cell identifier of the wake-up process target ES cell. This allows the UE to recognize that its access has been rejected by access restriction control. The UE can also recognize for what reason access has been rejected. The UE can also recognize by which ES cell access has been rejected.

The wake-up reject message may include wait timer information. For example, by determining in advance that the activation of the wake-up process for the ES cell is prohibited for a duration set by a wait timer, the UE that has received the wait timer information of the wait timer can be prevented from making a wake-up request to the serving cell for a period set by the wait timer even if the UE is located adjacent to the ES cell and detects the ES cell again. This requires no unnecessary signaling. As the entire communication system, consequently, the amount of signaling can be reduced, and the processing load and power consumption of the UE, the serving cell, and the ES cell can be reduced.

Alternatively, it is determined in advance that not to perform the measurement of the ES cell is allowed for a duration set by the wait timer. The UE that has received the wait timer information of the wait timer can remove the ES cell from measurement targets for a period set by the wait timer. The UE thus does not detect the ES cell that is inaccessible and does not make a wake-up request. This requires neither unnecessary measurement process nor unnecessary signaling. As the entire communication system, consequently, the amount of signaling can be reduced, and the processing load and power consumption of the UE, the serving cell, and the ES cell can be reduced.

The method disclosed in this modification achieves effects similar to those of the first embodiment.

In this modification, the serving cell performs access restriction control. This eliminates the need for notifying the ES cell of an unnecessary wake-up request message. Consequently, the amount of signaling can be reduced, and the power consumption of the ES cell can be reduced.

The situation of the serving cell can be taken into consideration by the serving cell performing access restriction control. For example, the load state of the serving cell may be included in the indicator for judging access restriction control.

Specifically, for a relatively high load of the serving cell, if the wake-up process activation target UE can access a wake-up process target ES cell, the serving cell notifies the wake-up process target ES cell of a wake-up request message. For a relatively low load of the serving cell, even if the wake-up process activation target UE can access a wake-up process target ES cell, the serving cell may be prevented from notifying the wake-up process target ES cell of a wake-up request message. A threshold may be provided to the load of the serving cell and used in the control.

As described above, for a relatively high load of the serving cell, the serving cell can offload the UE to the ES cell. For a relatively low load of the serving cell, the serving cell does not offload the UE to the ES cell but can keep the UE at its own cell.

Another method in which a serving cell performs access restriction control will be disclosed below. Disclosed below is a method in which a serving cell performs access restriction control before recognizing a wake-up process activation target UE. This method is applicable to the wake-up processing method in which a UE performs a DS measurement report to a serving cell and the serving cell that has received the measurement report transmits a wake-up message to an ES cell, and the wake-up processing method in which a UE transmits a wake-up signal to an ES cell.

A method in which a serving cell obtains the access restriction information of a UE will be disclosed below. The serving cell obtains the access restriction information of a UE connected or to be connected therewith. The following two, (1) and (2), will be disclosed as specific examples of the target from which access restriction information is obtained.

(1) Access Restriction Information is Obtained from a UE Itself.

A UE notifies a serving cell of the access restriction information of its own UE. In the method in which a UE notifies a serving cell of the access restriction information of its own UE, the UE may notify the serving cell through RRC signaling. For example, access restriction information is included in an RRC connection establishment request message to be notified to the serving cell. The access restriction information may be included in an RRC connection establishment complete message to be notified to the serving cell. The access restriction information may be included in an RRC connection reestablishment request message to be notified to the serving cell. Or, the access restriction information may be included in an RRC connection reestablishment complete message to be notified to the serving cell.

(2) Access Restriction Information is Obtained from an MME.

A serving cell requests the access restriction information of a UE connected or to be connected therewith from an MME. The serving cell may notify the MME of the identifier of the UE connected or to be connected therewith to request the access restriction information of the UE. The MME notifies the serving cell of the access restriction information of the UE. The specific example (1) may be applied to the case where the MME has the access restriction information of a UE. A non-limiting example of the access restriction information is a CSG list that is a list of CSG-IDs of UEs held in the MME.

S1 signaling may be used in the method in which a serving cell requests the access restriction information of a UE from an MME and the method in which an MME notifies a serving cell of the access restriction information of a UE.

The method in which a serving cell obtains the access restriction information of an ES cell will be disclosed below. The serving cell obtains, from the ES cell, the access restriction information of the ES cell. The ES cell notifies the serving cell of the access restriction information of its own cell. In this method, an ES cell from which access restriction information is to be obtained does not need to be specified to a wake-up process activation target UE.

The method in which an ES cell notifies a serving cell of access restriction information is similar to the method disclosed as the method in which a serving cell recognizes a wake-up process activation target UE and then performs access restriction control, and thus, description thereof will be omitted.

Access restriction control by a serving cell will be specifically disclosed below. The serving cell performs access restriction control using the access restriction information of a UE connected therewith and the access restriction information of an ES cell. Specifically, the serving cell judges whether a UE connected therewith can access the ES cell. A target UE may be a specific UE that is caused to detect an ES cell or measure an ES cell among UEs connected therewith. In this case, the serving cell performs access restriction control before notifying a UE connected therewith of a message for detecting an ES cell or a message for measuring an ES cell.

The access restriction process by a serving cell will be disclosed below. The serving cell notifies a UE, which is caused to detect an ES cell or measure an ES cell, of an accessible ES cell based on the result of the access restriction control. RRC signaling may be used in the notification of an accessible ES cell. Notification may be made in a measurement control message as RRC signaling. Notification may be made in a message for detecting an ES cell or a message for measuring an ES cell.

The UE that has received the accessible ES cell from the serving cell detects the ES cell. The UE may perform measurement for detecting the ES cell. The UE specifies a wake-up process target ES cell in accordance with the detection result or the measurement result for detection and makes a wake-up request to the ES cell. The wake-up request may be made via the serving cell.

The ES cell that has received the wake-up request from the UE or from the UE via the serving cell switches on its own cell. Upon switch on, the ES cell shifts from the dormant state to the active state.

The method in which a serving cell performs access restriction control before recognizing a wake-up process activation target UE can achieve effects similar to those of the method in which a serving cell recognizes a wake-up process activation target UE and then performs access restriction control.

The serving cell can remove an ES cell inaccessible to the UE from detection targets or measurement targets. As a result, the UE is prevented from detecting or measuring a cell inaccessible to the UE and making a wake-up request to the serving cell. This requires neither unnecessary measurement process nor unnecessary signaling. As the entire communication system, consequently, the amount of signaling can be reduced, and the processing load and power consumption of the UE and the serving cell can be reduced.

Second Modification of First Embodiment

This modification will describe a case where a UE performs access restriction control of a wake-up process. While the ES cell performs access restriction control of the wake-up process in the first embodiment described above, the UE performs access restriction control of the wake-up process in this modification. A method in which a UE performs access restriction control will be disclosed below.

A method in which a UE obtains the access restriction information of an ES cell will be disclosed below. The UE obtains the access restriction information of an ES cell. The ES cell notifies the UE of the access restriction information of its own cell. The ES cell does not need to be specified to a wake-up process target ES cell. The ES cell may notify the UE via the serving cell. The ES cell notifies the serving cell of the access restriction information of its own cell, and the serving cell notifies the UE of the access restriction information of the ES cell. The ES cell may notify a neighbor cell of the access restriction information of its own cell without specifying to a serving cell. The serving cell for a wake-up process activation target UE may notify the UE of the access restriction information of an ES cell.

X2 signaling may be used in the notification to the serving cell or neighbor cell by the ES cell. The access restriction information may be included in an X2 setup message or may be included in an eNB update message. In another method, the access restriction information may be notified to the serving cell or neighbor cell via the MME by the ES cell. S1 signaling may be used.

RRC signaling may be used in the notification to the UE by the serving cell. The access restriction information may be included in a measurement control message or may be included in a message for detecting an ES cell or a message for measuring an ES cell.

Access restriction control by a UE will be disclosed below. The UE performs access restriction control using the access restriction information of its own UE and the access restriction information of an ES cell. Specifically, the UE judges whether its own UE can access the ES cell. The UE performs access restriction control before performing ES cell measurement or measurement for detecting an ES cell. The UE may perform access restriction control before notifying an ES cell of a wake-up request.

The access restriction process by a UE will be disclosed below. The UE determines an accessible ES cell as a cell being an ES cell detection target or a cell being an ES cell measurement target based on the result of the access restriction control. The UE does not determine an inaccessible ES cell as a cell being an ES cell detection target or a cell being an ES cell measurement target based on the result of the access restriction control.

The UE performs ES cell measurement or measurement for detecting an ES cell. Then, the UE identifies a wake-up process target ES cell in accordance with the result of the measurement and makes a wake-up request to the ES cell. The UE may make a wake-up request to the ES cell via the serving cell.

The ES cell that has received the wake-up request from the UE or serving cell switches on its own cell. Upon switch on, the ES cell shifts from the dormant state to the active state.

FIG. 10 shows an example sequence of the wake-up process in a communication system of a second modification of the first embodiment. FIG. 10 shows the case where a UE performs access restriction control.

In step ST1301, the ES cell is in the dormant state.

In step ST1302, the ES cell notifies the serving cell of the access restriction information of its own cell. For example, X2 signaling is used. In step ST1303, the serving cell that has received the access restriction information of the ES cell notifies the UE of the access restriction information of the ES cell. For example, RRC signaling is used. This allows the UE to obtain the access restriction information of the ES cell.

The ES cell may notify of the identifier of its own cell together with the access restriction information of its own cell. As a result, the identifier and the access restriction information of the ES cell can be associated with each other. This allows the serving cell to recognize which ES cell has what access restriction information.

The serving cell may notify the UE of the identifier of the ES cell together with the received access restriction information of the ES cell. As a result, the identifier and the access restriction information of the ES cell can be associated with each other. This allows the UE to recognize which ES cell has what access restriction information.

In step ST1304, the UE measures a DS (hereinafter also referred to as "DS measurement") for detecting an ES cell or performs DS measurement of an ES cell.

In step ST1305, the UE performs access restriction control of the ES cell detected in step ST1304. Specifically, the UE judges whether its own UE can access the ES cell. The UE judges whether the UE can access the ES cell using the identifier of the ES cell and the access restriction information of the ES cell that have been received in step ST1303 and the access restriction information of its own UE. In this modification, access restriction control is performed after the detection of an ES cell, and accordingly, an ES cell that is to be subjected to access restriction control can be specified, thus simplifying control.

The UE may perform access restriction control before measurement for detecting an ES cell or measurement of an ES cell. In this case, an inaccessible ES cell can be removed from detection targets or measurement targets.

In step ST1306, the UE that has detected the presence of an accessible ES cell in its vicinity in step ST1305 notifies the serving cell of a wake-up request message. The identifier of the wake-up process target ES cell may be included in a wake-up request message and notified. This allows the serving cell to specify an ES cell to which the serving cell makes a wake-up request.

In step ST1307, the serving cell that has received the wake-up request message notifies the wake-up process target ES cell of a wake-up request message. In step ST1308, the ES cell that has received the wake-up request message switches on its own cell. Upon switch on, in step ST1309, the ES cell shifts to the active state.

If judging that its own UE cannot access the ES cell in step ST1305, the UE does not notify the serving cell of a wake-up request message. Or, the UE does not notify the ES cell of a wake-up request message. In this case, the UE may move to the DS measurement process of step ST1304.

If judging that its own UE cannot access the ES cell, the UE may move to the process of waiting for the access restriction information of the ES cell of step ST1303. This is effective when the access restriction information of the ES cell is changed in time. When not being notified of the access restriction information of the ES cell and detecting the ES cell in the DS measurement, the UE may perform access restriction control using the access restriction information of the ES cell at this point.

The method disclosed in this modification achieves effects similar to those of the first embodiment.

In this modification, the UE performs access restriction control. This reduces the load of the control process on the network side. The power consumption of the serving cell and the ES cell can thus be reduced.

The UE performs access restriction control, thus eliminating the need of the UE to notify the network side of the access restriction information of the UE. As the entire communication system, consequently, the amount of signaling can be reduced.

Third Modification of First Embodiment

This modification will describe the case where an MME performs access restriction control of the wake-up process. While the ES cell performs the access restriction control of the wake-up process in the first embodiment, the MME performs access restriction control of the wake-up process in this modification. A method in which an MME performs access restriction control will be disclosed below.

A method in which an MME obtains the access restriction information of a UE will be disclosed below. The MME obtains the access restriction information of the wake-up process activation target UE. The following four, (1) to (4), will be disclosed as specific examples of the target from which access restriction information is obtained.

(1) Access Restriction Information is Obtained from a UE.

A wake-up process activation target UE notifies an MME of the access restriction information of its own UE. The access restriction information may be notified via a serving cell or an ES cell. In the method in which a UE notifies an MME of access restriction information, access restriction information may be notified in a NAS message.

(2) Access Restriction Information is Obtained from a Serving Cell.

A UE notifies a serving cell of the access restriction information of its own UE. The serving cell notifies an MME of the access restriction information of a wake-up process activation target UE.

The UE notifies the serving cell through RRC signaling. The access restriction information may be included in an RRC connection establishment request message notified to the serving cell, an RRC connection establishment complete message notified to the serving cell, an RRC connection reestablishment request message notified to the serving cell, an RRC connection reestablishment complete message notified to the serving cell, or a measurement report notified to the serving cell.

(3) Access Restriction Information is Obtained from an ES Cell.

A UE notifies an ES cell of the access restriction information of its own UE. The UE may notify via a serving cell. The UE notifies the serving cell of the access restriction information of its own UE. The serving cell notifies the ES cell of the access restriction information of a wake-up process activation target UE. The ES cell notifies the NME of the access restriction information of the wake-up process activation target UE.

In the method in which a UE notifies an ES cell of access restriction information, the access restriction information of the UE may be associated with a wake-up signal transmitted to the ES cell by the wake-up process activation target UE and notified. In the notification via the serving cell, the notification method of the specific example (2) may be used in the notification to the serving cell by the UE. In the method in which a serving cell notifies an ES cell of the access restriction information of a UE, access restriction information may be included in a wake-up request message notified to the ES cell by the serving cell. X2 signaling may be used in the notification. In the method in which an ES cell notifies an MME of the access restriction information of a UE, S1 signaling may be used in the notification.

(4) Access Restriction Information is Obtained from an MME.

An MME holds the access restriction information of a UE. The specific example (4) may be applied to the case where an MME has the access restriction information of a UE. A non-limiting example of the access restriction information is CSG-related information. The MME has the CSG-related information of a UE, for example, a CSG list. When performing CSG control, the MME may perform CSG control using the CSG-related information of a UE which is possessed by its own MME.

The MME obtains the identifier of a wake-up process activation target UE. The MME may derive, from the identifier of the wake-up process activation target UE, the access restriction information of the UE. The identifier of the wake-up process activation target UE may be obtained from the ES cell. The identifier of the wake-up process activation target UE may be obtained from the serving cell. The identifier of the wake-up process activation target UE may be obtained from the UE itself.

A method in which an MME obtains the access restriction information of an ES cell will be disclosed below. The MME obtains the access restriction information of the ES cell. The ES cell notifies the MME of the access restriction information of its own cell. A target ES cell does not need to be specified to a wake-up process target ES cell.

A method in which an ES cell notifies an MME of access restriction information will be disclosed below. Access restriction information is notified through S1 signaling. Access restriction information may be notified in an S1 setup process. Access restriction information may be included in an S1 setup request message. Access restriction information may be notified in an eNB update process. Access restriction information may be included in an eNB configuration update message. An S1 message may be newly provided for notification.

In another method in which an MME obtains the access restriction information of an ES cell, the MME may request access restriction information from a wake-up process target ES cell. As a result, a target ES cell can be specified to a wake-up process target ES cell. The wake-up process target ES cell notifies the MME of access restriction information in response to the request.

Access restriction control by an MME will be disclosed below. The MME performs access restriction control using the access restriction information of a wake-up process activation target UE and the access restriction information of a wake-up process target ES cell. Specifically, the MME judges whether a wake-up process activation target UE can access a wake-up process target ES cell.

Access restriction control can be triggered by the reception of an access restriction control request message. The access restriction control request message is a message requesting the execution of access restriction control, which may be notified to the MME by the ES cell or by the serving cell.

The following three, (1) to (3), will be disclosed as specific examples of the access restriction process by the MME.

(1) An MME Notifies an ES Cell of the Result of the Access Restriction Control.

When receiving an access restriction control request message from an ES cell, the MME may notify the ES cell of the result of the access restriction control as an access restriction control response message. This notification may be made through S1 signaling.

If being accessible to a wake-up process activation target UE, the ES cell switches on its own cell. Upon switch on, the ES cell shifts from the dormant state to the active state. If not being accessible to a wake-up process activation target UE, the ES cell does not switch on its own cell.

(2) An MME Notifies a Serving Cell of the Result of the Access Restriction Control.

When receiving an access restriction control request message from the serving cell, the MME may notify the serving cell of the access restriction control result as an access restriction control response message. This notification may be made through S1 signaling.

If the wake-up process activation target UE can access a wake-up process target ES cell, the serving cell notifies the ES cell of a wake-up request. This notification may be made through X2 signaling.

The ES cell that has received the wake-up request switches on its own cell. Upon switch on, the ES cell shifts from the dormant state to the active state.

If the wake-up process activation target UE cannot access a wake-up process target ES cell, the serving cell does not notify the ES cell of a wake-up request.

(3) An MME Determines Whether to Make a Wake-Up Request to a Wake-Up Process Target ES Cell Based on the Result of the Access Restriction Control.

If the wake-up process activation target UE can access a wake-up process target ES cell, the MME notifies the ES cell of a wake-up request. The ES cell that has received the wake-up request from the MME switches on its own cell. Upon switch on, the ES cell shifts from the dormant state to the active state.

If the wake-up process activation target UE cannot access a wake-up process target ES cell, the MME does not notify the ES cell of a wake-up request.

Differently from the specific examples (1) and (2), in the specific example (3), the MME notifies a wake-up process target ES cell of a wake-up request by itself, thus simplifying the process. A control delay can thus be reduced.

A rejection process will be disclosed below. When the wake-up process activation target UE cannot access the wake-up process target ES cell, the ES cell that has received the result of the access restriction control from the NIME may notify the serving cell of a reject message. The ES cell may also notify the UE of a reject message. This method is applicable to the process (1) above.

If the wake-up process activation target UE cannot access the wake-up process target ES cell, the serving cell that has received the access restriction control result from the MME notifies the UE of a reject message. This method is applicable to the process (2) above.

If the wake-up process activation target UE cannot access the wake-up process target ES cell, the MME notifies the ES cell of a reject message. The MME may notify the serving cell of a reject message. The NME may also notify the UE of a reject message. This method is applicable to the process (3) above.

FIG. 11 shows an example sequence of the wake-up process in a communication system of a third modification of the first embodiment. FIG. 11 shows the case where an MME has the access restriction information of a UE when an ES cell performs access restriction control.

In step ST1401, the ES cell is in the dormant state.

In steps ST1402 and ST1403, the UE notifies the ES cell in the dormant state of the identifier of the UE via the serving cell. Specifically, in step ST1402, the UE notifies the serving cell of the identifier of its own UE. For example, RRC signaling is used. In step ST1403, the serving cell that has received the identifier of its own UE from the UE notifies the ES cell of the identifier of the UE. For example, X2 signaling is used. This allows the ES cell to obtain the identifier of the UE.

In steps ST1404 and ST1405, the UE makes a wake-up request to the ES cell via the serving cell. Specifically, in step ST1404, the UE that has detected the presence of the ES cell in its vicinity notifies the serving cell of a wake-up request message. In step ST1405, the serving cell that has received the message notifies the ES cell of the wake-up request message.

In step ST1404, the UE may include the identifier of the detected ES cell in the wake-up request message and then notify the serving cell. The serving cell can use the received identifier of the ES cell to recognize to which ES cell it should notify of a wake-up request message.

In step ST1404, the UE may include the UE identifier in a wake-up request message and notify the serving cell. In step ST1405, the serving cell may include the identifier of the UE and the identifier of the ES cell being a wake-up process target in the wake-up request message and notify the ES cell. When the identifier of the UE is notified in steps ST1404 and ST1405, the notification of the UE identifier is not required in advance in steps ST1402 and ST1403. This reduces an amount of signaling.

In step ST1406, the ES cell that has received the wake-up request message notifies the MME of an access restriction control request message. The ES cell includes the UE identifier and the access restriction information of the ES cell in an access restriction control request message and notifies the MME.

The access restriction information of the ES cell may be notified through signaling different from that of the access restriction control request message. The access restriction information of the ES cell may be included in another message, which is notified to the MME by the ES cell, and notified. Consequently, as in the case where access restriction information is configured and the case where the access restriction information is changed in time, the access restriction information can be notified to the MME at a timing different from that of the access restriction control request, thus enabling flexible control.

In step ST1407, the MME that has received the access restriction control request uses the access restriction information of a UE which is possessed by the own MME to derive the access restriction information of the UE from the identifier of the UE. The MME performs access restriction control using the derived access restriction information of the UE and the access restriction information of the ES cell which has been received from the ES cell. Specifically, the MME judges whether the UE can access the ES cell.

If the UE can access the ES cell, the MME moves to step ST1409 and notifies the ES cell of an access restriction control response message. The information indicating an access permission is included in the access restriction control response message of step ST1409.

If the UE cannot access the ES cell, the MME moves to step ST1408 and notifies the ES cell of an access restriction control response message. The information indicating an access denial is included in the access restriction control response message of step ST1408.

After notifying of the access restriction control response message in step ST1408, the MME moves to the process of waiting for an access restriction control request message of step ST1406.

When the access restriction control request message and the access restriction information of the ES cell are notified through different signalings, the MME may notify of the access restriction control response message in step ST1408 and then move to the process of waiting for the notification of the access restriction control request message and the access restriction information of the ES cell. This is effective when the access restriction information of the ES cell is changed in time. When not being notified of the access restriction information of the ES cell and receiving the access restriction control request message, the MME may perform access restriction control using the access restriction information of the ES cell at this point.

In step ST1410, the ES cell judges whether it has received the access permission from the MME as an access restriction control response message, that is, has received an access permission or an access denial.

If judging that it has received the access permission, in step ST1413, the ES cell switches on its own cell. Upon switch on, in step ST1414, the ES cell shifts to the active state.

If judging that it has received an access denial, the ES cell does not switch on its own cell and returns to the process of waiting for of a wake-up request message in step ST1405.

If judging that it has received an access denial, in step ST1411, the ES cell may notify the serving cell of a wake-up reject message that is a reject message to the wake-up request message.

The identifier of the wake-up process activation target UE may be included in the wake-up reject message. The wake-up reject message may also include the information described in the first embodiment. The identifier of its own cell may also be included. Consequently, the serving cell can recognize a UE whose access has been rejected by access restriction control. The serving cell can also recognize for what reason access has been rejected. The serving cell can also recognize by which ES cell access has been rejected.

In step ST1412, the serving cell may notify the UE of a wake-up reject message to notify that access has been rejected by access restriction control. The wake-up reject message may include the information described above. The wake-up reject message may also include the identifier of the ES cell subjected to the access restriction control. Consequently, the UE can recognize that access has been rejected by access restriction control. The UE can also recognize for what reason access has been rejected. The UE can also recognize by which ES cell access has been rejected.

When wait timer information is included in the wake-up reject message, for example, by determining in advance that the activation of the wake-up process for the ES cell is prohibited for a duration set by a wait timer, the UE that has received the wait timer information of the wait timer can be prevented from performing a wake-up request to the ES cell for a period set by the wait timer even if the UE is adjacent to the ES cell and detects the ES cell again. This eliminates the need for unnecessary signaling. As the entire communication system, consequently, the amount of signaling can be reduced, and the processing load and power consumption of the UE, the serving cell, and the ES cell can be reduced.

Alternatively, it is determined in advance that not to perform the measurement of the ES cell is allowed for a duration set by the wait timer. The UE that has received the wait timer information of the wait timer can remove this ES cell from measurement targets for a period set by the wait timer. The UE thus does not detect the ES cell that is inaccessible and does not make a wake-up request. This requires neither unnecessary measurement process nor unnecessary signaling. As the entire communication system, consequently, the amount of signaling can be reduced, and the processing load and power consumption of the UE, the serving cell, and the ES cell can be reduced.

The method disclosed in this modification achieves effects similar to those of the first embodiment.

In this modification, the MME performs access restriction control. This reduces the load of the control process on the RAN side of the UE, the serving cell, and the ES cell. The power consumption of the serving cell and the ES cell can thus be reduced.

The MME performs access restriction control, thus eliminating the need of the UE to notify the ES cell of the access restriction information of the UE. As the entire communication system, consequently, the amount of signaling can be reduced.

The MME performs access restriction control, thus enabling application to the case where the MME has access restriction information. This eliminates the need of the MME to notify another node of the access restriction information. As the entire communication system, consequently, the amount of signaling can be reduced.

The first embodiment to the third modification of the first embodiment have disclosed the method of performing access restriction in the wake-up process of the ES cell in the dormant state. In the use of this method, the access restriction, which is conventionally performed when the wake-up process activation target UE performs the access process for the ES cell after the ES cell shifts to the normal operation state, may be omitted. This is because the access restriction of the wake-up process activation target UE has been performed in the wake-up process of the ES cell, thus allowing access of the wake-up process activation target UE to the ES cell that has been switched on to shift to the normal operation state. This reduces the amount of the control process of a node that performs the conventional access restriction. Thus, a control delay and the power consumption of the node can be reduced.

Alternatively, the access restriction, which is conventionally performed when the wake-up process activation target UE performs the access process for the ES cell after the ES cell shifts to the normal operation state, may be performed. Access restriction is performed twice including the access restriction in the wake-up process, thus preventing malfunction.

These may be appropriately applied in response to a request as a communication system, which may be determined in advance as a communication system.

Second Embodiment

This embodiment will disclose a specific example of the method of performing access restriction control when access restriction is based on EAB.

In extended access class barring (EAB) and access class barring (ACB), which are hereinafter also referred to as "EAB/ACB", the UE performs access restriction control. When the ES cell is in the dormant state, however, the ES cell does not broadcast the system information. The conventional method of performing access restriction control thus cannot be used, in which a UE receives the broadcasted system information and makes a judgment.

Disclosed here is a method of performing EAB control in the wake-up process in which the ES cell in the dormant state is woken up.

FIG. 12 shows an example sequence of the wake-up process in a communication system of a second embodiment. FIG. 12 shows the case where the ES cell performs access restriction control based on the access class (AC) for EAB of the UE in the wake-up process. FIG. 12 also shows the case where the UE performs a DS measurement report to the serving cell, and the serving cell that has received the measurement report transmits a wake-up message to the ES cell.

In step ST1501, the ES cell is in the dormant state.

In step ST1502, the UE performs DS measurement of the ES cell. The UE may perform DS measurement for detecting an ES cell. The serving cell notifies in advance the UE of the DS configuration of an ES cell that is to be subjected to DS measurement. This notification message is referred to as a measurement control message. The identifier of the ES cell and the DS configuration may be associated with each other and notified. The UE performs DS measurement using the DS configuration.

The measurement control message may include the information indicating whether the ES cell is in the dormant state or the active state. This allows the UE to perform DS measurement of only the ES cell in the dormant state. Or, the measurement control message may include the information indicating whether DS measurement is for wake-up of the ES cell. This allows the UE to perform DS measurement only for wake-up.

The serving cell may obtain in advance the information indicating whether the ES cell is in the dormant state or the active state.

Disclosed below is a method in which an ES cell notifies a serving cell of the information indicating whether the ES cell is in the dormant state or the active state. The ES cell notifies a neighbor cell. The information may be notified through X2 signaling. Specifically, the information may be notified in the X2 setup process. The information may be included in an X2 setup request message. The information may be notified in an eNB update process. The information may be included in an eNB configuration update message. An X2 message may be newly provided for notification.

In another method, the ES cell may notify a neighbor cell via the MME. The information may be notified through S1 signaling.

When the DS measurement in the UE is not limited to an ES cell in the dormant state, a measurement report may include the information indicating whether an ES cell targeted for report is in the dormant state or the active state. This allows the serving cell to explicitly recognize whether the ES cell notified in the measurement report is in the dormant state or the active state, thus preventing malfunction.

The serving cell may obtain in advance the information indicating whether its neighbor cell is an ES cell. The cell notifies the neighbor cell of the information indicating whether its own cell is an ES cell. The information may be notified through X2 signaling. Specifically, the information may be notified in the X2 setup process. The information may be included in an X2 setup request message. The information may be notified in the eNB update process. The information may be included in an eNB configuration update message. An X2 message may be newly provided for notification.

In another method, the ES cell may notify the neighbor cell via the MME. The information may be notified through S1 signaling.

This is effective when not all the cells are ES cells. The serving cell can configure an ES cell as the cell targeted for measurement in a measurement control message.

The serving cell may obtain the information about an ES cell in advance. The pieces of information described above may be combined as the information about an ES cell. For example, the cell may combine and associate the cell identifier, the information indicating whether the cell is an ES cell, the wake-up signal configuration information, and the like with each other and then notify its neighbor cell. When the cell is an ES cell, for example, the cell may combine and associate the cell identifier, the information indicating whether the cell is an ES cell, the information indicating whether the cell is in the dormant state or the active state, the DS configuration information, the wake-up signal configuration information, and the like with each other and then notify its neighbor cell.

The UE measures the received quality of the detected DS. The received quality may be received power. Examples of the received quality include reference signal received quality (RSRQ) and reference signal received power (RSRP). When the DS received quality satisfies a predetermined criterion, the UE notifies the serving cell of a measurement report.

In step ST1503, the UE performs a DS measurement report to the serving cell. The following seven, (1) to (7), will be disclosed as specific examples of the information included in the measurement report.
(1) Access restriction information of a UE, which is herein AC information for EAB.
(2) UE identifier, which may be associated with the AC information for EAB of a UE.
(3) Identifier (event) of a predetermined criterion.
(4) DS received quality of an ES cell.
(5) DS received power of an ES cell.
(6) Identifier of an ES cell, which may be associated with the identifier of a predetermined criterion, the DS received quality of an ES cell, and the DS received power of an ES cell.

(7) Combination of (1) to (6) above.

The serving cell is notified of the information of the specific examples (1) and (2) above, so that the serving cell can recognize the identifier of a wake-up process activation target UE and the access restriction information of the UE.

The serving cell is notified of the information of the specific example (6) above, so that the serving cell can recognize which ES cell is a wake-up process target.

The method in which a UE notifies a serving cell of the access restriction information of its own UE has been disclosed above. In another method, the serving cell may request the information about access control from the UE. The message for the request may be notified through RRC signaling. The information indicating the request may be included in a measurement control message and notified. In the case of the measurement report of an ES cell, the contents of the request may include the access restriction information of its own UE. Alternatively, the request information may be composed of a plurality of bits such that the type of access restriction information is specified.

The UE notifies the ES cell of the information about access control of its own UE in response to the request. The UE may notify the serving cell of the information about access control of its own UE in response to the request. RRC signaling may be used in the notification. The information may be notified in a measurement report. Control is simplified through application to the case where the request information is included in a measurement control message.

The serving cell that has received a DS measurement report from the UE determines, from the identifier of the ES cell which is included in the measurement report, the ES cell as a wake-up process target ES cell and, in step ST1504, notifies the wake-up process target ES cell of a wake-up request message. This message may be notified through X2 signaling.

When the UE performs DS measurement of ES cells in the dormant state as well as ES cells in the active state, the ES cells that the serving cell has been notified of in the measurement report by the UE include ES cells in the dormant state and ES cells in the active state.

The serving cell may judge, from the identifier of the ES cell included in the measurement report, whether the ES cell is in the dormant state or the active state. When the ES cell is in the dormant state, the serving cell determines the ES cell as a wake-up process target ES cell and notifies the ES cell of a wake-up request message. The method described above may be applied as the method in which the serving cell obtains the information indicating whether the ES cell is in the dormant state or the active state.

The serving cell may judge whether to wake up the ES cell using the information included in a DS measurement report and another piece of information of its own cell. When waking up the ES cell, the serving cell notifies a wake-up process target ES cell of a wake-up request. When not waking up the ES cell, the serving cell does not notify the wake-up process target ES cell of a wake-up request message. In this case, the serving cell may reconfigure an ES cell that is to be measured in the measurement control message and notify the UE.

The following five, (1) to (5), will be disclosed as specific examples of the information included in a wake-up request message.
(1) Access restriction information of a UE, which is herein AC for EAB.
(2) UE identifier, which is the identifier of a UE that has performed a measurement report. UE identifier may be associated with the AC information for EAB of a UE.

(3) PLMN information of a UE.
(4) Identifier of a serving cell.
(5) Combination of (1) to (4) above.

The ES cell is notified of the information of the specific examples (1) and (2) above, so that the ES cell can recognize the identifier of a wake-up process activation target UE and the access restriction information of the UE.

In step ST1505, the ES cell that has received the wake-up request message in step ST1504 performs access restriction control based on EAB control. Specifically, in step ST1505, the ES cell judges whether the wake-up process activation target UE can access its own cell using the identifier of the UE that has activated the wake-up process, the AC information for EAB which is associated with the identifier, and the access restriction configuration information for the access class for EAB of its own cell. Another piece of information included in the wake-up request message, such as the PLMN information of a UE, may be used to judge whether its own cell is accessible.

If the result of the access restriction control performed in step ST1505 shows that the UE that has activated the wake-up process can access its own cell, the ES cell moves to step ST1508 to switch on its own cell. Upon switch on, in step ST1509, the ES cell shifts from the dormant state to the active state.

If the result of the access restriction control performed in step ST1505 shows that the UE that has activated the wake-up process cannot access its own cell, the ES cell does not switch on its own cell. The ES cell may return to the process of waiting for a wake-up message of step ST1504.

When judging that the UE that has activated the wake-up process cannot access its own cell, the ES cell may notify the serving cell that has activated the wake-up process of a wake-up reject message. In step ST1506, the ES cell notifies the serving cell that has notified of the wake-up request of a wake-up reject message.

The wake-up reject message indicates that the wake-up request has been rejected. The wake-up reject message may include cause information or wait timer information. The cause information may be the information indicating that the rejection is due to access restriction. Herein, it may be indicated that access restriction is based on EAB.

The serving cell that has received the wait timer information may be prohibited from notifying a wake-up request to the ES cell for a duration set by the wait timer. Alternatively, the serving cell may perform a configuration such that the ES cell is not measured by a UE being served thereby for a duration set by the wait timer. The serving cell may be allowed to perform a configuration such that the ES cell is measured by a UE being served thereby after the expiration of the duration set by the wait timer.

The serving cell that has received the wake-up reject message may notify the wake-up process activation target UE of a wake-up reject message. In this case, in step ST1507, the serving cell notifies the UE of the wake-up reject message. The wake-up reject message indicates that the wake-up process target ES cell is inaccessible. The wake-up reject message may indicate that the ES cell cannot be woken up. In step ST1507, the UE that has received the wake-up reject message may be prevented from measuring the ES cell. Or, the UE may be prevented from performing a measurement report.

The wake-up reject message may include cause information or wait timer information. The cause information may be the information indicating that the rejection is due to access restriction. Herein, it may be indicated that access restriction is based on EAB.

The UE that has received the wait timer information may be prevented from measuring the ES cell for a duration set by the wait timer or may be prevented from performing a measurement report of the ES cell for the duration set by the wait timer.

The serving cell that has received the wake-up reject message may reconfigure an ES cell that is to be measured by the wake-up process activation target UE. The serving cell may perform a configuration such that the ES cell under access restriction is not measured. Notification may be made again in the measurement control message. Configuring the ES cell may be prevented in the measurement control message. Alternatively, the ES cell may be configured in a black list of the measurement control message and notified. Or, the ES cell may be configured in a gray list of the measurement control message and notified.

The method disclosed in this embodiment enables the introduction of EAB-based access restriction to the wake-up process for the ES cell in the dormant state which does not broadcast the system information. EAB control by the ES cell can restrict a wake-up process from a UE without access right, thus preventing the ES cell in the dormant state from switching itself on unnecessarily. That is to say, effects similar to those of the first embodiment can be achieved.

First Modification of Second Embodiment

This modification will disclose another specific example of the method of performing access restriction control when access restriction is based on EAB.

FIG. 13 shows an example sequence of the wake-up process in a communication system of a first modification of the second embodiment. FIG. 13 shows the case where a serving cell performs access restriction control based on AC for EAB of the UE in the wake-up process. FIG. 13 also shows the case where a UE performs a DS measurement report to the serving cell, and the serving cell that has received the measurement report transmits a wake-up message to the ES cell.

The serving cell performs access control after notifying the UE of the measurement control message. With reference to FIG. 13, the serving cell performs access restriction control, which is triggered by the DS measurement report from the UE.

In step ST1601, the ES cell is in the dormant state.

The serving cell obtains the access restriction information of the ES cell. In step ST1602, the ES cell notifies the serving cell of the system information of its own cell. The ES cell may notify of the SIB. The EAB access restriction information is included in the SIB15, and thus, the ES cell may notify of the SIB15. Alternatively, the ES cell may exclusively notify of the information about EAB access restriction, not of the system information. This reduces an amount of information notified.

The ES cell may notify of the identifier of its own cell together. The ES cell may associate the identifier of its own cell and the EAB access restriction information with each other and notify the serving cell.

This notification may be made through X2 signaling or may be an X2 setup request message. The ES cell notifies a neighbor cell of an X2 setup request message in its installation. When the notification is included, the amount of signaling can be reduced. A new message does not need to be provided, resulting in simplified control. Or, notification may be an eNB configuration update message. For example, when the access restriction information is changed, access restriction information of the ES cell may be included in the message and notified. This reduces an amount of signaling. A new message does not need to be provided, resulting in simplified control.

The EAB access restriction information may be notified in step ST1602 before the ES cell enters the dormant state. When the ES cell is installed or when the ES cell is in the active state before entering the dormant state, the ES cell may notify the neighbor cell of the EAB access restriction information of its own cell. This allows the serving cell to obtain the access restriction information of the ES cell.

In step ST1603, the UE performs DS measurement of the ES cell. The UE may perform DS measurement for detecting an ES cell. This is similar to the method disclosed in the second embodiment, and thus, description thereof will be omitted.

In step ST1604, the UE performs a DS measurement report to the serving cell. This is similar to the method disclosed in the second embodiment, and thus, description thereof will be omitted.

In step ST1604, the serving cell receives the identifier of the UE, the AC information for EAB which is associated with the identifier, and the identifier of the ES cell. The UE is a wake-up process activation target UE, and the ES cell targeted for a measurement report is an ES cell targeted for wake-up activation.

In step ST1605, the serving cell uses the identifier of the ES cell and the EAB access restriction information of the ES cell received in step ST1602 to derive the EAB access restriction information of the ES cell.

In step ST1605, the serving cell performs access restriction control based on EAB control using the EAB access restriction information of the wake-up process activation target UE and the EAB access restriction information of the wake-up process target ES cell. Specifically, the serving cell judges whether the wake-up process activation target UE can access the wake-up process target ES cell.

If the result of the access restriction control performed in step ST1605 shows that the wake-up process activation target UE can access the wake-up process target ES cell, the serving cell moves to step ST1607 and notifies the ES cell of a wake-up request message. The wake-up request message may be notified through X2 signaling.

If the result of the access restriction control performed in step ST1605 shows that the wake-up process activation target UE cannot access the wake-up process target ES cell, the serving cell does not notify the ES cell of a wake-up request message. In this case, the serving cell may return to the process of waiting for a DS measurement report from the UE in step ST1604.

In step ST1608, the ES cell that has received the wake-up request message in step ST1607 switches on its own cell. In step ST1609, consequently, the ES cell shifts from the dormant state to the active state.

The wake-up request message of step ST1607 may include the identifier of the wake-up process target ES cell. This allows the ES cell to check whether a wake-up message is directed to its own cell, thus preventing malfunction. The wake-up request message may include the identifier of the serving cell. For example, the serving cell may be notified of a wake-up process complete message after the ES cell switches itself on or shifts to the active state. At that time, the identifier of the serving cell can be used.

When judging that the UE that has activated the wake-up process cannot access the wake-up process target ES cell, the serving cell may notify the wake-up process activation target UE of a wake-up request reject message. In this case, in step ST1606, the serving cell notifies the UE that has notified of the wake-up request of a wake-up reject message.

The process by the UE that has received the wake-up reject message is similar to the process disclosed in the second embodiment, and thus, description thereof will be omitted.

If judging that the UE that has activated the wake-up process cannot access the wake-up process target ES cell, the serving cell may reconfigure an ES cell that is measured by the wake-up process activation target UE. The reconfiguration is similar to that of the method disclosed in the second embodiment, and thus, description thereof will be omitted.

The method disclosed in this modification enables the introduction of EAB-based access restriction to the wake-up process for the ES cell in the dormant state which does not broadcast the system information. Specifically, the wake-up process activation target UE can be subjected to EAB control by the serving cell. This restricts the wake-up process from a UE without right to access the wake-up process target ES cell, thus preventing the ES cell in the dormant state from switching itself on unnecessarily. Therefore, effects similar to those of the first modification of the first embodiment can be achieved.

Second Modification of Second Embodiment

This modification will disclose another specific example of the method of performing access restriction control when access restriction is based on EAB.

FIG. 14 shows an example sequence of the wake-up process in a communication system of a second modification of the second embodiment. FIG. 14 shows the case where a serving cell performs access restriction control based on AC for EAB of a UE in the wake-up process. FIG. 14 also shows the case where the UE performs a DS measurement report to the serving cell, and the serving cell that has received the measurement report transmits a wake-up message to the ES cell.

The serving cell performs access control before notifying the UE of a measurement control message. With reference to FIG. 14, the serving cell performs access restriction control, which is triggered by an RRC connection establishment request from the UE.

In step ST1701, the ES cell is in the dormant state.

The serving cell obtains the access restriction information of the ES cell. In step ST1702, the ES cell notifies the serving cell of the system information of its own cell. This is similar to the method disclosed in the first modification of the second embodiment, and thus, description thereof will be omitted.

The serving cell obtains the access restriction information of the UE. In step ST1703, the UE notifies the serving cell of the AC information for EAB of its own UE. The UE may notify the serving cell of the access restriction information through RRC signaling. As RRC signaling, the access restriction information may be notified in an RRC connection establishment process. For example, the access restriction information may be included in an RRC connection establishment request message and notified or may be included in an RRC connection establishment complete message and notified. Alternatively, the access restriction information may be notified in an RRC connection reestablishment process. For example, the access restriction information may be included in the RRC connection reestablishment request message and notified or may be included in the RRC connection reestablishment complete message and notified.

The UE may also notify of the identifier of its own UE by associating it with the access restriction information. This allows the serving cell to recognize which UE has what access restriction information.

Disclosed here is a method in which a UE notifies a serving cell of the access restriction information of its own UE. In another method, the serving cell may request the information about access control from the UE. The message for the request may be notified through RRC signaling. The information indicating the request may be notified in RRC connection establishment. The contents of the request may show that the AC for EAB of its own UE is transmitted to the serving cell. Alternatively, the request information may be composed of a plurality of bits such that the type of the access restriction information is specified.

The UE may notify the serving cell of the information about access control of its own UE in response to the request. The information may be notified through RRC signaling. The information may be notified in an RRC connection establishment process.

The request information is notified in the RRC connection establishment process, resulting in simplified control. For example, the serving cell includes the request for the information about access control in an RRC connection establishment permission message to the RRC connection establishment request of the UE and then notifies the UE. The UE that has received the message notifies of the information about access control of its own UE in the RRC connection establishment complete message. This allows the serving cell to request access restriction information from the UE, thereby obtaining the access restriction information of the UE as required.

In step ST1704, the serving cell uses the AC information for EAB of the UE RRC-connected therewith and the AC information for EAB of the ES cell to perform access restriction control based on EAB control. For example, an accessible ES cell or inaccessible ES cell may be derived per UE. The list of ES cells accessible to the UE or the list of ES cells inaccessible to the UE may be created and stored. The serving cell may perform access restriction control, which is triggered by the acquisition of the access restriction information from the UE.

The serving cell may perform access restriction control when configuring the DS measurement of the ES cell for a predetermined UE or the DS measurement for detecting an ES cell. In this case, for example, in step ST1704, the serving cell performs access restriction control based on EAB control using the AC information for EAB of the UE and the AC information for EAB of the ES cell.

If the ES cell is accessible to the UE, the serving cell configures the ES cell as an ES cell targeted for measurement. If the ES cell is inaccessible to the UE, in step ST1705, the serving cell removes the ES cell from cells targeted for measurement. The list described above may be used in the access restriction control.

In step ST1706, the serving cell notifies the UE of a measurement control message. The serving cell configures an ES cell accessible to the UE as a measurement cell in the message. The measurement cell may be configured using a cell identifier.

The measurement control message may include the DS configuration of the ES cell as the configuration of a measurement cell. The measurement control message may also include the wake-up signal configuration of an ES cell. These may be associated with a cell identifier.

The DS configuration or wake-up signal configuration may be provided dedicated to or in common to ES cells, or may be provided per cluster. In the case of "per cluster", the identifier of a cluster may be notified together. The sequence of cell-dedicated identities may be used for the DS.

The wake-up signal configuration may be used when the UE transmits a wake-up signal to the ES cell. Alternatively, the wake-up signal configuration may be notified when the UE transmits a wake-up signal to the ES cell.

This prevents the serving cell from configuring, for the UE, an ES cell inaccessible to the UE as a measurement cell.

In step ST1707, the UE performs DS measurement of the ES cell configured as a measurement cell. The UE may perform DS measurement for detecting the ES cell. This is similar to the method disclosed in the second embodiment, and thus, description thereof will be omitted.

In step ST1708, the UE performs a DS measurement report to the serving cell. This is similar to the method disclosed in the second embodiment, and thus, description thereof will be omitted.

In step ST1708, the serving cell receives the identifier of the ES cell targeted for a measurement report. In step ST1709, the serving cell notifies the ES cell of a wake-up request message. The wake-up request message may be notified through X2 signaling. This is similar to the method disclosed in the first modification of the second embodiment, and thus, description thereof will be omitted.

In step ST1710, the ES cell that has received the wake-up request message in step ST1709 switches on its own cell. In step ST1711, the ES cell accordingly shifts from the dormant state to the active state.

The method disclosed in this modification enables the introduction of EAB-based access restriction to the wake-up process for the ES cell in the dormant state which does not broadcast the system information. Specifically, EAB control can be performed by the serving cell. Consequently, the cell that denies the access of the UE can be removed from the measurement configuration of the ES cell, thus preventing the UE from measuring an ES cell to which the UE has no access right. As described above, the wake-up process from the UE without right to access the wake-up process target ES cell can be limited, thus preventing the ES cell in the dormant state from switching itself on unnecessarily. Therefore, effects similar to those of the first modification of the first embodiment can be achieved.

Another method in which a serving cell performs access restriction control of the UE will be described. In step ST1704, the serving cell judges whether the ES cell has the same access restriction information as that of its own cell. The serving cell judges that an ES cell having the same access restriction information as that of its own cell is accessible. In step ST1705, the serving cell may configure, as a measurement target, the ES cell judged to be accessible. That is to say, the serving cell configures, for the UE, an ES cell having the same access restriction information as that of its own cell as the target that is to be subjected to DS measurement for detecting an ES cell or DS measurement of the ES cell.

The UE has been connected with the serving cell, and thus, can access the access restriction information of the serving cell. The UE accordingly can also access an ES cell having the same access restriction information as that of the serving cell.

This eliminates the need of the UE to notify the serving cell of the access restriction information of the UE. This reduces signalings.

Third Modification of Second Embodiment

This modification will disclose another specific example of the method of performing access restriction control when access restriction is based on EAB.

Figure 15:
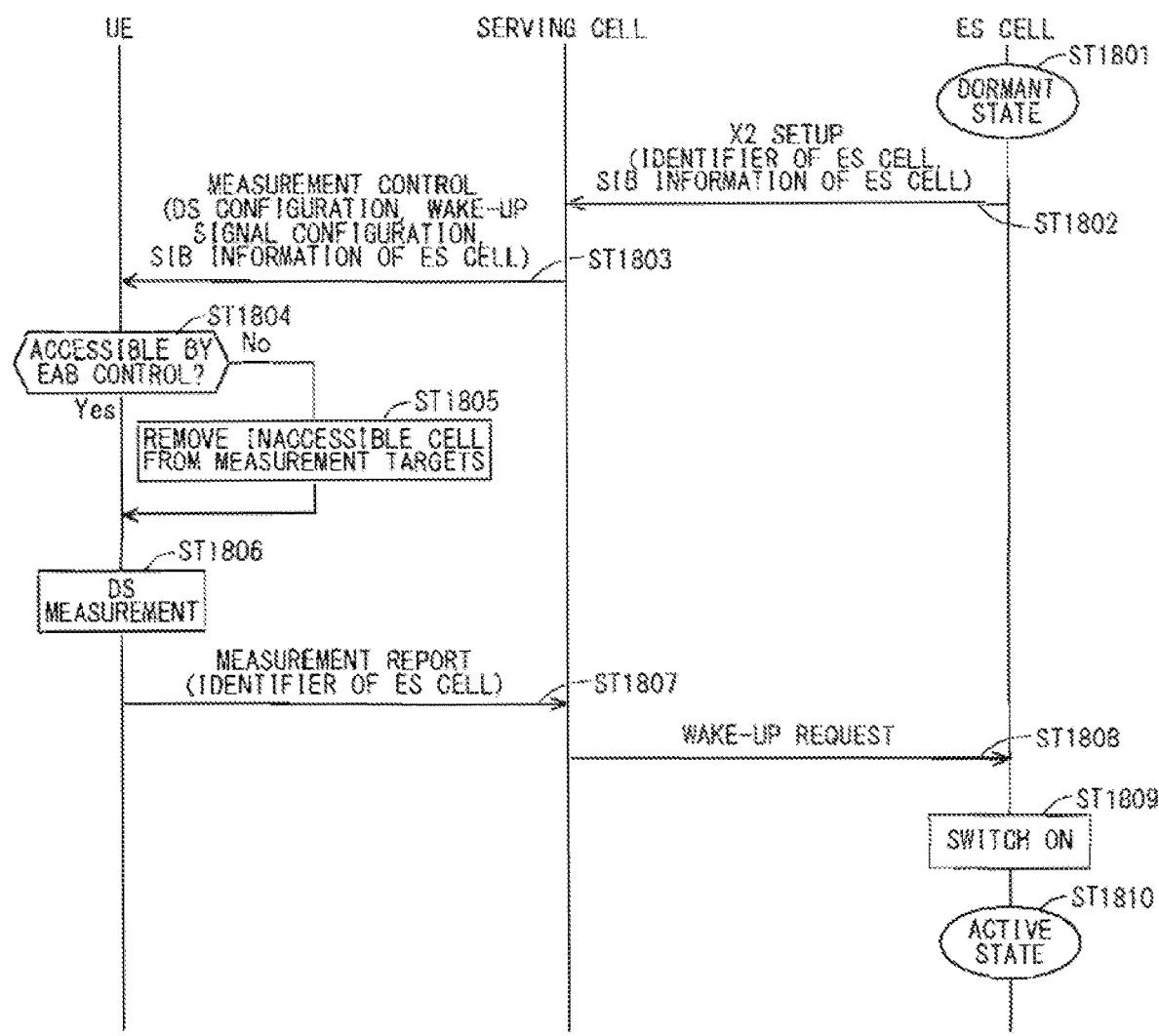
FIG. 15 shows an example sequence of a wake-up process in a communication system of a third modification of the second embodiment.

FIG. 15 shows an example sequence of the wake-up process in a communication system of a third modification of the second embodiment. FIG. 15 shows the case where the UE performs access restriction control based on AC for EAB in the wake-up process. FIG. 15 also shows the case where the UE performs a DS measurement report to the serving cell, and the serving cell that has received the measurement report transmits a wake-up message to the ES cell.

In step ST1801, the ES cell is in the dormant state.

The UE obtains the access restriction information of the ES cell as described below. In step ST1802, first, the ES cell notifies the serving cell of the system information of its own cell. This is similar to the method disclosed in the first modification of the second embodiment, and thus, description thereof will be omitted.

In step ST1803, the serving cell notifies the UE of a measurement control message. The serving cell configures the DS measurement of the ES cell for a predetermined UE or the DS measurement for detecting an ES cell in the message. A measurement cell may be configured using a cell identifier. The measurement control message may include the DS configuration of the ES cell as the configuration of a measurement cell. The measurement control message may include the wake-up signal configuration of an ES cell. These may be associated with the cell identifier.

The serving cell notifies the UE of the information about the access restriction of an ES cell (hereinafter also referred to as "access-restriction-related information"). RRC signaling may be used in the notification of access-restriction-related information. The access-restriction-related information of the ES cell may be included in the measurement control message notified to the UE by the serving cell and notified. The access-restriction-related information may be associated with the identifier of an ES cell and notified. The access-restriction-related information may be associated with the configuration of a measurement cell and notified. Herein, the access-restriction-related information is the access restriction information regarding the AC for EAB of the ES cell. Alternatively, the system information of the ES cell may be notified. SIB information may be notified. The access restriction information regarding the AC for EAB is included in the SIB15, and thus, the SIB15 may be notified.

As a result, the UE can obtain the access restriction information of the ES cell.

In step ST1804, the UE uses the AC information for EAB which is held by its own UE and the access restriction information regarding the AC for EAB of the ES cell which has been configured in the measurement control message to perform access restriction control based on EAB control. Specifically, the UE judges whether the ES cell configured in the measurement control message is accessible.

If the result of the access restriction control shows that the ES cell in the measurement configuration is accessible, the UE measures the ES cell in accordance with the measurement configuration.

If the result of the access restriction control shows that the ES cell in the measurement configuration is inaccessible, in step ST1805, the UE removes the inaccessible ES cell from measurement targets. Or, the UE may perform a configuration such that the ES cell is not measured.

As a result, the UE does not measure an inaccessible ES cell. When an ES cell is detected in the measurement, the ES cell is limited to an accessible ES cell.

In step ST1806, the UE performs DS measurement of the ES cell configured as a measurement cell. The UE may perform DS measurement for detecting the ES cell. This is similar to the method disclosed in the second embodiment, and thus, description thereof will be omitted.

In step ST1807, the UE performs a DS measurement report to the serving cell. This is similar to the method disclosed in the second embodiment, and thus, description thereof will be omitted.

In step ST1807, the serving cell receives the identifier of the ES cell targeted for a measurement report. In step ST1808, the serving cell notifies the ES cell of a wake-up request message. The wake-up request message may be notified through X2 signaling. This is similar to the method disclosed in the first modification of the second embodiment, and thus, description thereof will be omitted.

In step ST1809, the ES cell that has received the wake-up request message in step ST1808 switches on its own cell. In step ST1810, the ES cell accordingly shifts from the dormant state to the active state.

The access restriction control of step ST1804 may be performed after the DS measurement of an ES cell or the DS measurement for detecting an ES cell in step ST1806. Thus, an ES cell that is to be subjected to access restriction control can be limited to an ES cell to which an event to be reported was triggered as a result of the DS measurement. This simplifies control.

If a measurement report target ES cell is made accessible by access restriction control, the UE performs a DS measurement report to the serving cell.

If the measurement report target ES cell is made inaccessible by access restriction control, the UE does not perform a DS measurement report to the serving cell. Furthermore, the UE may remove the ES cell from measurement targets and move to the operation of waiting for a measurement control message from the serving cell again.

If the measurement report target ES cell is made inaccessible by access restriction control, the UE may notify the serving cell that the ES cell is inaccessible. The cell identifier of the inaccessible ES cell may be notified. Notification may be made through RRC signaling. For example, notification may be made as a measurement report. Notification may be made by being included in the measurement report of step ST1807. The serving cell that has received from the UE a fact that the ES cell is inaccessible may configure a different ES cell in the measurement control message for the UE. This allows the UE to measure an accessible ES cell.

The method disclosed in this modification enables the introduction of EAB-based access restriction to the wake-up process for the ES cell in the dormant state which does not notify of the system information. Specifically, EAB control can be performed by the UE. The UE can accordingly remove a cell that denies access from the measurement configuration of the ES cell, so that the UE does not measure an ES cell to which the UE has no access right. This restricts a wake-up process from a UE without right to access the wake-up process target ES cell, thus preventing the ES cell in the dormant state from switching itself on unnecessarily.

Therefore, effects similar to those of the second modification of the first embodiment can be achieved.

Third Embodiment

This embodiment will disclose another specific example of the method of performing access restriction control when access restriction is based on EAB.

FIG. 16 shows an example sequence of the wake-up process in a communication system of a third embodiment. FIG. 16 shows the case where the ES cell performs access restriction control based on AC for EAB of the UE in the wake-up process. FIG. 16 also shows the case where the UE transmits a wake-up signal to the ES cell.

In step ST1901, the ES cell is in the dormant state.

The ES cell obtains the access restriction information of the UE as described below.

The UE notifies the ES cell of the AC information for EAB of its own UE. The case where notification is made via the serving cell will be disclosed. In step ST1902, the UE notifies the serving cell of the access restriction information. This is similar to the method disclosed in the second modification of the second embodiment, and thus, description thereof will be omitted.

The serving cell that has obtained the access restriction information from the UE in step ST1902 configures, for the UE, a UE-dedicated sequence for wake-up signals.

The UE-dedicated sequence is used for a wake-up signal that is notified by the UE to wake up the ES cell. The UE-dedicated sequence allows the ES cell to separate wake-up signals per UE. UE-dedicated parameters may be configured as the UE-dedicated sequence for the wake-up signal. The following four, (1) to (4), will be disclosed as specific examples of the UE-dedicated parameters.

(1) Sequence used for wake-up signals.
(2) Wake-up signal transmission timing, a non-limiting example of which is a transmission subframe.
(3) Wake-up signal transmission frequency, examples of which include a subcarrier and resource block (RB).
(4) Root index.

PRACH may be used for wake-up signals.

In step ST1903, the serving cell that has received the AC information for EAB from the UE notifies the ES cell of the AC information for EAB of the UE. The information may be notified through X2 signaling. In this case, the UE-dedicated sequence for wake-up signals, which has been configured for the UE, is notified. The AC information for EAB of the UE and the UE-dedicated sequence may be associated with the UE identifier and notified.

The serving cell may notify the ES cell of another piece of information. The following three, (1) to (3), will be disclosed as specific examples of the other piece of information.

(1) PLMN information of a UE.
(2) Identifier of a serving cell.
(3) Combination of (1) and (2) above, which may be combined with access restriction information and UE-dedicated sequence and notified or may be associated with the UE identifier and notified.

In step ST1904, the serving cell notifies the UE of a measurement control message. The serving cell configures DS measurement of an ES cell for a predetermined UE or DS measurement for detecting an ES cell in the message. A measurement cell may be configured using a cell identifier. As the configuration of a measurement cell, the DS configuration of an ES cell may be included. Alternatively, the wake-up signal configuration of an ES cell may be included. These may be associated with the cell identifier.

The serving cell includes the UE-dedicated sequence for wake-up signals, which has been configured for the UE, in the wake-up signal configuration of the ES cell and then notifies the UE. The information about the access restriction may be associated with the identifier of the ES cell and notified. Alternatively, the information may be associated with the configuration of a measurement cell and notified.

Although it has been disclosed that notification is made in a measurement control message, notification may be made through another RRC signaling. For example, an RRC resource reconfiguration message may be used. Alternatively, a new RRC signaling may be provided and notified.

In step ST1905, the UE that has received the measurement control message from the serving cell in step ST1904 performs DS measurement of the ES cell configured as a measurement cell. The UE may perform DS measurement for detecting the ES cell. This is similar to the method disclosed in the second embodiment, and thus, description thereof will be omitted.

When the criterion for the DS measurement of an ES cell or the DS measurement for detecting an ES cell is satisfied in step ST1905, in step ST1906, the UE transmits a wake-up signal for requesting wake-up to the ES cell whose criterion has been satisfied. The UE transmits a wake-up signal, with the wake-up signal configuration received from the serving cell.

The UE-dedicated sequence received from the serving cell is used for this wake-up signal. The wake-up signal sequence is derived with the UE-dedicated sequence and the identifier of the ES cell.

The UE may use the UE-dedicated parameter received from the serving cell for the wake-up signal. Consequently, the UE that has transmitted the wake-up signal can be specified.

The UE may use the identifier of the ES cell which has been obtained in the detection of DS for a wake-up signal. Alternatively, when a wake-up signal is configured per cluster, the UE may use the identifier of a cluster. Still alternatively, a wake-up signal common to ES cells may be configured, and in that case, the UE may use a sequence common to the ES cells. Consequently, to which ES cell or to an ES cell of which cluster the wake-up signal is directed can be determined, or whether the wake-up signal is directed to an ES cell can be determined.

The ES cell that has received the wake-up signal from the UE in step ST1906 uses the cell identifier used for the wake-up signal to judge whether the wake-up signal is directed to its own cell. Alternatively, the ES cell may detect a wake-up signal directed to its own cell from the cell identifier of its own cell.

For a wake-up signal directed to its own cell, the ES cell obtains the UE-dedicated sequence used for the wake-up signal and performs access restriction control in step ST1907. For a wake-up signal not directed to its own cell, the ES cell does not process the wake-up signal.

In step ST1907, the ES cell performs access restriction control. The ES cell uses the UE-dedicated sequence obtained from the wake-up signal received from the UE in step ST1906 to derive the UE identifier associated with the UE-dedicated sequence received from the serving cell in step ST1903. Consequently, the UE that has transmitted the wake-up signal can be identified. The ES cell derives the access restriction information of the UE that has also been received in step ST1903 from the identifier of the UE. This allows the ES cell to obtain the access restriction information of the UE that has transmitted the wake-up signal. The access restriction information is herein AC information for EAB.

The ES cell uses the obtained access restriction information of the UE and the access restriction information of its own cell, that is, the access restriction information regarding AC for EAB to perform access restriction control of the wake-up process activation target UE. Specifically, the ES cell judges whether the wake-up process activation target UE can access its own cell.

The ES cell determines whether to switch on its own cell based on the result of the access restriction control performed in step ST1907.

If the result of the access restriction control performed in step ST1907 shows that the UE that has activated the wake-up process can access its own cell, the ES cell moves to step ST1910 to switch on its own cell. Upon switch on, in step ST1911, the ES cell shifts from the dormant state to the active state.

If the result of the access restriction control performed in step ST1907 shows that the UE that has activated the wake-up process cannot access its own cell, the ES cell does not switch on its own cell. The ES cell may return to the process of waiting for a wake-up signal.

When judging that the UE that has activated the wake-up process cannot access its own cell, the ES cell may notify the UE that has activated the wake-up process of a wake-up request reject message. Notification may be performed via the serving cell. In step ST1908, the ES cell notifies the serving cell that has notified of the wake-up request of a reject message. The method of notifying the UE of a reject message via the serving cell is similar to the method disclosed in the second embodiment, and thus, description thereof will be omitted.

The method disclosed in this embodiment enables the introduction of EAB-based access restriction to the wake-up process for the ES cell in the dormant state which does not broadcast the system information. EAB control by the ES cell can restrict the wake-up process due to the transmission of a wake-up signal from a UE without access right. This prevents the ES cell in the dormant state from switching itself on unnecessarily. This achieves effects similar to those of the second embodiment.

The UE directly transmits a wake-up signal to the ES cell, thus reducing the control load of the serving cell.

First Modification of Third Embodiment

This modification will disclose another specific example of the method of performing access restriction control when the access restriction is based on EAB.

Figure 17:
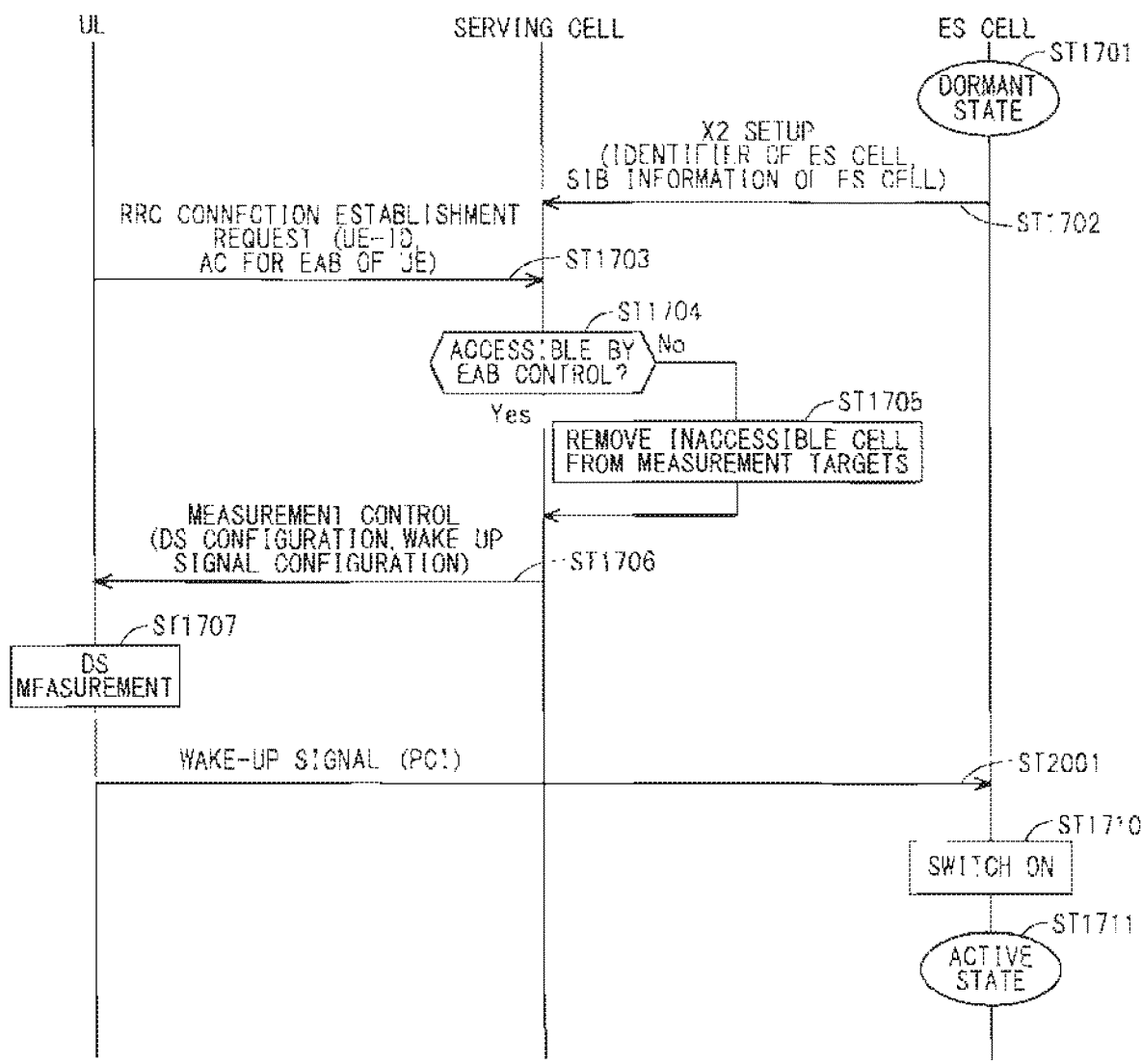
FIG. 17 shows an example sequence of a wake-up process in a communication system of a first modification of the third embodiment.

FIG. 17 shows an example sequence of the wake-up process in a communication system of a first modification of the third embodiment. FIG. 17 shows the case where the serving cell performs access restriction control based on AC for EAB of the UE in the wake-up process. FIG. 17 also shows the case where the UE transmits a wake-up signal to the ES cell. The same steps as those of FIG. 14 will be denoted by the same step numbers, and common description will be omitted.

The second modification of the second embodiment has disclosed the method in which the UE performs a DS measurement report to the serving cell, and the serving cell that has received the measurement report transmits a wake-up message to the ES cell. In this modification, contrastingly, the UE transmits a wake-up signal to the ES cell. As shown in step ST2001 of FIG. 17, the UE transmits, to the ES cell, a wake-up signal in place of the DS measurement report of step ST1708 and the wake-up message of step ST1709 in FIG. 14.

In step ST1706, the serving cell notifies the UE of a measurement control message. The serving cell configures an ES cell accessible to the UE as a measurement cell in the message. A measurement cell may be configured using a cell identifier.

The DS configuration of an accessible ES cell and also the wake-up signal configuration may be included as the configuration of a measurement cell. These may be associated with a cell identifier.

The DS configuration or wake-up signal configuration may be dedicated to or common to ES cells, or may be provided per cluster. When the configuration is provided per cluster, a cluster identifier may be notified together.

PRACH may be used for a wake-up signal.

When the criterion for the DS measurement of an ES cell or the DS measurement for detecting an ES cell is satisfied in step ST1707, in step ST2001, the UE transmits a wake-up signal for requesting wake-up to the ES cell whose criterion has been satisfied. The UE transmits a wake-up signal with the wake-up signal configuration received from the serving cell. The UE may use, for a wake-up signal, the identifier of the ES cell which has been obtained in the detection of DS. Alternatively, when a wake-up signal is configured per cluster, the UE may use the identifier of a cluster. Still alternatively, a wake-up signal common to ES cells may be configured, and in that case, the UE may use a sequence common to the ES cells. Consequently, to which ES cell or to an ES cell of which cluster the wake-up signal is directed can be determined, or whether the wake-up signal is directed to an ES cell can be determined.

In step ST1706, the serving cell may include, in the measurement control message, the information indicating whether measurement is for detecting an ES cell in the dormant state and notify of the message. Alternatively, the serving cell may include, in the measurement control message, the information indicating whether measurement is for wake-up of the ES cell in the dormant state and notify of the message. This allows the UE to judge whether the measurement configuration of the measurement control message is for detecting an ES cell or for wake-up.

When the measurement control message includes the information indicating that the message is for detecting an ES cell in the dormant state or for wake-up of an ES cell in the dormant state, the UE transmits a wake-up signal to the ES cell that has been detected.

In any other case, that is, in the case where the measurement control message does not include the information indicating that the message is for detecting an ES cell in the dormant state or does not include the information indicating that the message is for wake-up of an ES cell in the dormant state, the UE does not transmit a wake-up signal. Alternatively, the UE may perform a measurement report to the serving cell as normal measurement.

The ES cell that has received the wake-up signal from the UE in step ST2001 uses the cell identifier used for the wake-up signal to judge whether the wake-up signal is directed to its own cell. Alternatively, the ES cell may detect a wake-up signal directed to its own cell from the cell identifier of its own cell.

The ES cell that has detected the wake-up signal directed to its own cell moves to step ST1710 to switch on its own cell. Upon switch on, in step ST1711, the ES cell shifts from the dormant state to the active state.

The method disclosed in this modification enables the introduction of EAB-based access restriction to the wake-up process for the ES cell in the dormant state which does not broadcast the system information. EAB control by the serving cell can restrict a wake-up process due to the transmission of a wake-up signal from a UE without access right. This prevents the ES cell in the dormant state from switching itself on unnecessarily. Therefore, effects similar to those of the second modification of the second embodiment can be achieved.

The UE directly transmits a wake-up signal to the ES cell, thus reducing the control load of the serving cell.

The serving cell performs EAB-based access restriction control, thus eliminating the need for using a UE-dedicated sequence for a wake-up signal. The serving cell does not need to allocate a UE-dedicated sequence for a wake-up signal, and the serving cell does not need to notify the ES cell or the UE of a UE-dedicated sequence. This results in simplified control and a reduced amount of information to be signaled.

The serving cell performs access restriction control based on EAB before performing a measurement configuration for the UE, thus preventing the serving cell from configuring, for a UE, an ES cell inaccessible to the UE as a measurement cell.

In the wake-up process, in the case where the serving cell performs access restriction control based on AC for EAB of the UE and in the case where the UE transmits a wake-up signal to the ES cell, the method disclosed in the first modification of the second embodiment may be applied as another method of performing access restriction control. In this case, the serving cell performs EAB control after once receiving a DS measurement report from the UE, thereby judging whether a wake-up process target ES cell is accessible. When the wake-up process target ES cell is accessible, the serving cell requests the UE to transmit a wake-up signal to a wake-up process target ES cell. The request message may include the cell identifier of the wake-up process target ES cell. RRC signaling may be used in the notification. The UE that has received the request message transmits a wake-up signal to the wake-up process target ES cell.

The measurement control message for causing the UE to perform a measurement report to the serving cell and the measurement control message for causing the UE to transmit a wake-up signal to the ES cell may be provided distinctively. The information for distinction may be provided to be included in the measurement control message. The information for distinction may be, for example, the information indicating whether measurement is for detecting an ES cell in the dormant state or the information indicating whether measurement is for wake-up of the ES cell in the dormant state.

The distinguished measurement control message may be applied to the method described above. The measurement control message used first is the measurement control message for causing the UE to perform a measurement report to the serving cell. The wake-up signal transmission request message after the serving cell performs EAB control may be the measurement control message for causing the UE to transmit a wake-up signal to the ES cell.

Consequently, effects similar to those described above can be achieved.

Second Modification of Third Embodiment

This modification will disclose another specific example of the method of performing access restriction control when access restriction is based on EAB.

A case where the UE performs access restriction control based on AC for EAB in the wake-up process will be described. A case where the UE transmits a wake-up signal to the ES cell will also be described.

The third modification of the second embodiment has disclosed the method in which the UE performs a DS measurement report to the serving cell, and the serving cell that has received the measurement report transmits a wake-up message to the ES cell. In this modification, alternatively, the UE transmits a wake-up signal to the ES cell. In this modification, the sequence shown in FIG. 15 can be applied by changing some of the steps. As the changed portions, the UE may transmit, to the ES cell, a wake-up signal in place of the DS measurement report of step ST1807 and the wake-up message of step ST1808 in FIG. 15.

In step ST1803, the serving cell notifies the UE of a measurement control message. The serving cell configures the DS measurement of an ES cell for a predetermined UE or the DS measurement for detecting an ES cell in the message. The measurement cell may be configured using a cell identifier. As the configuration of a measurement cell, the wake-up signal configuration of an ES cell is included together with the DS configuration of an ES cell. These may be associated with a cell identifier. PRACH may be used for a wake-up signal. The serving cell may notify the UE of the information about access restriction of an ES cell in the measurement control message.

When the criterion for the DS measurement of an ES cell or the DS measurement for detecting an ES cell is satisfied in step ST1806, in place of steps ST1807 and ST1808, the UE transmits a wake-up signal for requesting wake-up to the ES cell whose criterion has been satisfied. The UE transmits a wake-up signal, with the wake-up signal configuration received from the serving cell. The UE may use the identifier of the ES cell which has been obtained in the DS detection for the wake-up signal. Alternatively, when a wake-up signal is configured per cluster, the identifier of a cluster may be used. Still alternatively, a wake-up signal common to ES cells may be configured, and in that case, the UE may use a sequence common to the ES cells. As a result, to which ES cell or to an ES cell of which cluster the wake-up signal is directed can be determined, or whether the wake-up signal is directed to an ES cell can be determined.

The ES cell that has received the wake-up signal from the UE uses the cell identifier used for the wake-up signal to judge whether the wake-up signal is directed to its own cell. Alternatively, the ES cell may detect the wake-up signal directed to its own cell from the cell identifier of its own cell.

The ES cell that has detected the wake-up signal directed to its own cell moves to step ST1809 to switch on its own cell. Upon switch on, in step ST1810, the ES cell shifts from the dormant state to the active state.

The method disclosed in this modification enables the introduction of EAB-based access restriction to the wake-up process for the ES cell in the dormant state which does not broadcast the system information. EAB control by the ES cell can restrict the wake-up process due to the transmission of a wake-up signal from a UE without access right. The ES cell in the dormant state thus does not need to unnecessarily switch itself on. Therefore, effects similar to those of the third modification of the second embodiment can be achieved.

The UE directly transmits a wake-up signal to the ES cell, thus reducing the control load of the serving cell.

The second embodiment to the second modification of the third embodiment have disclosed the EAB as specific examples of the access restriction. The methods disclosed in the embodiments and modifications can also be applied to the ACB. Not the AC for EAB but the AC for ACB may be used as the access restriction information.

Fourth Embodiment

This embodiment will disclose a specific example of the method of performing access restriction control when access restriction is based on CSG.

In the CSG control that is the conventional access restriction control, when the UE has a CSG-ID list, for example, an allowed CSG list, the UE receives the CSG-ID broadcast as system information by the cell and compares it with the CSG-ID in the CSG-ID list of its own UE, thereby judging whether the UE can access the cell. When the CSG-ID of the cell is the same as the CSG-ID of its own UE, the UE judges that the UE and the cell belong to the same CSG and then accesses the cell.

When the ES cell is in the dormant state, however, the ES cell does not broadcast the system information. The conventional access restriction control method thus cannot be used, in which a UE receives the system information broadcast from the cell for judgment.

Disclosed here is a method of performing CSG control in the process of waking up an ES cell in the dormant state.

Disclosed below are a case where the ES cell performs CSG control of a UE and a case where the UE performs a DS measurement report to the serving cell and the serving cell that has received the measurement report transmits a wake-up message to the ES cell, in the wake-up process. In this case, the second embodiment can be applied by changing part thereof. CSG-related information may be used as the access restriction information, in place of the AC for EAB.

The specific example of the sequence of FIG. 12 may be applied by changing part thereof. The changed portions will be described below.

While the UE notifies the serving cell of the AC information for EAB of the UE in step ST1503 of FIG. 12, alternatively, the UE may notify of the CSG-ID information of the UE. Or, the UE may notify of an allowed CSG list that is a list of CSG-IDs held by UEs. This allows the serving cell to obtain the CSG-ID of the UE that performs a DS measurement report.

While the serving cell includes the AC for EAB of the wake-up process activation target UE in the wake-up request message to the ES cell and notifies the ES cell in step ST1504 of FIG. 12, alternatively, the serving cell may notify of the CSG-ID information of the UE. Or, the serving cell may notify of the allowed CSG list that is a list of CSG-IDs held by UEs. This allows the ES cell to obtain the CSG-ID of the wake-up process activation target UE.

While the ES cell performs EAB control in step ST1505 of FIG. 12, alternatively, the ES cell may perform CSG control. The ES cell uses the identifier of the UE that has activated the wake-up process, the CSG-ID information associated with the identifier, and the CSG-related information of its own cell to judge whether the wake-up process activation target UE can access its own cell. The ES cell judges that its own cell is accessible if the CSG-ID of the UE is the same as the CSG-ID of its own cell or judges that its own cell is inaccessible if they are different.

The method disclosed in this embodiment enables the introduction of CSG-based access restriction to the wake-up process for the ES cell in the dormant state which does not broadcast the system information. CSG control by the ES cell can restrict a wake-up process from a UE without access right. This prevents the ES cell in the dormant state from switching itself on unnecessarily. Effects similar to those of the first embodiment can thus be achieved.

The process performed when the UE does not belong to a CSG will be disclosed. When the UE does not belong to a CSG, the UE may notify the ES cell or the serving cell that the UE does not belong to a CSG in place of notifying of the CSG-ID of its own UE.

When the UE does not belong to a CSG, the UE has no allowed CSG list, or the allowed CSG list is empty.

For example, in step ST1503 of FIG. 12, when its own UE has no allowed CSG list or the allowed CSG list is empty, the UE may include the information indicating that the UE does not belong to a CSG and notify the serving cell. Alternatively, the UE may notify of the information indicating that the allowed CSG list is empty. Still alternatively, the UE may notify of an empty allowed CSG list. This allows the serving cell to recognize that the UE does not belong to a CSG.

In step ST1504 of FIG. 12, the serving cell may notify the ES cell of the information indicating that the UE does not belong to a CSG. Alternatively, the serving cell may notify of the information indicating that the allowed CSG list of UEs is empty. Still alternatively, the serving cell may notify of an empty allowed CSG list. This allows the ES cell to recognize that the wake-up process activation target UE does not belong to a CSG.

In step ST1505 of FIG. 12, the ES cell performs CSG control. When its own cell is operated in the closed mode, the ES cell judges that it is inaccessible if the wake-up process activation target UE does not belong to a CSG. When its own cell does not belong to a CSG or when its own cell is operated in the open mode, the ES cell judges that it is accessible if the wake-up process activation target UE does not belong to a CSG.

As a result, CSG control can also be performed if the wake-up process activation target UE does not belong to a CSG.

In another method, if the UE does not belong to a CSG, the CSG-related information is transmitted to the serving cell or the ES cell.

For example, in step ST1503 of FIG. 12, the UE does not transmit the CSG-related information to the serving cell. When not receiving the CSG-related information from the UE, the serving cell recognizes that the UE does not belong to a CSG.

In step ST1504 of FIG. 12, the serving cell does not notify the ES cell of the CSG-related information of the UE to show that the UE does not belong to a CSG. When not receiving the CSG-related information of the wake-up process activation target UE, the ES cell recognizes that the UE does not belong to a CSG.

This enables CSG control performed when the wake-up process activation target UE does not belong to a CSG. Compared with the method above, the amount of information notified to the serving cell by the UE or to the ES cell by the serving cell can be reduced.

Disclosed below is a process performed when the ES cell does not belong to a CSG or when the ES cell is operated in the open mode.

When the ES cell does not belong to a CSG, the ES cell may be accessible to an appropriate UE in the access restriction control. Alternatively, when the ES cell is in the open mode, the ES cell may be accessible to an appropriate UE in the access restriction control.

In step ST1505 of FIG. 12, the ES cell performs CSG control. The ES cell may use the CSG-related information of its own cell, for example, the access mode information, or the CSG-ID information and CSG indication information to judge whether its own cell belongs to a CSG or whether its own cell is in the open mode. The ES cell judges that it is accessible to an appropriate UE when its own cell does not belong to a CSG or is in the open mode. The ES cell performs the access control described above when its own cell belongs to a CSG or is in the closed mode.

This enables CSG control performed when the ES cell does not belong to a CSG or is operated in the open mode. Control is performed uniformly in the example sequence of FIG. 12, including the case where the ES cell belongs to a CSG, resulting in simplified control and reduced malfunctions.

In another CSG control method in the wake-up process, the CSG-related information of the serving cell may be used. For example, in step ST1504 of FIG. 12, the serving cell includes the CSG-related information of its own cell in the wake-up message to the ES cell and notifies the ES cell. In step ST1505 of FIG. 12, the ES cell that has received the wake-up message uses the CSG-related information of the UE, the CSG-related information of the cell (serving cell) that has transmitted the message, and the CSG-related information of its own cell to perform CSG control. When all of the UE, the serving cell, and the ES cell have the same CSG-ID, the ES cell judges that the UE can access the ES cell. When at least one of the CSG-IDs is different, the ES cell judges that the UE cannot access the ES cell.

In another method of performing CSG control using the CSG-related information of the serving cell, for example, in step ST1504 of FIG. 12, the serving cell includes the CSG-related information of its own cell in the wake-up message to the ES cell and then transmits the wake-up message. In step ST1505 of FIG. 12, the ES cell that has received the wake-up message may use the CSG-related information of the cell (serving cell) that has transmitted the message and the CSG-related information of its own cell to perform CSG control of the wake-up process activation target UE. When the serving cell and the ES cell have the same CSG-ID, the ES cell judges that the UE can access the ES cell. When the CSG-IDs are different, the ES cell judges that the UE cannot access the ES cell. Judgment can be made as described above because the UE cannot determine a cell of a different CSG as its serving cell.

The serving cell may notify the ES cell of a CSG-TD as the CSG-related information together with the access mode. When the serving cell is in the closed mode, the ES cell may use the CSG-related information of the serving cell and the CSG-related information of its own cell to perform CSG control of the wake-up process activation target UE.

As a result, CSG control can be performed in the process of waking up the ES cell in the dormant state.

The ES cell does not need the CSG-related information of the UE, thus eliminating the need of the UE to notify the serving cell of the CSG-related information of the UE or the need of the serving cell to notify the ES cell of the CSG-related information of the UE. The amount of signaling can thus be reduced.

First Modification of Fourth Embodiment

This modification will disclose another specific example of the method of performing access restriction control when access restriction is based on CSG.

Disclosed below are a case where the serving cell performs CSG control of the UE and a case where the UE performs a DS measurement report to the serving cell and the serving cell that has received the measurement report transmits a wake-up message to the ES cell, in the wake-up process.

In this case, the first modification of the second embodiment can be applied by changing part thereof. CSG-related information may be used as the access restriction information, in place of the AC for EAB.

The specific example of the sequence of FIG. 13 may be applied by changing part thereof. The changed portions will be described below.

While the ES cell notifies the serving cell of the AC information for EAB of the ES cell in step ST1602 of FIG. 13, alternatively, the ES cell may notify of the CSG-related information of the ES cell. Examples of the CSG-related information include a CSG-ID, CSG indication, and access mode. The serving cell can thus obtain the CSG-related information of the ES cell.

While the UE notifies the serving cell of the AC information for EAB of the UE in step ST1604 of FIG. 13, alternatively, the UE may notify of the CSG-related information of the UE. Or, the UE may notify of the allowed CSG list that is a list of CSG-IDs held by UEs. This allows the serving cell to obtain the CSG-related information of the UE.

While the serving cell performs EAB control in step ST1605 of FIG. 13, alternatively, the serving cell may perform CSG control. In this case, the serving cell uses the identifier of the UE that has activated the wake-up process, the CSG-ID information associated with the identifier, and the CSG-related information of the ES cell to judge whether the wake-up process activation target UE can access the ES cell.

Specifically, the serving cell judges whether the ES cell belongs to a CSG and whether the access mode is the open mode or the closed mode, thereby judging whether the wake-up process activation target UE can access the ES cell.

When the ES cell does not belong to a CSG or the access mode is the open mode, the serving cell judges that the wake-up process activation target UE can access the ES cell. When the ES cell belongs to a CSG and the access mode is the closed mode, the serving cell judges that the wake-up process activation target UE can access the ES cell if the CSG-ID of the UE is the same as the CSG-ID of the ES cell or judges that the wake-up process activation target UE cannot access the ES cell if the CSG-ID of the UE is different from the CSG-ID of the ES cell.

The method disclosed in this modification enables the introduction of CSG-based access restriction to the wake-up process for the ES cell in the dormant state which does not broadcast the system information. CSG control by the serving cell for the wake-up process activation target UE can restrict a wake-up process from a UE without right to access the cell being a wake-up process target. This prevents the ES cell in the dormant state from switching itself on unnecessarily. Effects similar to those of the first modification of the first embodiment can thus be achieved.

Second Modification of Fourth Embodiment

Disclosed below is another method of performing CSG control in the case where the serving cell performs CSG control of the UE and the case where the UE performs a DS measurement report to the serving cell and the serving cell that has received the measurement report transmits a wake-up message to the ES cell, in the wake-up process.

The second modification of the second embodiment may be applied by changing part thereof. CSG-related information may be used as the access restriction information, in place of the AC for EAB.

The specific example of the sequence of FIG. 14 may be applied by changing part thereof. The changed portions will be described below.

While the ES cell notifies the serving cell of the AC information for EAB of the ES cell in step ST1702 of FIG. 14, alternatively, the ES cell may notify of the CSG-related information of the ES cell. Examples of the CSG-related information include a CSG-ID, CSG indication, and access mode. This allows the serving cell to obtain the CSG-related information of the ES cell.

While the UE notifies the serving cell of the AC information for EAB of the UE in step ST1703 of FIG. 14, alternatively, the UE may notify of the CSG-related information of the UE. Or, the UE may notify of the allowed CSG list that is a list of CSG-IDs held by UEs. This allows the serving cell to obtain the CSG-ID of the UE to be connected therewith.

While the serving cell performs EAB control in step ST1704 of FIG. 14, alternatively, the serving cell may perform CSG control. In this case, the serving cell uses the identifier of the UE that has notified of the CSG-ID information in step ST1703, the CSG-ID information associated with the identifier, and the CSG-related information of the ES cell to judge whether the wake-up process activation target UE can access the ES cell.

Specifically, the serving cell judges whether the ES cell belongs to a CSG and whether the access mode is the open mode or the closed mode, thereby judging whether the wake-up process activation target UE can access the ES cell.

When the ES cell does not belong to a CSG or when the access mode is the open mode, the serving cell judges that the wake-up process activation target UE can access the ES cell. When the ES cell belongs to a CSG and the access mode is the closed mode, the serving cell judges that the wake-up process activation target UE can access the ES cell if the CSG-ID of the UE is the same as the CSG-ID of the ES cell or judges that the wake-up process activation target UE cannot access the ES cell if the CSG-ID of the UE is different from the CSG-ID of the ES cell.

The method disclosed in this modification enables the introduction of CSG-based access restriction to the wake-up process for the ES cell in the dormant state which does not broadcast the system information. CSG control by the serving cell can remove a cell that denies the access of the UE from the measurement configuration of the ES cell. The UE does not measure an ES cell to which the UE has no access right. This restricts a wakeup process from a UE without right to access the wake-up process target ES cell, thus preventing the ES cell in the dormant state from switching itself on unnecessarily. Effects similar to those of the first modification of the first embodiment can thus be achieved.

Third Modification of Fourth Embodiment

This modification will disclose another specific example of the method of performing access restriction control when access restriction is based on CSG.

Disclosed below are a case where a UE performs CSG control and a case where the UE performs a DS measurement report to the serving cell and the serving cell that has received the measurement report transmits a wake-up message to the ES cell, in the wake-up process.

In this case, the third modification of the second embodiment may be applied by changing part thereof. CSG-related information may be used as the access restriction information, in place of the AC for EAB.

The specific example of the sequence of FIG. 15 may be applied by changing part thereof. The changed portions will be described below.

While the ES cell notifies the serving cell of the AC information for EAB of the ES cell in step ST1802 of FIG. 15, alternatively, the ES cell may notify of the CSG-related information of the ES cell. Examples of the CSG-related information include a CSG-ID, CSG indication, and access mode. This allows the serving cell to obtain the CSG-related information of the ES cell.

While the serving cell notifies the UE of the AC information for EAB of the ES cell in step ST1803 of FIG. 15, alternatively, the serving cell may notify of the CSG-related information of the ES cell. This allows the UE to obtain the CSG-related information of the ES cell subjected to the DS measurement configuration.

While the UE performs EAB control in step ST1804 of FIG. 15, alternatively, the UE may perform CSG control. In this case, the UE uses the CSG-ID information of its own UE and the CSG-related information of the ES cell to judge whether its own UE can access the ES cell.

Specifically, the UE judges whether the ES cell belongs to a CSG and whether the access mode is the open mode or the closed mode, thereby judging whether its own UE can access the ES cell.

When the ES cell does not belong to a CSG or the access mode is the open mode, the UE judges that its own UE can access the ES cell. When the ES cell belongs to a CSG and the access mode is the closed mode, the UE judges that its own UE can access the ES cell if the CSG-ID of its own UE is the same as the CSG-ID of the ES cell or judges that its own UE cannot access the ES cell if the CSG-ID of its own UE is different from the CSG-ID of the ES cell.

The method disclosed in this modification enables the introduction of CSG-based access restriction to the wake-up process for the ES cell in the dormant state which does not broadcast the system information. CSG control by the UE can remove a cell that denies the access of the UE from the measurement configuration of the ES cell. The UE does not measure an ES cell to which the UE has no access right. This restricts a wake-up process from the UE without right to access the wake-up process target ES cell, thus preventing the ES cell in the dormant state from switching itself on unnecessarily. Effects similar to those of the second modification of the first embodiment can thus be achieved.

Fourth Modification of Fourth Embodiment

Disclosed below is another method of performing CSG control in the case where the UE performs CSG control and the case where the UE performs a DS measurement report to the serving cell and the serving cell that has received the measurement report transmits a wake-up message to the ES cell, in the wake-up process.

In the method disclosed in the third modification of the fourth embodiment, the serving cell obtains the CSG-related information of the ES cell from the ES cell and notifies the UE of the CSG-related information. This allows the UE to perform CSG control.

In this modification, the UE uses neighbor CSG cell information held in its own UE.

The UE associates the cell identifier and the CSG-related information of the cell whose system information has been obtained with each other and records them. The UE may record PLMN information. The UE can judge in which PLMN the recorded cell identifier is effective. The UE obtains the system information, for example, when camping on a cell and when measuring a neighbor cell. This allows the UE to recognize the CSG-related information of the cells including the cell that the UE has visited and its neighbor cell. The CSG-related information of the cell, which is stored in the UE, is referred to as neighbor CSG cell information. The neighbor CSG cell information may be not limited to the information about cells on which the UE has camped. Examples of the CSG-related information include a CSG-ID, access mode, and CSG indication.

The UE derives, from the neighbor CSG cell information held by its own UE, the CSG-related information of the ES cell which has been notified by the serving cell and is subjected to DS measurement. This allows the UE to perform CSG control using the CSG-ID of its own UE and the CSG-related information of the ES cell.

Figure 18:
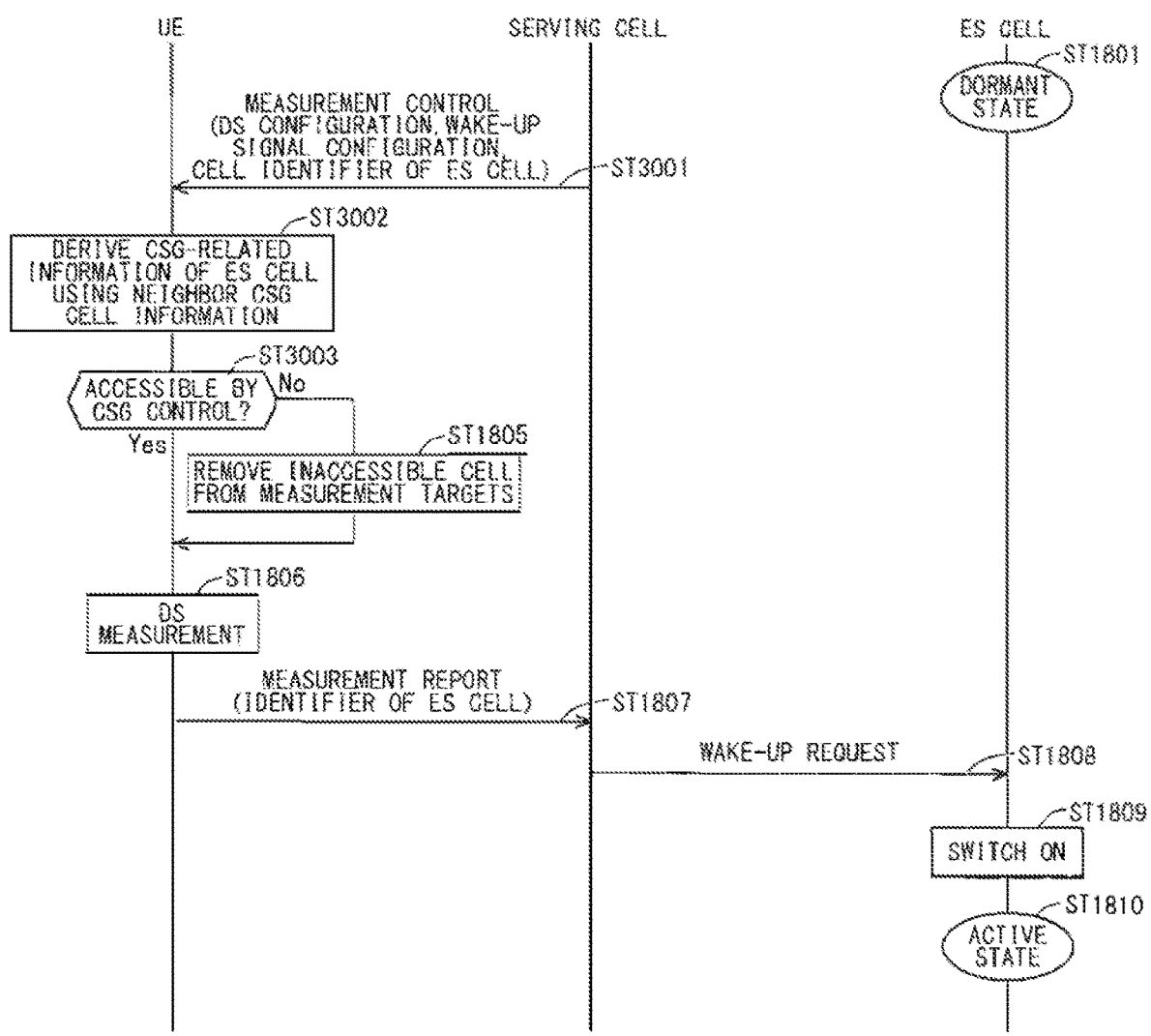
FIG. 18 shows an example sequence of a wake-up process in a communication system of a fourth modification of a fourth embodiment.

FIG. 18 shows an example sequence of the wake-up process in a communication system of a fourth modification of the fourth embodiment. FIG. 18 shows the wake-up process in which the UE uses the neighbor CSG cell information held in its own UE. The same steps as those of FIG. 15 will be denoted by the same step numbers, and common description will be omitted.

In step ST1801, the ES cell is in the dormant state.

The UE obtains the cell identifier of the ES cell from the serving cell.

In step ST3001, the serving cell notifies the UE of a measurement control message. The serving cell configures, in the message, DS measurement of an ES cell for a predetermined UE or DS measurement for detecting an ES cell. The measurement cell may be configured using a cell identifier. The configuration of the measurement cell may include the DS configuration of the ES cell or may include the wake-up signal configuration of the ES cell. These may be associated with a cell identifier. Herein, the serving cell does not need to notify the UE of the CSG-related information of the ES cell. This allows the UE to obtain the cell identifier of the ES cell.

In step ST3002, the UE uses the neighbor CSG cell information held by its own UE to derive, from the cell identifier of the ES cell configured in the measurement control message, the CSG-related information of the ES cell.

In step ST3003, the UE uses the CSG-ID held by its own UE and the derived CSG-related information of the ES cell to perform access restriction control. Specifically, the UE judges whether its own UE can access the ES cell configured in the measurement control message.

The UE judges whether the ES cell belongs to a CSG and whether the access mode is the open mode or the closed mode, thereby judging whether its own UE can access the ES cell configured in the measurement control message.

When the ES cell does not belong to a CSG or when the access mode is the open mode, the UE judges that its own UE can access the ES cell configured in the measurement control message. When the ES cell belongs to a CSG and the access mode is the closed mode, the UE judges that it can access the ES cell if the CSG-ID of its own UE is the same as the CSG-ID of the ES cell or judges that it cannot access the ES cell if the CSG-ID of its own UE is different from the CSG-ID of the ES cell.

If the result of the access restriction control shows that the ES cell in the measurement configuration is accessible, the UE measures the ES cell in accordance with the measurement configuration.

If the result of the access restriction control shows that the ES cell in the measurement configuration is inaccessible, a configuration is performed in step ST1805 so that the UE does not measure the ES cell. Alternatively, the UE may remove an inaccessible ES cell from measurement targets.

As a result, the UE does not measure an inaccessible ES cell. When an ES cell is detected through the measurement, the ES cell is limited to an accessible ES cell.

When the cell identifier of the ES cell which has been configured in the measurement control message is not included in the neighbor CSG cell information of its own UE, in step ST3002, the UE may judge that it cannot access the ES cell. This prevents the UE from performing the wake-up process on the ES cell whose system information has not been obtained. This reduces the frequency of occurrence of unnecessary wake-up process.

In another method, in step ST3002, when the cell identifier of the ES cell which has been configured in the measurement control message is not included in the neighbor CSG cell information of its own UE, the UE may judge that it can access the ES cell. In this case, the UE also performs conventional access restriction control together. This allows the UE to perform the wake-up process also on the ES cell whose system information has not been obtained. This increases ES cells that can be subjected to the wake-up process. After the wake-up process completes and then the ES cell enters the active state, the UE may perform conventional access restriction control, herein, CSG control in accessing the ES cell. This enables access restriction control as well.

The method disclosed in this modification achieves effects similar to those of the third modification of the fourth embodiment.

The UE holds the neighbor cell information and uses the neighbor cell information, thus eliminating the need of the UE to obtain the CSG-related information of the ES cell from the ES cell. Therefore, the amount of signaling can be reduced as the entire communication system.

Fifth Modification of Fourth Embodiment

This modification will disclose another specific example of the method of performing access restriction control when access restriction is based on CSG.

In CSG control that is the conventional access restriction control, whether the UE can access the cell is first judged, as described in the fourth embodiment. After that, in actual access by the UE, the MME performs CSG control by verification of CSG. The MME holds a CSG list that is a list of CSG-IDs of UEs. Alternatively, the HSS records the CSG list that is a list of CSG-IDs of UEs, and the MME obtains the CSG list that is a list of CSG-IDs of UEs from the HSS and holds the obtained CSG list. The MME manages the CSG-IDs of UEs in accordance with the CSG list of UEs held in its own MME. The MME uses the CSG list to perform CSG control by the verification of the CSG of the UE. This is effective in a manual cell selection performed by the UE when the UE has no allowed CSG list, for example, when the CSG of a UE is newly registered, or when the allowed CSG list is empty. The UE has not had an effective CSG-ID yet, and thus, CSG control cannot be performed by the UE. The CSG-ID of the UE is recorded in a CSG list and held by the MME immediately after the CSG of the UE is registered, and thus, CSG control is effective in the MME.

In this modification, the CSG list of UEs held by the MME is used in the wake-up process.

In this modification, in the method disclosed in the fourth embodiment, an access restriction control request to the MME is added, the MME performs access restriction control, and the ES cell switches on its own cell in accordance with the result of the access restriction control, in place of the ES cell performing access restriction control.

Figure 19:
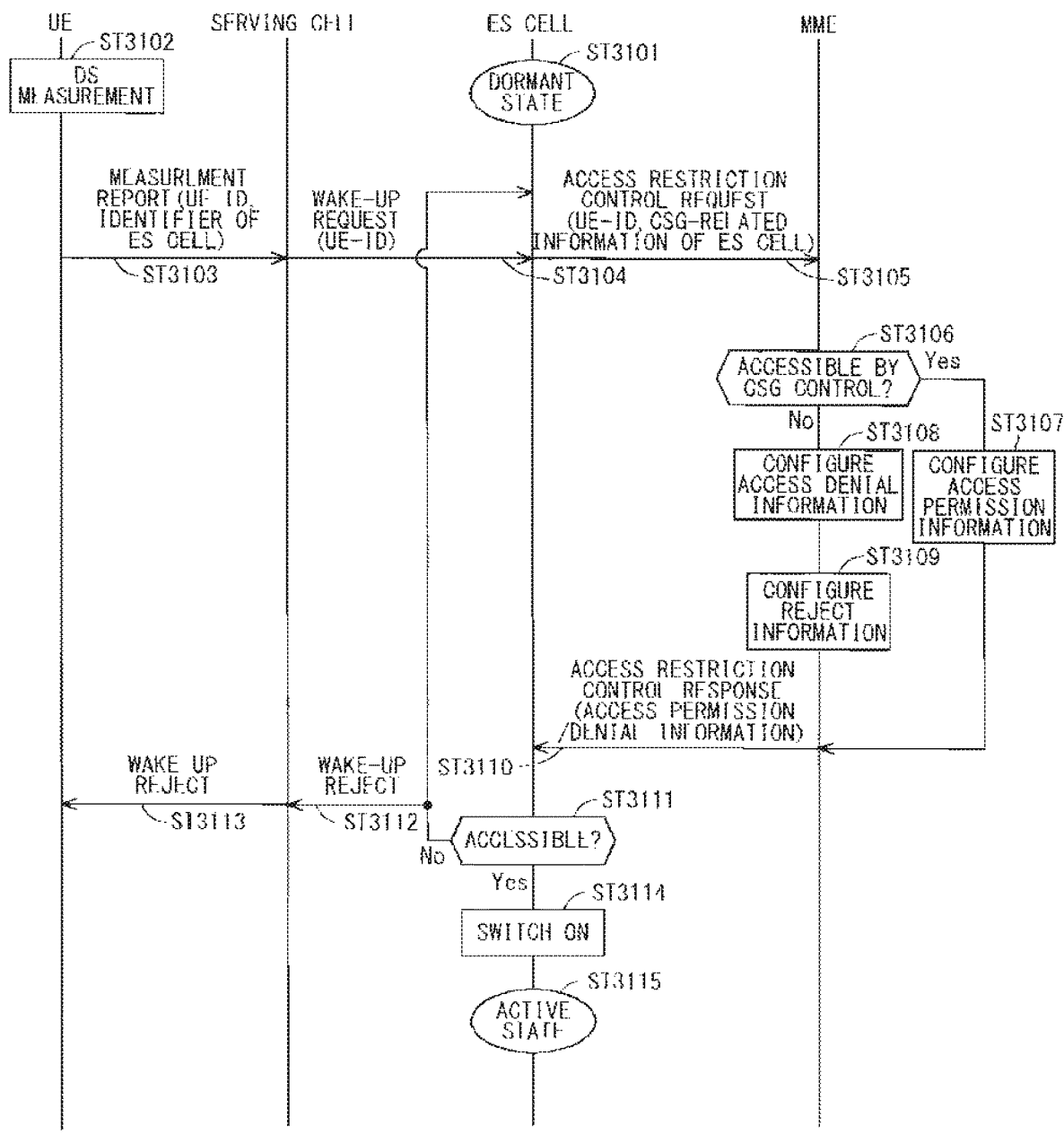
FIG. 19 shows an example sequence of a wake-up process in a communication system of a fifth modification of the fourth embodiment.

FIG. 19 shows an example sequence of the wake-up process in a communication system of a fifth modification of the fourth embodiment. FIG. 19 shows the case where the IME performs CSG control in the wake-up process. FIG. 19 also shows the case where the UE performs a DS measurement report to the serving cell, and the serving cell that has received the measurement report transmits a wake-up message to the ES cell.

In step ST3101, the ES cell is in the dormant state.

In step ST3102, the UE performs DS measurement of the ES cell. The UE may perform DS measurement for detecting an ES cell. This process is similar to the process of step ST1502 of FIG. 12, and thus, description thereof will be omitted. When the DS received quality satisfies a predetermined criterion, the UE notifies the serving cell of a measurement report.

In step ST3103, the UE performs a DS measurement report to the serving cell. The following six, (1) to (6), will be disclosed as specific examples of the information included in the measurement report.

(1) UE identifier.
(2) Identifier (event) of a predetermined criterion.
(3) DS received quality of an ES cell.
(4) DS received power of an ES cell.
(5) Identifier of an ES cell, which may be associated with the identifier of a predetermined criterion and the DS received quality and DS received power of an ES cell.
(6) Combination of (1) to (5) above.

Notifying the serving cell of the information of the specific example (1) allows the serving cell to recognize the identifier of the wake-up process activation target UE.

Notifying the serving cell of the specific example (5) allows the serving cell to recognize which ES cell is a wake-up process target.

Unlike the method disclosed in the fourth embodiment, the access restriction information of the UE, that is, the CSG-related information of the UE does not need to be notified in this modification. In this case, only the information required for the measurement report is required, resulting in reduced amount of information of signaling and simplified control.

In step ST3104, the serving cell that has received the DS measurement report from the UE determines the ES cell as a wake-up process target ES cell from the identifier of the ES cell which is included in the measurement report and notifies the wake-up process target ES cell of a wake-up request message. This message may be notified through X2 signaling.

The serving cell may use the information included in the DS measurement report and another piece of information of its own cell to judge whether to wake up the ES cell. When activating the ES cell by wake-up, the serving cell notifies the wake-up process target ES cell of a wake-up request. When not activating the ES cell by wake-up, the serving cell does not notify the wake-up process target ES cell of a wake-up request message. In this case, the serving cell may reconfigure an ES cell that is to be measured in a measurement control message and then notify the UE.

The following four, (1) to (4), will be disclosed as specific examples of the information included in the wake-up request message.

(1) UE identifier. Identifier of a UE that has performed a measurement report.
(2) PLMN information of a UE.
(3) Identifier of a serving cell.
(4) Combination of (1) to (3) above.

Notifying the ES cell of the information of the specific example (1) allows the ES cell to recognize the identifier of the wake-up process activation target UE.

Unlike the method disclosed in the fourth embodiment, the access restriction information of the UE, that is, the CSG-related information of the UE does not need to be notified in this modification. The amount of information of signaling can be reduced.

In step ST3105, the ES cell that has received the wake-up request message in step ST3104 notifies the MME of a message requesting access restriction control. S1 signaling may be used in this notification. The ES cell includes the UE identifier of the wake-up process activation target UE in the access restriction control request message. Alternatively, the ES cell may include the CSG-related information of its own ES cell, that is, the wake-up process target ES cell in the access restriction control request message.

As a result, the MME can obtain the UE identifier of the wake-up process activation target UE and the CSG-related information of the wake-up process target ES cell.

The access restriction information of the ES cell may be notified through signaling different from that of the access restriction control request message. The access restriction information of the ES cell may be included in another message notified to the MME by the ES cell and notified. The MME can be notified at the timing different from the timing of requesting access restriction control, for example, when the access restriction information is configured and when the access restriction information is changed in time, resulting in flexible control.

When the access restriction information of the ES cell is notified through signaling different from that of the access restriction control request message, the access restriction information of the ES cell may be notified before the ES cell shifts to the dormant state. When the ES cell is installed or when the ES cell is in the active state before shifting to the dormant state, the ES cell may notify the MME of the access restriction information of its own cell. This allows the serving cell to obtain the access restriction information of the ES cell.

The access restriction information of the ES cell may be notified through S1 signaling. The access restriction information may be an S1 setup request message. The ES cell notifies the MME of the S1 setup request message when its own cell is installed. Including the access restriction information in this message can reduce an amount of signaling. Alternatively, a new message does not need to be provided, resulting in simplified control. Still alternatively, the access restriction information may be an eNB configuration update message. For example, the access restriction information may be included in the eNB configuration update message and notified when the access restriction information of the ES cell is changed. This reduces an amount of signaling. A new message does not need to be provided, resulting in simplified control.

In step ST3106, the MME performs CSG control. The MME uses the CSG list of UEs held by its own MME to derive, from the identifier of the wake-up process activation target UE which has been obtained in step ST3105, the CSG-related information of the UE. A non-limiting example of the CSG-related information is a CSG-ID. The MME uses the derived CSG-related information of the UE and the CSG-related information of the wake-up process target ES cell which has been obtained in step ST3105 to judge whether the wake-up process activation target UE can access the wake-up process target ES cell.

The MME judges whether the ES cell belongs to a CSG and whether the access mode is the open mode or the closed mode, thereby judging whether the wake-up process activation target UE can access the wake-up process target ES cell.

When the ES cell does not belong to a CSG or the access mode is the open mode, the MME judges that the wake-up process activation target UE can access the wake-up process target ES cell. When the ES cell belongs to a CSG and the access mode is the closed mode, the MME judges that the UE can access the ES cell if the CSG-ID of the UE is the same as the CSG-ID of the ES cell or judges that the UE cannot access the ES cell if the CSG-ID of the UE is different from the CSG-ID of the ES cell.

If the result of the access restriction control shows that the wake-up process activation target UE can access the wake-up process target ES cell, the MME notifies the ES cell of an access permission message. S1 signaling may be used in this notification.

If the result of the access restriction control shows that the wake-up process activation target UE cannot access the wake-up process target ES cell, the MME notifies the ES cell of an access denial message. S1 signaling may be used in this notification.

The access permission message and the access denial message may be the same (for example, an access restriction control response message), which includes the information indicating whether access can or cannot be made. The MME may notify the ES cell of the message. S1 signaling may be used in this notification.

If the result of the access restriction control performed in step ST3106 shows that the wake-up process activation target UE can access the wake-up process target ES cell, in step ST3107, the MME configures the access permission information to the ES cell in the access restriction control response message and, in step ST3110, notifies the ES cell of the access restriction control response message.

If the result of the access restriction control performed in step ST3106 shows that the wake-up process activation target UE cannot access the wake-up process target ES cell, in step ST3108, the MME configures access denial information to the ES cell in the access restriction control response message and, in step ST3110, notifies the ES cell of the access restriction control response message.

The UE identifier of the wake-up process activation target UE may be included in the access permission message or the access denial message. Alternatively, the CSG-ID of the UE may be included. This explicitly shows a UE whose access has been allowed or denied, thus preventing malfunction.

The access denial message may include reject information. The reject information may be the information included in the reject message disclosed in the first embodiment. Herein, the information indicating that an access denial is due to CSG control may be included.

If the result of the access restriction control performed in step ST3106 shows that the wake-up process activation target UE cannot access the wake-up process target ES cell, in step ST3109, the MME configures reject information in the access restriction control response message, in addition to the configuration of step ST3108. In step ST3110, then, the MME notifies the ES cell of the access restriction control response message.

In step ST3111, the ES cell that has received the access restriction control response message in step ST3110 uses the information, included in the message, which indicates whether access can or cannot be made to judge whether the wake-up process activation target UE can access its own cell. If the information indicating that access can be made is included, in step ST3114, the ES cell switches on its own cell. Upon switch on, in step ST3115, the ES cell shifts from the dormant state to the active state.

If the information indicating that access cannot be made is included in step ST3111, the ES cell does not switch on its own cell. The ES cell may return to the process of waiting for a wake-up message.

The ES cell that has received the reject information together with the information indicating that access cannot be made in step ST3110 may notify the serving cell that has activated the wake-up process of a reject message. In step ST3112, the ES cell notifies the serving cell that has notified of the wake-up request of a reject message.

The reject message may include reject information. Herein, it may be indicated that access restriction is based on CSG control.

The serving cell that has received the wait timer may be prohibited from notifying a wake-up request to the ES cell for a duration set by the wait timer. Alternatively, the serving cell may perform a configuration such that the ES cell is not measured by the UE being served thereby for a duration set by the wait timer. The serving cell may allow a configuration such that the ES cell is measured by the UE being served thereby after the expiration of the duration set by the wait timer.

The serving cell that has received the reject message may notify the wake-up process activation target UE of a reject message. In step ST3113, the serving cell notifies the UE of a reject message. The reject message indicates that access cannot be made to the wake-up process target ES cell or may indicate that the ES cell cannot be woken up. The UE that has received the reject message in step ST3113 may be prevented from measuring the ES cell or may be prevented from performing a measurement report.

The reject message may include cause information or a wait timer. The cause information may be the information indicating that access cannot be made due to access restriction. Herein, it may be indicated that access restriction is based on CSG control.

The UE that has received the wait timer may be prevented from measuring the ES cell for a duration set by the wait timer. Alternatively, the UE may be prevented from performing a measurement report of the ES cell for a duration set by the wait timer.

The serving cell that has received the reject message may reconfigure an ES cell that is to be measured by the wake-up process activation target UE or may perform a configuration such that the ES cell subjected to access restriction is not performed. This may be notified in the measurement control message again. Configuring the ES cell may be prevented in the measurement control message. Alternatively, the ES cell may be configured in a black list of the measurement control message and notified. Or, the ES cell may be configured in a gray list of the measurement control message and notified.

The method disclosed in this modification enables the introduction of CSG-based access restriction to the wake-up process for the ES cell in the dormant state which does not broadcast the system information. CSG control by the MME can restrict a wake-up process from a UE without access right. This prevents the ES cell in the dormant state from switching itself on unnecessarily. Effects similar to those of the third modification of the first embodiment can thus be achieved.

Sixth Modification of Fourth Embodiment

This modification will disclose another specific example of the method of performing access restriction control when access restriction is based on CSG.

Figure 20:
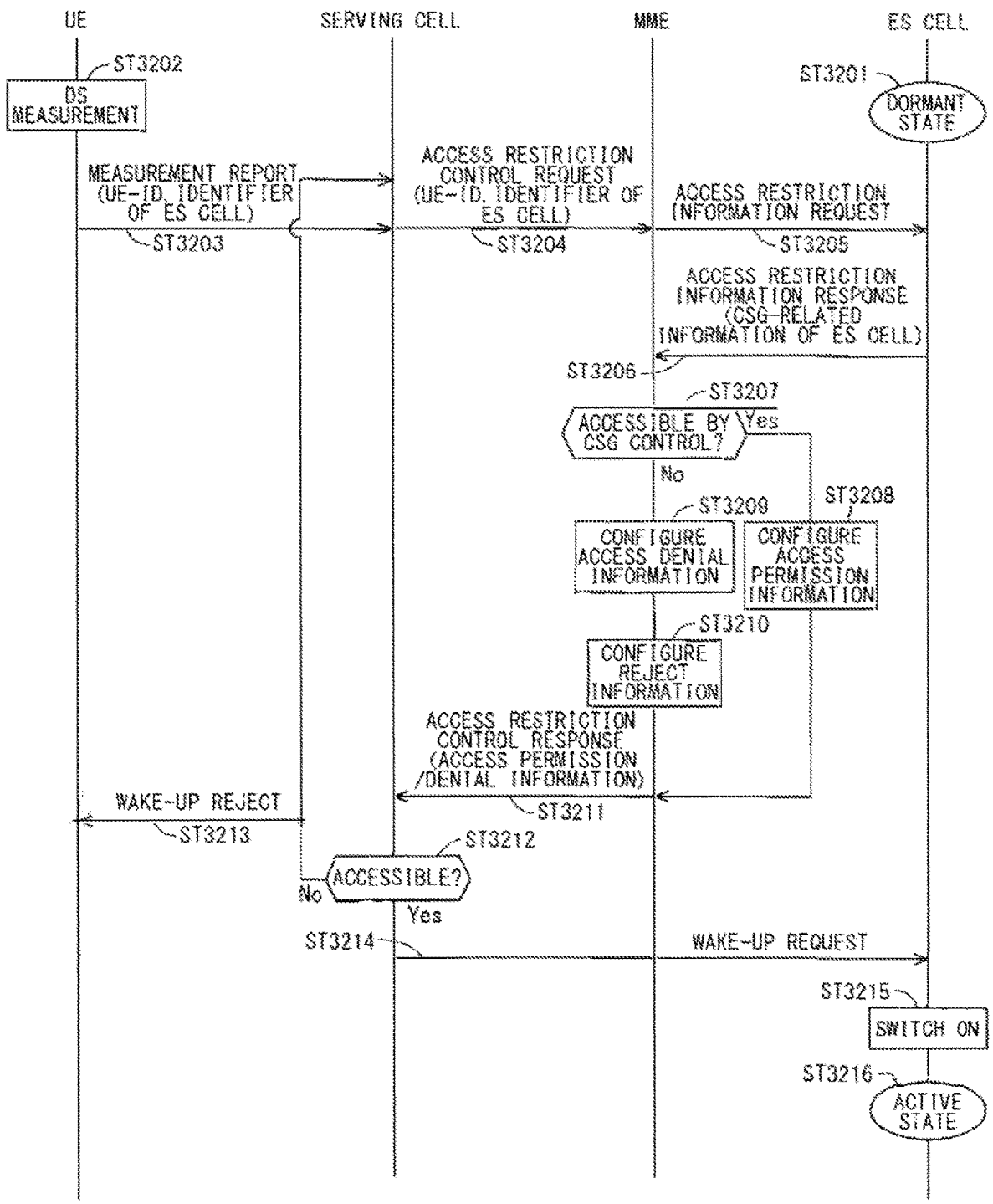
FIG. 20 shows an example sequence of a wake-up process in a communication system of a sixth modification of the fourth embodiment.

FIG. 20 shows an example sequence of the wake-up process in a communication system of a sixth modification of the fourth embodiment. FIG. 20 shows the case where the MME performs CSG control of the UE in the wake-up process. FIG. 20 also shows the case where the UE performs a DS measurement report to the serving cell, and the serving cell that has received the measurement report transmits a wake-up message to the ES cell.

While the ES cell makes an access restriction control request to the MME in the fifth modification of the fourth embodiment, the serving cell makes an access restriction control request to the MME in this modification. The MME performs access restriction control, and the serving cell notifies the ES cell of a wake-up message in accordance with the result of the access restriction control.

In step ST3201, the ES cell is in the dormant state.

In step ST3202, the UE performs DS measurement of the ES cell. The UE may perform DS measurement for detecting an ES cell. This process is similar to the process of step ST1502 of FIG. 12, and thus, description thereof will be omitted. When the DS received quality satisfies a predetermined criterion, the UE notifies the serving cell of a measurement report.

In step ST3203, the UE performs a DS measurement report to the serving cell. This is similar to the method disclosed in the fifth modification of the fourth embodiment, and thus, description thereof will be omitted.

The serving cell that has received the DS measurement report from the UE determines the ES cell as a wake-up process target ES cell from the identifier of the ES cell included in the measurement report and, in step ST3204, notifies the MME of a message requesting access restriction control. S1 signaling may be used in this notification. The UE identifier of the wake-up process activation target UE is included in the access restriction control request message. Alternatively, the cell identifier of the ES cell that has been notified in the measurement report by the UE may be included in the access restriction control request message.

As a result, the MME can obtain the UE identifier of the wake-up process activation target UE and the cell identifier of the wake-up process target ES cell.

The MME that has received the access restriction control request message from the serving cell uses the cell identifier of the wake-up process target ES cell which is included in the message to request access restriction information from the ES cell. In step ST3205, the MME notifies the wake-up process target ES cell of an access restriction information request message.

In step ST3206, the ES cell that has received the access restriction information request message from the MME notifies the MME of the access restriction information of its own cell. The ES cell may notify of an access restriction information response message. Herein, the access restriction information is CSG-related information.

S1 signaling may be used in these messages. These messages may be newly provided in S1 signaling.

In step ST3207, the MME that has received the CSG-related information from the ES cell in step ST3206 performs CSG control. This process is similar to the process of step ST3106 of FIG. 19 disclosed in the fifth modification of the fourth embodiment, and thus, description thereof will be omitted.

The processes from steps ST3208 to ST3211 are similar to the processes of steps ST3107 to ST3110 of FIG. 19 disclosed in the fifth modification of the fourth embodiment, and thus, description thereof will be omitted. The MME notifies the ES cell in step ST3110 of FIG. 19, while the MME notifies the serving cell in step ST3211 of FIG. 20.

In step ST3212, the serving cell that has received the access restriction control response message in step ST3211 uses the information, included in the message, which indicates whether access can or cannot be made to judge whether the wake-up process activation target UE can or cannot access its own cell. If the information indicating that access can be made is included, in step ST3214, the serving cell notifies the wake-up process target ES cell of a wake-up request message. X2 signaling may be used in this notification. In step ST3215, the ES cell that has received the wake-up request message switches on its own cell. Upon switch on, in step ST3216, the ES cell shifts from the dormant state to the active state.

If the information indicating that access cannot be made is included, in step ST3212, the serving cell does not notify the ES cell of a wake-up request message. The serving cell may return to the process of waiting for a DS measurement report from the UE.

The serving cell that has received the reject information together with the information indicating that access cannot be made in step ST3211 may notify the wake-up process activation target UE of a wake-up request reject message. In step ST3213, the serving cell notifies the UE of a reject message. For the reject message, the process by the UE that has received the reject message is similar to the process disclosed in the fifth modification of the fourth embodiment, and thus, description thereof will be omitted.

When the UE that has activated the wake-up process cannot access the wake-up process target ES cell, the serving cell may reconfigure an ES cell that is to be measured by the wake-up process activation target UE. The method for reconfiguration is similar to the method disclosed in the fifth modification of the fourth embodiment, and thus, description thereof will be omitted.

The method disclosed in this modification achieves effects similar to those of the fifth modification of the fourth embodiment.

The serving cell notifies the MME of an access restriction control request, thus eliminating the need of the serving cell to obtain the access restriction information of the ES cell. This reduces signalings between the serving cell and the ES cell. Operating a large number of cells results in an enormously increased signalings between the cells. Reducing signalings between cells is thus effective for a stable system operation.

In this modification, the MME obtains access restriction information from the ES cell. In another example, the serving cell may obtain the access restriction information from the ES cell, and the serving cell may notify the MME of the access restriction information of the ES cell. The serving cell may obtain the access restriction information from the ES cell before the serving cell notifies the MME of an access restriction control request. The access restriction information notified to the MME by the serving cell may be included in the access restriction control request message from the serving cell to the MME. The method of the first modification of the second embodiment may be applied as the method in which the serving cell obtains the access restriction information from the ES cell.

As a result, the serving cell is required to obtain the access restriction information of the ES cell, while the MME is required to perform only the access restriction control and the access restriction control process, resulting in simplified control by the MME.

Seventh Modification of Fourth Embodiment

This modification will disclose another specific example of the method of performing access restriction control when access restriction is based on CSG.

Figure 21:
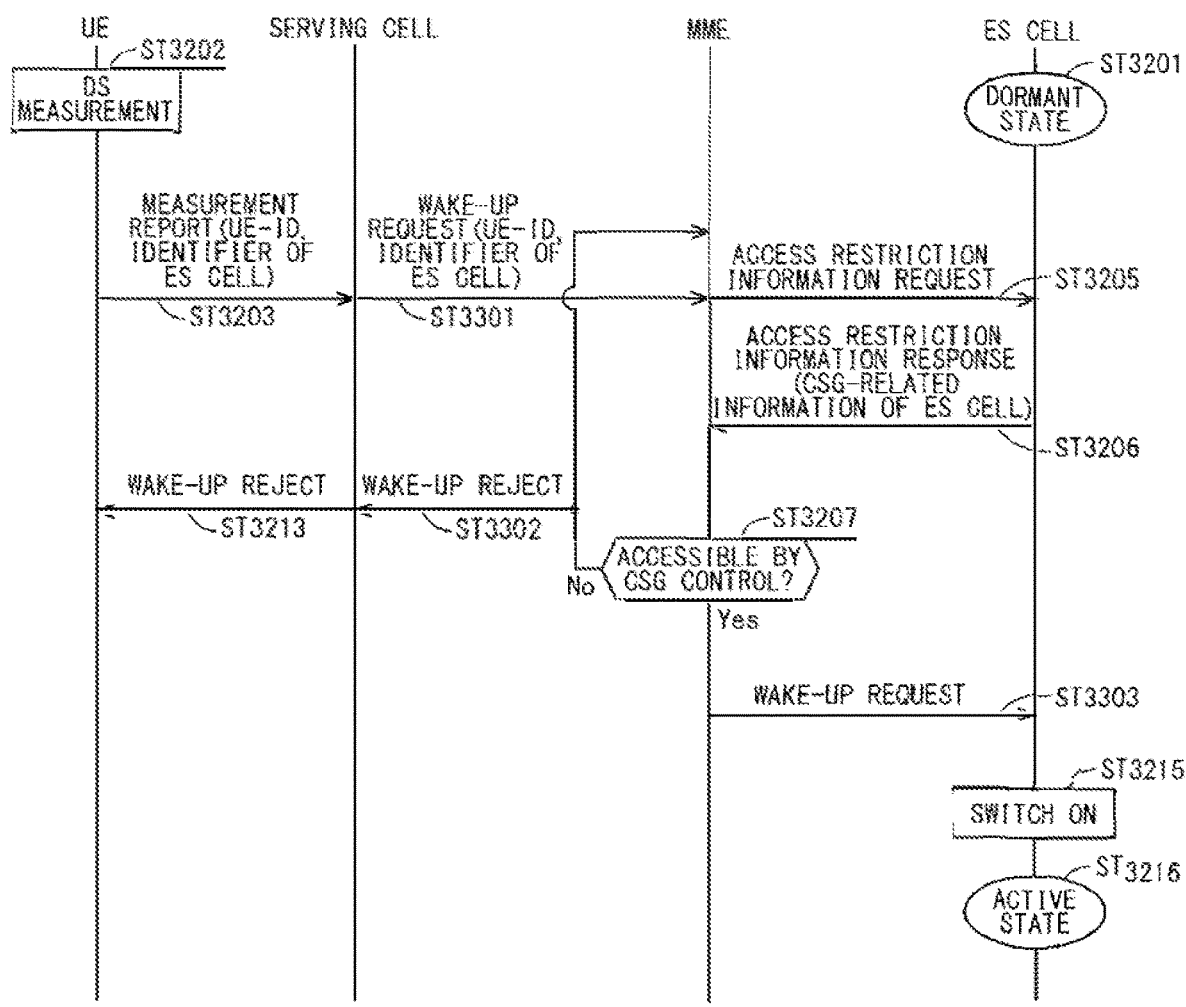
FIG. 21 shows an example sequence of a wake-up process in a communication system of a seventh modification of the fourth embodiment.

FIG. 21 shows an example sequence of the wake-up process in a communication system of a seventh modification of the fourth embodiment. FIG. 21 shows the case where the MME performs CSG control of the UE in the wake-up process. FIG. 21 also shows the case where the UE performs a DS measurement report to the serving cell. The same steps as those of FIG. 20 will be denoted by the same step numbers, and common description will be omitted.

While the serving cell notifies the ES cell of a wake-up message in the seventh modification of the fourth embodiment, in this modification, the MME performs access restriction control, and the MME notifies the ES cell of a wake-up message in accordance with the result of the access restriction control.

The serving cell that has received the DS measurement report from the UE in step ST3203 determines the ES cell in the measurement report as a wake-up process target ES cell and requests the MME to wake up the ES cell. In step ST3301, the serving cell notifies the MME of a wake-up request message. The identifier of the UE that has performed a measurement report and the wake-up process target ES cell are included in the message. This allows the MME to recognize the identifier of the wake-up process activation target UE and the identifier of the wake-up process target ES cell.

In step ST3205, the MME notifies the wake-up process target ES cell of an access restriction information request message.

In step ST3206, the ES cell that has received the access restriction information request message from the MME notifies the MME of the access restriction information of its own cell.

In step ST3207, the MME performs CSG control.

If the result of the access restriction control performed in step ST3207 shows that the wake-up process activation target UE can access the wake-up process target ES cell, the MME shifts to step ST3303 to notify the wake-up process target ES cell of a wake-up request message. S1 signaling may be used in this notification.

In step ST3215, the ES cell that has received the wake-up request message switches on its own cell. Upon switch on, in step ST3216, the ES cell shifts from the dormant state to the active state.

If the result of the access restriction control performed in step ST3207 shows that the wake-up process activation target UE cannot access the wake-up process target ES cell, the MME returns to the process of waiting for a wake-up request message in step ST3301.

If the result of the access restriction control performed in step ST3207 shows that the wake-up process activation target UE cannot access the wake-up process target ES cell, in step ST3302, the MME may notify the serving cell of a reject message.

The serving cell that has received the reject message in step ST3302 may notify the wake-up process activation target UE of a reject message.

The method disclosed in this modification achieves effects similar to those of the sixth modification of the fourth embodiment.

The access restriction control response message from the MME to the serving cell is not required, and also, the wake-up message from the serving cell to the ES cell is not required. This reduces signalings between the serving cell and the MME, and also, further reduces signalings between the serving cell and the ES cell. This is effective for a stable system operation.

Fifth Embodiment

This embodiment will disclose a specific example of the method of performing access restriction control when access restriction is based on CSG.

When the ES cell performs CSG control of the UE and the case where a wake-up signal is transmitted to the ES cell, in the wake-up process, the third embodiment can be applied by changing part thereof. CSG-related information may be used as the access restriction information, in place of the AC for EAB.

The specific example of the sequence of FIG. 16 may be applied by changing part thereof. The changed portions will be described below.

While the UE notifies the serving cell of the AC information for EAB of the UE in step ST1902 of FIG. 16, alternatively, the UE may notify of the CSG-ID information of the UE. Or, the UE may notify of an allowed CSG list that is a list of CSG-IDs held by UEs. This allows the serving cell to obtain the CSG-ID of the UE that performs a DS measurement report.

While the serving cell includes the AC for EAB of the wake-up process activation target UE in the wake-up message to the ES cell and notifies the ES cell in step ST1903 of FIG. 16, alternatively, the serving cell may notify of the CSG-ID information of the UE. Or, the serving cell may notify of the allowed CSG list that is a list of CSG-IDs held by UEs. The UE-dedicated sequence for wake-up signals which is configured for the UE and another piece of information are similar to those of the third embodiment, and thus, description thereof will be omitted. This allows the ES cell to obtain the UE-dedicated sequence allocated to the wake-up process activation target UE by the serving cell and the CSG-ID of the UE.

While the ES cell performs EAB control in step ST1907 of FIG. 16, alternatively, the ES cell may perform CSG control. The ES cell uses the UE-dedicated sequence obtained from the wake-up signal received from the UE in step ST1906 to derive the identifier of the UE which is associated with the UE-dedicated sequence received from the serving cell in step ST1903. As a result, the UE that has transmitted the wake-up signal can be specified. The ES cell derives the access restriction information of the UE which has also been received in step ST1903 from the identifier of the UE. This allows the ES cell to obtain the access restriction information of the UE that has transmitted the wake-up signal. Herein, the access restriction information is CSG-ID information.

The ES cell uses the obtained access restriction information of the UE and the access restriction information of its own cell, that is, CSG-related information to perform access restriction control of the wake-up process activation target UE. The ES cell judges whether the wake-up process activation target UE can access its own cell.

The method disclosed in this embodiment enables the introduction of CSG-based access restriction to the wake-up process for the ES cell in the dormant state which does not broadcast the system information. CSG control by the ES cell can restrict a wake-up process due to the transmission of a wake-up signal from a UE without access right. This prevents the ES cell in the dormant state from switching itself on unnecessarily. Therefore, effects similar to those of the second embodiment can be achieved.

The UE transmits a wake-up signal directly to the ES cell, thus reducing the control load of the serving cell.

First Modification of Fifth Embodiment

This modification will disclose another specific example of the method of performing access restriction control when access restriction is based on CSG.

Disclosed below are a case where the serving cell performs CSG control of the UE and a case where the UE transmits a wake-up signal to the ES cell, in the wake-up process.

In this case, the first modification of the third embodiment can be applied by changing part thereof. CSG-related information may be used as the access restriction information, in place of the AC for EAB.

The specific example of the sequence of FIG. 17 may be applied by changing part thereof. Changed portions will be described below.

While the ES cell notifies the serving cell of the AC information for EAB of the ES cell in step ST1702 of FIG. 17, alternatively, the ES cell may notify of the CSG-related information of the ES cell. Examples of the CSG-related information include a CSG-ID, CSG indication, and access mode. This allows the serving cell to obtain the CSG-related information of the ES cell.

While the UE notifies the serving cell of the AC information for EAB of the UE in step ST1703 of FIG. 17, alternatively, the UE may notify of the CSG-ID of the UE. Or, the UE may notify of the allowed CSG list that is a list of CSG-IDs held by UEs. This allows the serving cell to obtain the CSG-ID of the UE to be connected therewith.

While the serving cell performs EAB control in step ST1704 of FIG. 17, alternatively, the serving cell may perform CSG control. The serving cell uses the identifier of the UE that has notified of the CSG-ID information in step ST1703, the CSG-ID information associated with the identifier, and the CSG-related information of the ES cell to judge whether the wake-up process activation target UE can access an ES cell.

The serving cell judges whether the ES cell belongs to a CSG and whether the access mode is the open mode or the closed mode, thereby judging whether the wake-up process activation target UE can access the ES cell. When the ES cell does not belong to a CSG or the access mode is the open mode, the serving cell judges that the wake-up process activation target UE can access the ES cell. When the ES cell belongs to a CSG and the access mode is the closed mode, the serving cell judges that the UE can access the ES cell if the CSG-ID of the UE is the same as the CSG-ID of the ES cell or judges that the UE cannot access the ES cell if the CSG-ID of the UE is different from the CSG-ID of the ES cell.

The method disclosed in this embodiment enables the introduction of CSG-based access restriction to the wake-up process for the ES cell in the dormant state which does not broadcast the system information. CSG control by the ES cell can restrict a wake-up process due to the transmission of a wake-up signal from a UE without access right. This prevents the ES cell in the dormant state from switching itself on unnecessarily. Therefore, effects similar to those of the second modification of the fourth embodiment can be achieved.

The UE transmits a wake-up signal directly to the ES cell, thus reducing the control load of the serving cell.

The serving cell performs CSG-based access restriction control, thus eliminating the need to use a UE-dedicated sequence for a wake-up signal. The serving cell does not need to allocate a UE-dedicated sequence for wake-up signals, and the serving cell does not need to notify the ES cell or the UE of a UE-dedicated sequence. This results in simplified control and a reduced amount of information to be signaled.

Second Modification of Fifth Embodiment

This modification will disclose another specific example of the method of performing access restriction control when access restriction is based on CSG.

Disclosed below are a case where the UE performs CSG control and a case where the UE transmits a wake-up signal to the ES cell, in the wake-up process.

In this case, the second modification of the third embodiment can be applied by changing part thereof. CSG-related information may be used as the access restriction information, in place of the AC for EAB.

The specific example of the sequence of FIG. 15 may be applied by changing part thereof. The following changes may be made in addition to the changes made in the second modification of the third embodiment.

While the ES cell notifies the serving cell of the AC information for EAB of the ES cell in step ST1802 of FIG. 15, alternatively, the ES cell may notify of the CSG-related information of the ES cell. Examples of the CSG-related information include a CSG-ID, CSG indication, and access mode. This allows the serving cell to obtain the CSG-related information of the ES cell.

While the serving cell notifies the UE of the AC information for EAB of the ES cell in step ST1803 of FIG. 15, alternatively, the serving cell may notify of the CSG-related information of the ES cell. This allows the UE to obtain the CSG-related information of the ES cell subjected to the DS measurement configuration.

While the UE performs EAB control in step ST1804 of FIG. 15, alternatively, the UE may perform CSG control. In this case, the UE uses the CSG-ID information of its own UE and the CSG-related information of the ES cell to judge whether the UE can access the ES cell. Specifically, the UE judges whether the ES cell belongs to a CSG and whether the access mode is the open mode or the closed mode, thereby judging whether its own UE can access the ES cell.

When the ES cell does not belong to a CSG or the access mode is the open mode, the UE judges that it can access the ES cell. When the ES cell belongs to a CSG and the access mode is the closed mode, the UE judges that it can access the ES cell if the CSG-ID of its own UE is the same as the CSG-ID of the ES cell or judges that it cannot access the ES cell if the CSG-ID of its own UE is different from the CSG-ID of the ES cell.

The method disclosed in this modification enables the introduction of CSG-based access restriction to the wake-up process for the ES cell in the dormant state which does not broadcast the system information. CSG control by the UE can remove a cell that denies access from the measurement configuration of the ES cell. The UE is prevented from measuring an ES cell to which the UE has no access right. This restricts a wake-up process from a UE without right to access the wake-up process target ES cell, thus preventing the ES cell in the dormant state from switching itself on unnecessarily. Therefore, effects similar to those of the third modification of the fourth embodiment can be achieved.

The UE transmits a wake-up signal directly to the ES cell, thus reducing the control load of the serving cell.

Third Modification of Fifth Embodiment

This modification will disclose another specific example of the method of performing access restriction control when access restriction is based on CSG.

In this modification, the CSG list of a UE held by the MME is used in the wake-up process.

In this modification, in the method disclosed in the fifth embodiment, an access restriction control request to the MME is added, the MME performs access restriction control, and the ES cell switches on its own cell in accordance with the result of the access restriction control, in place of the ES cell performing access restriction control.

Figure 22:
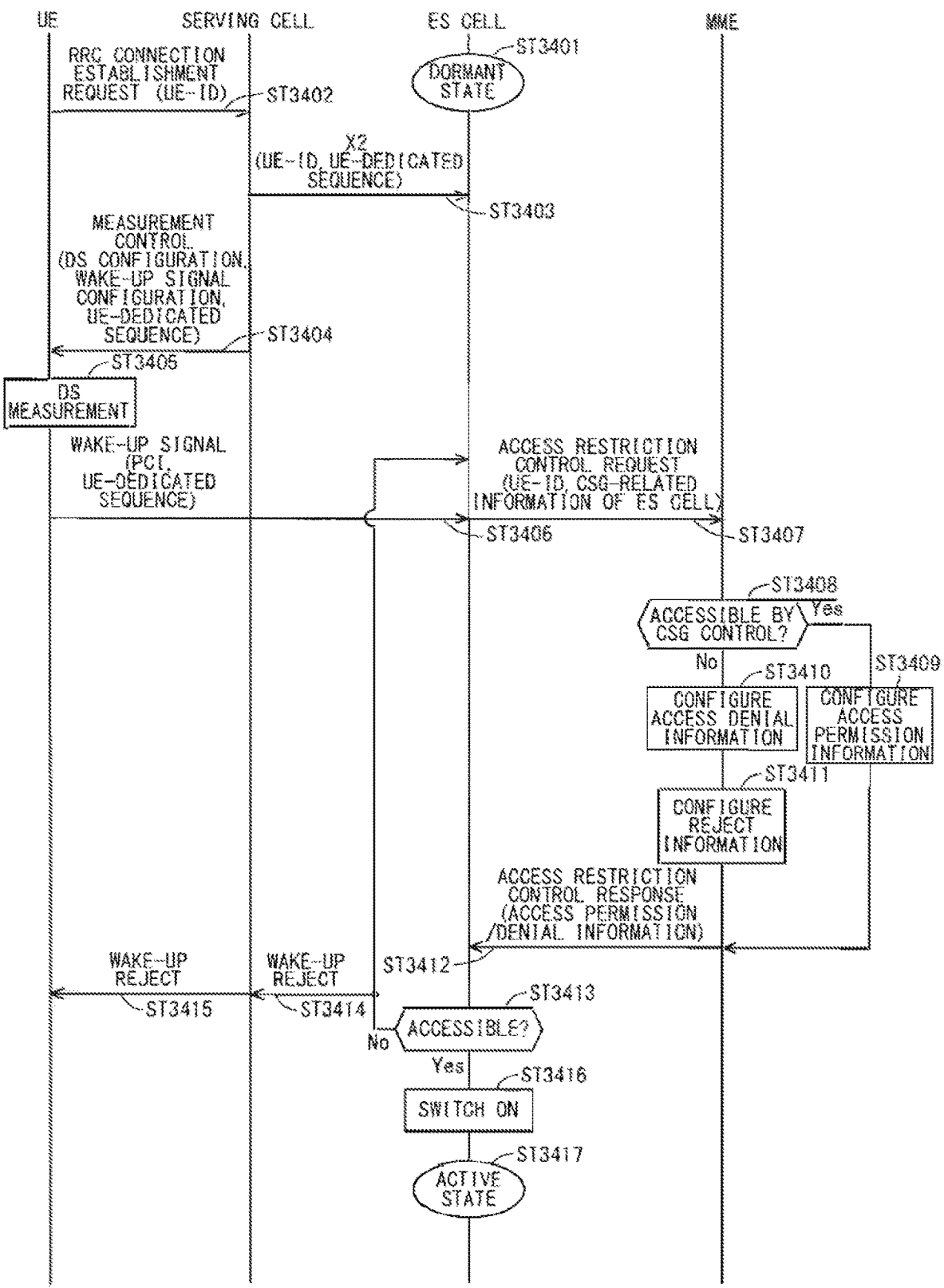
FIG. 22 shows an example sequence of a wake-up process in a communication system of a third modification of a fifth embodiment.

FIG. 22 shows an example sequence of the wake-up process in a communication system of a third modification of the fifth embodiment. Described is a case where the MME performs CSG control in the wake-up process. Also described is a case where the UE transmits a wake-up signal to the ES cell.

In step ST3401, the ES cell is in the dormant state.

In step ST3402, the UE notifies the serving cell of the identifier of its own UE. RRC signaling may be used in this notification. Notification may be made as RRC signaling in the RRC connection establishment process. In other words, the identifier may be included in the RRC connection establishment request message and notified or may be included in the RRC connection establishment complete message and notified. Alternatively, the identifier may be notified in the RRC connection reestablishment process. In other words, the identifier may be included in the RRC connection reestablishment request message and notified or may be included in the RRC connection reestablishment complete message and notified. The serving cell can thus recognize the UE RRC-connected therewith.

The serving cell that has received the identifier of the UE RRC-connected therewith in step ST3402 configures, for the UE RRC-connected therewith, a UE-dedicated sequence for wake-up signals. The UE-dedicated sequence is similar to the process disclosed in the third embodiment, and thus, description thereof will be omitted. The CSG-ID of the UE does not need to be notified.

In step ST3403, the serving cell notifies the ES cell of the UE identifier of the UE RRC-connected therewith and the UE-dedicated sequence configured for the UE. The UE identifier of the UE and the UE-dedicated sequence may be associated with each other and notified. The serving cell does not need to notify of the CSG-ID of the UE.

The serving cell may notify the ES cell of another piece of information. The following three, (1) to (3), will be disclosed as specific examples of the other piece of information.
  (1) PLMN information of a UE.
  (2) Identifier of a serving cell.
  (3) Combination of (1) and (2) above, which may be combined with a UE-dedicated sequence and notified or may be associated with the UE identifier and notified.

In step ST3404, the serving cell notifies the UE of a measurement control message. The process of step ST3404 is similar to the process of step ST1904 of FIG. 16 disclosed in the third embodiment, and thus, description thereof will be omitted.

In step ST3405, the UE that has received the measurement control message from the serving cell in step ST3404 measures the DS of the ES cell configured as a measurement cell. The UE may perform DS measurement for detecting the ES cell. This is similar to the process of step ST1905 of FIG. 16 disclosed in the third embodiment, and thus, description thereof will be omitted.

When the criterion for the DS measurement of the ES cell or the DS measurement for detecting an ES cell is satisfied in step ST3405, in step ST3406, the UE transmits a wake-up signal for requesting wake-up to the ES cell whose criterion has been satisfied. This is similar to the process of step ST1906 of FIG. 16 disclosed in the third embodiment, and thus, description thereof will be omitted.

The ES cell that has received the wake-up signal from the UE in step ST3406 uses the cell identifier used for the wake-up signal to judge whether the wake-up signal is directed to its own cell. Alternatively, the ES cell may detect a wake-up signal directed to its own cell from the cell identifier of its own cell.

If the wake-up signal is not directed to its own cell, the ES cell does not process the wake-up signal.

If the wake-up signal is directed to its own cell, the ES cell obtains the UE-dedicated sequence used for the wake-up signal and derives the identifier of the UE that has notified of the wake-up signal from the information of the identifier of the UE and the UE-dedicated sequence configured for the UE, which has been obtained in step ST3403.

In step ST3407, the ES cell notifies the MME of a message requesting access restriction control. S1 signaling may be used in this notification. The UE identifier of the UE that has notified of the wake-up signal, that is, the wake-up process activation target UE is included in the access restriction control request message. Alternatively, the CSG-related information of its own ES cell, that is, the wake-up process target ES cell may be included in the access restriction control request message.

Consequently, the MME can obtain the UE identifier of the wake-up process activation target UE and the CSG-related information of the wake-up process target ES cell.

The access restriction information of the ES cell may be notified through signaling different from that of the access restriction control request message. The access restriction information of the ES cell may be included in another message, which is to be notified to the MME by the ES cell, and notified. This method is similar to the method disclosed in the fifth modification of the fourth embodiment, and thus, description thereof will be omitted.

In step ST3408, the MME performs CSG control. The MME uses the CSG list of UEs which is held by its own MME to derive, from the identifier of the wake-up process activation target UE which has been obtained in step ST3407, the CSG-related information of the UE. A non-limiting example of the CSG-related information is a CSG-ID. The MME uses the derived CSG-related information of the UE and the CSG-related information of the wake-up process target ES cell which has been obtained in step ST3407 to judge whether the wake-up process activation target UE can access the wake-up process target ES cell.

Specifically, the MME judges whether the ES cell belongs to a CSG and whether the access mode is the open mode or the closed mode, thereby judging whether the wake-up process activation target UE can access the wake-up process target ES cell.

When the ES cell does not belong to a CSG or the access mode is the open mode, the MME judges that the UE can access the ES cell. When the ES cell belongs to a CSG and the access mode is the closed mode, the MME judges that the UE can access the ES cell if the CSG-ID of the UE is the same as the CSG-ID of the ES cell or judges that the UE cannot access the ES cell if the CSG-ID of the UE is different from the CSG-ID of the ES cell.

If the result of the access restriction control shows that the wake-up process activation target UE can access the wake-up process target ES cell, the MME notifies the ES cell of an access permission message. S1 signaling may be used in this notification.

If the result of the access restriction control shows that the wake-up process activation target UE cannot access the wake-up process target ES cell, the MME notifies the ES cell of an access denial message. S1 signaling may be used in this notification.

The access permission message and the access denial message may be the same message (for example, an access restriction control response message), which includes the information indicating whether access can or cannot be made. The MME may notify the ES cell of the message. S1 signaling may be used in this notification.

If the result of the access restriction control performed in step ST3408 shows that the wake-up process activation target UE can access the wake-up process target ES cell, the MME configures access permission information for the ES cell in the access restriction control response message in step ST3409 and, in step ST3412, notifies the ES cell of the access restriction control response message.

If the result of the access restriction control performed in step ST3408 shows that the wake-up process activation target UE cannot access the wake-up process target ES cell, the MME configures access denial information for the ES cell in the access restriction control response message in step ST3410 and, in step ST3412, notifies the ES cell of the access restriction control response message.

The UE identifier of the wake-up process activation target UE may be included in the access permission message or the access denial message. The CSG-ID of the UE may be included. This explicitly shows a UE whose access has been allowed or denied, thus preventing malfunction.

The access denial message may include reject information. The reject information may be the information included in the reject message disclosed in the first embodiment. Herein, the information indicating that an access denial is due to CSG control may be included.

If the result of the access restriction control performed in step ST3408 shows that the wake-up process activation target UE cannot access the wake-up process target ES cell, the MME configures reject information in the access restriction control response message in step ST3411 in addition to the configuration of step ST3410 and, in step ST3412, notifies the ES cell of the access restriction control response message.

In step ST3413, the ES cell that has received the access restriction control response message in step ST3412 uses the information, included in the message, which indicates whether access can or cannot be made to judge whether the wake-up process activation target UE can access its own cell. When the information indicating that access can be made is included, in step ST3416, the ES cell switches on its own cell. Upon switch on, in step ST3417, the ES cell shifts from the dormant state to the active state.

When the information indicating that access cannot be made is included in step ST3413, the ES cell does not switch on its own cell. The ES cell may return to the process of waiting for a wake-up signal in step ST3406.

The ES cell that has received the reject information together with the information indicating that access cannot be made in step ST3412 may notify the serving cell of a wake-up reject message. In this case, in step ST3414, the ES cell notifies the serving cell of a wake-up reject message.

The wake-up reject message may include reject information. Herein, it may be indicated that access restriction is based on CSG control.

The serving cell that has received the wait timer information may be prohibited from notifying a wake-up request to the ES cell for a duration set by the wait timer. Alternatively, the serving cell may be allowed to perform a configuration such that the ES cell is not measured by the UE being served thereby for a duration set by the wait timer. The serving cell may allow a configuration such that the ES cell is measured by the UE being served thereby after the expiration of the duration set by the wait timer.

The serving cell that has received the wake-up reject message may notify the wake-up process activation target UE of the wake-up reject message. In this case, in step ST3415, the serving cell notifies the UE of the wake-up reject message. The wake-up reject message indicates that the wake-up process target ES cell is inaccessible or may indicate that the ES cell cannot be woken up. The UE that has received the wake-up reject message in step ST3415 may be prevented from measuring the ES cell or may be prevented from performing a measurement report.

The wake-up reject message may include the cause information or wait timer information. The cause information may be the information indicating that wake-up reject is due to access restriction. Herein, it may be indicated that access restriction is based on CSG control.

The UE that has received the wait timer information may be prevented from measuring the ES cell for a duration set by the wait timer or may be prevented from performing a measurement report of the ES cell for the duration set by the wait timer.

The serving cell that has received the wake-up reject message may reconfigure an ES cell that is to be measured by the wake-up process activation target UE or may perform a configuration such that the ES cell subjected to access restriction is not to be measured. Notification may be made in the measurement control message again. Configuring the ES cell may be prevented in the measurement control message. Alternatively, the ES cell may be configured in a black list of the measurement control message and notified. Or, the ES cell may be configured in a gray list of the measurement control message and notified.

The method disclosed in this modification enables the introduction of CSG-based access restriction to the wake-up process for the ES cell in the dormant state which does not broadcast the system information. CSG control by the MME can restrict the transmission of a wake-up signal from a UE without access right. This prevents the ES cell in the dormant state from switching itself on unnecessarily. Therefore, effects similar to those of the fifth modification of the fourth embodiment can be achieved.

The UE transmits a wake-up signal directly to the ES cell, thus reducing the control load of the serving cell.

In this modification, the ES cell makes an access restriction control request to the MME. In another example, the serving cell may make an access restriction control request to the MME. Similar effects can be achieved.

In this case, the MME is caused to perform the access restriction control process of the method, disclosed in the first modification of the fifth embodiment, in which the serving cell performs access restriction control. The serving cell notifies the MME of an access restriction control request message, and the MME that has received this message performs access restriction control and notifies the serving cell of the access restriction control response message. The serving cell may judge whether access to the ES cell is permitted or is denied and configure only an accessible ES cell in the measurement control message to the UE.

While the serving cell obtains the access restriction information of the ES cell from the ES cell in the first modification of the fifth embodiment, in another method, the MME may obtain the access restriction information from the ES cell. Herein, the method disclosed in the sixth modification of the fourth embodiment may be applied. The amount of signaling between the serving cell and the ES cell can be reduced.

Sixth Embodiment

3GPP has developed the standard of multimedia broadcast multicast service (MBMS) (see Non-Patent Document 1). In the MBMS, data is subjected to multi-cell transmission from multiple cells. In some cases, thus, a UE being served by a cell receives the MBMS of its neighbor cell. The UE does not need to recognize from which cell it is receiving data. The MBMS can be received not only by a UE in RRC_CONNECTED but also by a UE in RRC_IDLE. When the ES cell performing the MBMS is subjected to cell off, therefore, the received quality of the UE receiving the MBMS from the ES cell degrades.

3GPP has discussed switch off of an ES cell which is performed when no UE in RRC_CONNECTED is located being served by the ES cell. The MBMS, however, can also be received by the UE in RRC_IDLE. When no UE in RRC_CONNECTED is located being served by the ES cell although a UE receiving MBMS from the ES cell is present, the ES cell is switched off in some cases. These cases involve a problem of degraded MBMS received quality of the UE that has received the MBMS from the switched-off ES cell. In the worst case, the MBMS cannot be received.

This embodiment aims to restrict the degradation in MBMS received quality or failed reception of the MBMS due to cell off of the ES cell.

The following four, (1) to (4), will be disclosed as solutions.
(1) An ES cell that has the capability to provide the MBMS is not subjected to cell off.
(2) An ES cell is not subjected to cell off during an MBMS session.
(3) An ES cell performs MBMS counting before being subjected to cell off.
(4) An ES cell provides the MBMS also in the dormant state.

Specific examples of the solution (1) will be described below.

The ES cell judges whether its own cell can provide the MBMS to determine whether it can be subjected to cell off.

The following six, (1-1) to (1-6), will be disclosed as specific examples of the criterion for judging whether the MBMS can be provided.
(1-1) Whether an MBSFN Subframe is Configurable.

When an MBSFN subframe is configurable, the ES cell judges that it can provide the MBMS.
(1-2) Whether an M2 Interface has been Set Up.

When an M2 interface has been set up, the ES cell judges that it can provide the MBMS.

(1-3) Whether the ES Cell is Connected with an MCE.

Any interface will suffice, and the ES cell makes a judgment based on whether it is connected with an MCE. When being connected with an MCE, the ES cell judges that it can provide the MBMS.
(1-4) Whether an MCE Function is Provided.

In some cases, an MCE function is provided in an eNB. The ES cell may thus make a judgment based on whether the eNB configuring an ES cell has an MCE function in its own eNB. When an MCE function is provided in an eNB, the ES cell judges that it can provide the MBMS.
(1-5) Whether the ES Cell has Received an MCE Configuration from an MCE.

When the ES cell has received the MCE configuration from the MCE, the MCE is connected, and thus, the ES cell judges that it can provide the MBMS.
(1-6) Combination of (1-1) to (1-5) Above.

The ES cell may make a judgment based on any one of the specific examples (1-1) to (1-5) or may make a judgment by combining a plurality of criteria for judgment. This enables flexible judgment according to the configuration of a communication system.

The ES cell cannot be subjected to cell off when its own cell can provide the MBMS. The ES cell may be configured so as to be subjected to cell off when its own cell cannot provide the MBMS.

Consequently, the UE can receive the MBMS from the ES cell without degradation in received quality. In addition, the user experience of the user receiving the MBMS is not degraded. This allows the ES cell capable of cell on and cell off to provide the MBMS.

Whether the ES cell can be subjected to cell off may be judged by its own cell at any timing or may be judged when its own cell receives a message to instruct cell off from another NW node. A non-limiting specific example of the case where its own cell makes judgment at any timing is a case where no UE in RRC_CONNECTED is located being served thereby.

If judging that it cannot be subjected to cell off when receiving a message to instruct cell off from another NW node, the ES cell may notify the NW node of a message indicating that the ES cell cannot be subjected to cell off. Cause information may be included and notified. For example, the criteria for judgment of the specific examples (1-1) to (1-6) may be a cause. This allows the NW node to recognize that the ES cell cannot be subjected to cell off. The NW node can thus perform a flexible operation such as cell off of another ES cell.

The ES cell may notify a neighbor cell or a neighbor NW node of the information indicating whether its own cell can provide the MBMS. The neighbor cell or neighbor NW node can determine, based on the information of the ES cell indicating whether it can provide the MBMS, whether to perform cell off of the ES cell. This eliminates the need for transmitting a message to instruct cell off to the ES cell that cannot be subjected to cell off, thus reducing an amount of signaling.

Specific examples of the solution (2) will be described below.

The ES cell judges whether it is during an MBMS session from a multi-cell/multicast coordination entity (MCE), thereby determining whether cell off can be performed.

The following four, (2-1) to (2-4), will be disclosed as specific examples of the criterion for judging whether the ES cell is during an MBMS session.

(2-1) Whether the ES Cell has Received an MBMS Session Start Request from the MCE.

When receiving an MBMS session start request message from the MCE, the ES cell starts an MBMS session. When receiving an MBMS session start request message, thus, the ES cell judges that it is during an MBMS session. Alternatively, when transmitting, to the MCE, an MBMS session start response message in response to the MBMS session start request received from the MCE, the ES cell may judge that the ES cell is during the MBMS session.

When receiving an MBMS session end request message regarding the started MBMS session, the ES cell ends the MBMS session. When receiving the MBMS session end request message regarding the started MBMS session, thus, the ES cell judges that it is not during the MBMS session. Alternatively, when transmitting, to the MCE, an MBMS session end response message in response to the MBMS session end request received from the MCE, the ES cell may judge that it is not during the MBMS session.

(2-2) Whether the ES Cell has Received the MBMS Scheduling Information from the MCE.

When receiving the MBMS scheduling information from the MCE, the ES cell starts an MBMS session. When receiving the MBMS scheduling information, thus, the ES cell judges that it is during an MBMS session. Alternatively, the ES cell may make judgment when transmitting, to the MCE, an MBMS scheduling information response message in response to the MBMS scheduling information received from the MCE.

(2-3) Whether the ES Cell has Received the MBMS Data from the MCE.

Examples of the NW node include BMSC and MBMS GW. When having received the data of the MBMS, the ES cell judges that it is during an MBMS session.

(2-4) Combination of (2-1) to (2-3) Above.

Judgment may be made based on any one of the specific examples (2-1) to (2-3) above, or judgment may be made by combining a plurality of criteria for judgment. This enables flexible judgment according to the configuration of the communication system.

When its own cell is during an MBMS session, the ES cell should not be subjected to cell off. When its own cell is not during an MBMS session, the ES cell should be subjected to cell off.

When the ES cell can execute a plurality of MBMS sessions, the ES cell should be subjected to cell off if it is during even one MBMS session. The ES cell should be subjected to cell off if it is during none of the MBMS sessions.

Consequently, the UE can receive the MBMS from the ES cell without degradation in received quality. In addition, the user experience of the user receiving the MBMS is not degraded. This allows the ES cell capable of cell on and cell off to provide the MBMS.

Whether the ES cell can be subjected to cell off may be judged by its own cell at any timing or may be judged when its own cell receives a message to instruct cell off from another NW node. A non-limiting specific example of the case where its own cell makes a judgment at any timing is a case where no UE in RRC_CONNECTED is located being served thereby.

If judging that it cannot be subjected to cell off when receiving a message to instruct cell off from another NW node, the ES cell may notify the NW node of a message indicating that the ES cannot be subjected to cell off. Cause information may be included and notified. For example, the criteria for judgment of the specific examples (2-1) to (2-4) may be a cause. This allows the NW node to recognize that the ES cell cannot be subjected to cell off. The NW node can thus perform a flexible operation such as cell off of another ES cell.

The ES cell may notify a neighbor cell or a neighbor NW node of the information indicating whether its own cell is during an MBMS session. The neighbor cell or neighbor NW node can determine, based on the information indicating whether the ES cell is during an/MBMS session, whether to perform cell off of the ES cell. This eliminates the need for transmitting a message to instruct cell off to the ES cell that cannot be subjected to cell off, thus reducing an amount of signaling.

Specific examples of the solution (3) will be described below.

The ES cell performs MBMS counting before cell off.

MBMS counting is one of the MBMS functions (see Non-Patent Document 1). MBMS counting is used to determine whether a UE receiving the MBMS is present. In the current standard, MBMS counting is applied only to the UEs in RRC_CONNECTED. Herein, MBMS counting is also applied to the UEs in RRC_IDLE. Disclosed below is a method also applied to the UEs in RRC_IDLE.

The cell causes the UE in RRC_IDLE being served thereby to shift to the RRC_CONNECTED state. Conventional MBMS counting is performed on the UE in RRC_CONNECTED. The cell may perform paging to the UE being served thereby as a method of causing the UE in RRC_IDLE being served thereby to shift to the RRC_CONNECTED state. The information indicating that paging is for MBMS counting may be included in a paging message.

The UE that has received the paging message for MBMS counting performs an RRC connection establishment process on the cell and then shifts to the RRC_CONNECTED state. In the RRC connection establishment process, the UE may show that it has performed the RRC connection establishment on the cell for MBMS counting. For example, the information indicating that the RRC connection establishment is for MBMS counting is provided. The UE includes this information in an RRC connection establishment request message, an RRC connection establishment complete message, or any other message and notifies the cell. This allows the cell to recognize that the UE has performed the RRC connection establishment process for MBMS counting.

The cell performs MBMS counting on the UE that has performed RRC connection establishment for MBMS counting. A conventional method may be applied to the process for MBMS counting.

After the MBMS counting process, the cell may perform an RRC connection release process on the UE or may continue RRC connection as required.

The MBMS counting process allows the ES cell to judge whether a UE, which is receiving the MBMS or is to receive the MBMS, is located being served thereby.

When a UE, which is receiving the MBMS or is to receive the MBMS, is located being served thereby, the ES cell should not be subjected to cell off. When no UE, which is receiving the MBMS or is to receive the MBMS, is located being served thereby, the ES cell should be subjected to cell off.

Consequently, the UE can receive the MBMS from the ES cell without degradation in received quality. In addition, the user experience of the user receiving the MBMS is not degraded. This allows the ES cell capable of cell on and cell off to provide the MBMS.

Specific examples of the solution (4) will be described.

The ES cell provides the MBMS also in the dormant state.

The following three, (4-1) to (4-3), will be disclosed as specific examples of the case where the ES cell provides the MBMS in the dormant state.

(4-1) Both of the MBMS Control Information and the MBMS Data are Transmitted.

(4-2) Part of the MBMS Control Information and the MBMS Data are Transmitted.

(4-3) Only the MBMS Data is Transmitted.

In the specific example (4-1) above, the ES cell in the dormant state transmits the information about MBMS control required for providing MBMS (hereinafter also referred to "MBMS control information"). The ES cell also transmits the MBMS data. A non-limiting example of the MBMS data is the data transmitted over the MTCH. The conventional method may be applied to the transmission of MBMS control information and the transmission of MBMS data. This allows the UE to receive the MBMS.

The radio links of the MBMS include downlinks but no uplinks. The cell that provides only the MBMS thus does not need to receive an uplink even when transmitting both of the MBMS control information and data, thus reducing power consumption.

In the specific example (4-2) above, the ES cell in the dormant state transmits only part of the MBMS control information and MBMS data. Part of the MBMS control information may be the information excluding the information broadcast as the conventional system information. This eliminates the need of the ES cell to broadcast the system information, thus further reducing power consumption.

Examples of the information, which is broadcast as the conventional system information, of the MBMS control information include the configuration information of an MBSFN subframe (mbsfn-SubframeConfigList), MBSFN area information (mbsfn-AreaInfoList) that is the configuration information of an MCCH, and the configuration information of the information indicating a change in MCCH (MBMS-notificationConfig).

Part of the MBMS control information may be the information excluding the information broadcast as the conventional system information and the MBMS control information transmitted over the PDCCH. This allows the ES cell to further reduce power consumption.

A non-limiting example of the MBMS control information transmitted over the PDCCH is "MCCH information change notification" that is the information indicating a change in MCCH.

A non-limiting example of the part of the MBMS control information transmitted from the ES cell is an MCCH. The ES cell transmits the MBMS control information that is transmitted on the MCCH.

The ES cell transmits only part of the MBMS control information, and thus, needs to notify the UE of the MBMS control information not to be transmitted. The ES cell in the dormant state, however, cannot notify the UE.

A method of solving this problem will be disclosed. The ES cell that provides the MBMS in the dormant state notifies, via the serving cell for the UE, the UE of the MBMS control information not to be transmitted by its own cell.

A specific example will be disclosed.

The ES cell that provides the MBMS in the dormant state notifies a neighbor cell of the MBMS control information. The cell that has received the MBMS control information notifies the UE being served thereby of the MBMS control information. This allows the UE to obtain the MBMS control information of the MBMS provided by the ES cell in the dormant state. The UE receives the DS of the ES cell in the dormant state, thereby being synchronized with the ES cell. The UE can use the MBMS control information received from the serving cell and the MBMS control information transmitted from the ES cell to receive the MBMS from the dormant ES cell.

Consequently, the UE can receive the MBMS transmitted from the ES cell even when the ES cell is dormant, and thus, can receive the MBMS without degradation in received quality. In addition, the user experience of the user receiving the MBMS is not degraded. This allows the ES cell capable of cell on and cell off to provide the MBMS.

Another solution will be disclosed. The ES cell and the neighbor cell for the ES cell are configured in the same MBSFN area. The neighbor cell may be determined in advance, which may be, for example, a cell within the range in which the MBMS can be received from the ES cell.

The cells in the same MBSFN area are subjected to multi-cell transmission. The UE being served by the neighbor cell for the ES cell thus does not need to recognize from which cell it is receiving the MBMS by following the MBMS control information of the serving cell, thereby receiving the MBMS from the ES cell.

The ES cell does not need to directly notify the UE or notify the UE via the serving cell of the MBMS control information, thus reducing an amount of signaling.

When ES cells are configured in a plurality of MBSFN areas, neighbor cells may also be configured in the same number of MBSFN areas. The MBMS service provided by the ES cell is also provided by the neighbor cell, so that the neighbor cell notifies the UE being served thereby of the MBMS control information to each MBMS service. The UE being served by the neighbor cell for the ES cell does not need to recognize from which cell it is receiving the MBMS service by following the MBMS control information from the serving cell, thereby receiving each MBMS service from the ES cell.

In the specific example (4-3) above, the ES cell transmits only the MBMS data. The ES cell does not transmit the MBMS control information. The conventional method may be applied to the transmission of the MBMS data. The ES cell transmits only the MBMS data, thereby further reducing power consumption.

Although the ES cell needs to notify the UE of the MBMS control information, the ES cell in the dormant state cannot notify the UE. The method described above may be used also in this case.

Consequently, the ES cell in the dormant state can provide the MBMS. This allows the ES cell to reduce power consumption and also allows the UE to receive the MBMS from the ES cell without degradation in received quality. In addition, the user experience of the user receiving the MBMS is not degraded.

Seventh Embodiment

When the ES cell is in the dormant state even though a UE capable of receiving the MBMS from the ES cell is present, the UE cannot receive the MBMS from the ES cell in the dormant state.

The sixth embodiment has disclosed, as the solution in such a case, that the ES cell provides the MBMS also in the dormant state, while this embodiment discloses another method.

The UE that receives the MBMS or the UE that is to receive the MBMS is allowed to execute the wake-up process on the ES cell in the dormant state.

A specific example will be disclosed.

The serving cell obtains the MBMS control information of a neighbor ES cell. The ES cell notifies the neighbor cell of the MBMS control information of its own cell. X2 signaling may be used. Notification may be made via the MME. S1 signaling may be used. Notification may be made via the MCE. M2 signaling may be used.

The serving cell notifies the UE being served thereby of the obtained MBMS control information of the neighbor ES cell. The serving cell may notify the UE being served thereby of the MBMS control information of the ES cell belonging to an MBSFN area to which its own cell does not belong. The information may be associated with the cell identifier of the ES cell and notified. Alternatively, the information may be associated with an MBSFN area and notified.

The following two, (1) and (2), will be disclosed as specific examples of the notification method.

(1) MBMS Control Information is Broadcast.

The serving cell may notify the UE being served thereby of the MBMS control information of the ES cell. For example, the serving cell includes the information in an SIB and broadcasts the SIB. The UE being served thereby receives the SIB from the serving cell, thereby obtaining the MBMS control information of the ES cell.

(2) MBMS Control Information is Notified Through Dedicated Signaling.

The serving cell may use dedicated signaling to notify the UE of the MBMS control information of the ES cell. For example, RRC signaling may be used. The cell may notify the UE that performs an RRC connection establishment process or an RRC connection reestablishment process when the UE performs this process. Alternatively, the cell may include the information in the measurement control message and notify of the message.

In another method, the cell may notify the UE that performs a camp-on process when the UE performs the camp-on process. Alternatively, the cell may notify the UE that performs a TAU process in the TAU process. The TAU process may be performed in, for example, a periodic TAU process.

In another method, the serving cell may use dedicated signaling to notify the UE that has performed a DS measurement report of the MBMS control information of the ES cell.

Consequently, the UE can obtain the MBMS control information at the ES cell from the serving cell. The UE may obtain the MBMS control information of the ES cell belonging to an MBSFN area different from that of the serving cell.

The UE that receives the MBMS or the UE that is to receive the MBMS performs DS measurement of an ES cell or DS measurement for detecting an ES cell.

The UE that receives the MBMS or the UE that is to receive the MBMS may limit ES cells that are to be subjected to ES cell measurement or the measurement for detecting an ES cell to ES cells that perform MBMS service.

The UE notifies the ES cell that performs MBMS service, which satisfies the predetermined criterion for DS measurement, of a wake-up signal. The UE may notify of a wake-up message via the serving cell. The UE notifies the serving cell of a DS measurement report, and the serving cell that has received the DS measurement report notifies the ES cell of a wake-up request message. The first embodiment to the third modification of the fifth embodiment may be applied to the wake-up process.

Even if the UE that receives the MBMS or the UE that is to receive the MBMS is in RRC_IDLE, the UE may be allowed to execute the wake-up process on the ES cell in the dormant state.

The wake-up process by the UE, which is in RRC_IDLE, may be performed by the method described above after the UE is RRC-connected to the serving cell once. Alternatively, the UE may transmit a wake-up signal to the ES cell while being in RRC_IDLE. The method of notifying of the MBMS control information of the ES cell, described above, may be applied to notifying the UE of the configuration of the wake-up signal of the ES cell and the DS configuration. The configurations may be notified together with the MBMS control information of the ES cell.

The method disclosed in this embodiment allows the UE to perform cell on of the ES cell in the dormant state, thus improving the communication quality of the MBMS or receiving the MBMS. The user experience of the user that receives the MBMS can thus be improved.

The embodiments and the modifications thereof are merely illustration of the present invention and can be freely combined within the scope of the invention. Any elements of the embodiments and the modifications thereof can be appropriately modified or omitted. A communication system is therefore provided that enables cell on and cell off and reduces the power consumption of a network and the interference of the system also when a large number of cells are operated.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

1301 coverage of macro eNB (macro cell), 1302 coverage of small eNB (small cell).

The invention claimed is:

1. A communication system comprising:
a first base station device and a second base station device configured to perform wireless communication in parallel with a communication terminal device,
wherein the second base station device is a base station device configured to switch between an active state and an inactive state is configured to transmit information on the second base station device to the first base station device, and
wherein the information is access information of the second base station device.

2. The communication system according to claim 1, wherein
the information is access restriction information of the second base station device.

3. The communication system according to claim 1, wherein
when the second base station device is in the inactive state, access restriction control is executed to judge whether the communication terminal device is allowed to access the second base station device,
when it is judged that the communication terminal device is allowed to access the second base station device by the access restriction control, a wake-up process of shifting the second base station device from the inactive state to the active state is performed, and
when it is judged that the communication terminal device is not allowed to access the second base station device by the access restriction control, the second base station device remains in the inactive state.

4. A first base station device in a communication system in which the first base station device and a second base station device are configured to perform wireless communication in parallel with a communication terminal device, wherein the second base station device is a base station device configured to switch between an active state and an inactive state, comprising:
- circuitry configured to receive information on the second base station device from the second base station device,
- wherein the information is access information of the second base station device.

5. The first base station device in the communication system according to claim 4, wherein
- when the second base station device is in the inactive state, access restriction control is executed to judge whether the communication terminal device is allowed to access the second base station device,
- when it is judged that the communication terminal device is allowed to access the second base station device by the access restriction control, a wake-up process of shifting the second base station device from the inactive state to the active state is performed, and
- when it is judged that the communication terminal device is not allowed to access the second base station device by the access restriction control, the second base station device remains in the inactive state.

6. A second base station device in a communication system in which a first base station device and the second base station device are configured to perform wireless communication in parallel with a communication terminal device, wherein the second base station device comprising:
- a base station device configured to switch between an active state and an inactive state and to transmit information on the second base station device to the first base station device,
- wherein the information is access information of the second base station device.

7. The second base station device in the communication system according to claim 6, wherein
- when the second base station device is in the inactive state, access restriction control is executed to judge whether the communication terminal device is allowed to access the second base station device,
- when it is judged that the communication terminal device is allowed to access the second base station device by the access restriction control, a wake-up process of shifting the second base station device from the inactive state to the active state is performed, and
- when it is judged that the communication terminal device is not allowed to access the second base station device by the access restriction control, the second base station device remains in the inactive state.

8. A communication terminal device in a communication system in which a first base station device and a second base station device are configured to perform wireless communication in parallel with the communication terminal device, wherein the second base station device being a base station device configured to switch between an active state and an inactive state is configured to transmit information on the second base station device to the first base station device, comprising:
- circuitry configured to perform wireless communication in parallel with the first base station device and the second base station device,
- wherein the information is access information of the second base station device.

9. The communication terminal device in the communication system according to claim 8, wherein
- when the second base station device is in the inactive state, access restriction control is executed to judge whether the communication terminal device is allowed to access the second base station device,
- when it is judged that the communication terminal device is allowed to access the second base station device by the access restriction control, a wake-up process of shifting the second base station device from the inactive state to the active state is performed, and
- when it is judged that the communication terminal device is not allowed to access the second base station device by the access restriction control, the second base station device remains in the inactive state.

* * * * *